United States Patent
Castinado et al.

(10) Patent No.: US 11,182,781 B2
(45) Date of Patent: Nov. 23, 2021

(54) BLOCK CHAIN ENCRYPTION TAGS

(71) Applicant: BANK OF AMERICA CORPORATION, Charlotte, NC (US)

(72) Inventors: Joseph B. Castinado, Northglenn, CO (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 592 days.

(21) Appl. No.: 15/956,540

(22) Filed: Apr. 18, 2018

(65) Prior Publication Data

US 2018/0240112 A1    Aug. 23, 2018

Related U.S. Application Data

(63) Continuation-in-part of application No. 14/305,928, filed on Jun. 16, 2014, now abandoned.

(51) Int. Cl.

| | |
|---|---|
| *G06Q 20/38* | (2012.01) |
| *G06Q 20/36* | (2012.01) |
| *H04L 9/06* | (2006.01) |
| *H04L 9/32* | (2006.01) |
| *H04L 9/14* | (2006.01) |

(Continued)

(52) U.S. Cl.
CPC ....... *G06Q 20/3829* (2013.01); *G06Q 20/065* (2013.01); *G06Q 20/363* (2013.01); *G06Q 20/381* (2013.01); *H04L 9/0637* (2013.01); *H04L 9/0643* (2013.01); *H04L 9/0861* (2013.01); *H04L 9/14* (2013.01); *H04L 9/321* (2013.01); *H04L 9/3234* (2013.01);

(Continued)

(58) Field of Classification Search
CPC ............ G06Q 20/3829; G06Q 20/065; G06Q 20/363; G06Q 20/381; H04L 9/3234; H04L 9/14; H04L 9/3236; H04L 9/0861; H04L 9/321; H04L 9/0643; H04L 9/0637; H04L 2209/56; H04L 2209/38

See application file for complete search history.

(56) References Cited

U.S. PATENT DOCUMENTS 9,374,228 B2    6/2016    Pendarakis et al.
9,836,790 B2    12/2017    Ronca et al.
(Continued)

OTHER PUBLICATIONS

Peters et al., "Understanding Modern Banking Ledgers through Blockchain Technologies: Future of Transaction Processing and Smart Contracts on the Internet of Money," arXiv:1511.05740v1, all pages. (Year: 2015).*

*Primary Examiner* — Jacob C. Coppola
(74) *Attorney, Agent, or Firm* — Michael A. Springs

(57) ABSTRACT

A system that includes a device with a processor is configured to receive a first set of data elements and to obtain an encryption key from a memory. The processor is further configured to encrypt the first set of data elements using the encryption key, to embed the first set of encrypted data elements within a first block for the block chain, and to generate a first encrypted element map identifying the locations of the first set of encrypted data elements within the first block. The processor is further configured to combine the encryption key with the first encrypted element map to generate a creator tag, to encrypt the creator tag, to embed the creator tag within the first block, and to publish the first block to a block chain.

20 Claims, 20 Drawing Sheets

(51) Int. Cl.
*H04L 9/08* (2006.01)
*G06Q 20/06* (2012.01)

(52) U.S. Cl.
CPC ........ *H04L 9/3236* (2013.01); *H04L 2209/38* (2013.01); *H04L 2209/56* (2013.01)

(56) References Cited

U.S. PATENT DOCUMENTS

| | | | |
|---|---|---|---|
| 9,992,022 B1* | 6/2018 | Chapman | G06F 21/604 |
| 10,320,843 B1* | 6/2019 | Dobrek | H04L 9/3239 |
| 2003/0120567 A1 | 6/2003 | Macklin | |
| 2013/0287207 A1 | 10/2013 | Zaverucha et al. | |
| 2014/0079221 A1 | 3/2014 | McCallum et al. | |
| 2014/0258073 A1 | 9/2014 | Hunn et al. | |
| 2014/0352151 A1 | 12/2014 | Bruin-Slot et al. | |
| 2015/0036778 A1 | 2/2015 | Izumi et al. | |
| 2015/0170112 A1 | 6/2015 | DeCastro | |
| 2015/0363770 A1 | 12/2015 | Ronca et al. | |
| 2015/0363773 A1 | 12/2015 | Ronca et al. | |
| 2015/0363777 A1 | 12/2015 | Ronca et al. | |
| 2015/0363782 A1 | 12/2015 | Ronca et al. | |
| 2015/0363783 A1 | 12/2015 | Ronca et al. | |
| 2015/0365283 A1 | 12/2015 | Ronca et al. | |
| 2016/0148173 A1 | 5/2016 | Kelley | |
| 2016/0203477 A1 | 7/2016 | Yang et al. | |
| 2018/0121918 A1* | 5/2018 | Higgins | G06Q 20/02 |

* cited by examiner

BLOCK CHAIN ENCRYPTION TAGS

CROSS-REFERENCE TO RELATED APPLICATIONS

The present application is a continuation-in-part which claims priority to U.S. Non-provisional application Ser. No. 14/305,928 filed Jun. 16, 2014 by James G. Ronca et al. and titled "CRYPTOCURRENCY ONLINE VAULT STORAGE SYSTEM," which is hereby incorporated by reference as if reproduced in its entirety.

TECHNICAL FIELD

This invention relates generally to providing information security for a block chain, and more specifically, to a system for encrypting and linking data elements within blocks of a block chain.

BACKGROUND

Enterprises may handle a large number of financial transactions on a daily basis. As technology advances, financial transactions involving cryptocurrency have become more common. For some enterprises, it may be desirable to securely store cryptocurrency.

SUMMARY

According to embodiments of the present disclosure, disadvantages and problems associated with previous enterprise environments.

In at least one embodiment, a system may include a memory and processor. The processor may be configured to receive an electronic request to store a private key associated with a cryptocurrency. The processor may also be configured to generate a first vault key based at least in part upon the private key and generate a second vault key based at least in part upon the private key. The processor may also be able to facilitate the storage of the first vault key at a first data center and facilitate the storage of the second vault key at a second data center.

According to some embodiments, a system includes a memory that may store a customer account associated with a customer and a processor communicatively coupled to the memory. The processor is able to receive a request to deposit a quantity of cryptocurrency into the customer account and associate the quantity of cryptocurrency with the customer account. The processor is also able to deposit the quantity of cryptocurrency into a vault connected to a network and determine a total quantity of cryptocurrency deposited into the vault. The processor may also, in response to determining the total quantity of cryptocurrency deposited into the vault exceeds a threshold, facilitate the disconnection of the vault from the network.

In some embodiments, a system includes a memory and a processor coupled to the memory. The processor may communicate with an electronic payment service, the electronic payment service providing a virtual account associated with the customer and determine that the customer initiated a request for a financial transaction, the financial transaction configured to transfer an amount of currency from the virtual account to a destination. The processor is also able to validate the financial transaction based at least upon data received from the electronic payment service and determine the customer account is associated with the virtual account based at least upon data received from the electronic payment service. The processor also may determine a quantity of cryptocurrency equivalent to the amount of currency, the quantity of cryptocurrency associated with the customer account and transfer the quantity of cryptocurrency to the electronic payment service.

In certain embodiments, a system may include a memory and a processor. The processor is operable to receive a request from a user to perform a cryptocurrency transaction with a third party and retrieve block chain information associated with the cryptocurrency transaction. The processor is also operable to determine whether one of the plurality of user profiles is associated with the user based at least in part upon the retrieved block chain information and at least one stored cryptoidentifier associated with one of the plurality of user profiles. The process may be further operable to determine whether one of the plurality of user profiles is associated with the third party based at least in part upon the retrieved block chain information and the at least one stored cryptoidentifier associated with one of the plurality of user profiles and determine whether the cryptocurrency transaction is suspicious based at least in part upon the associated user profile. Finally, the processor is operable to communicate an alert to the enterprise regarding whether the cryptocurrency transaction is suspicious.

In some embodiments, a system may include a memory and a processor. The processor is operable to receive a request from a customer to perform a cryptocurrency transaction with a third party and retrieve block chain information associated with the cryptocurrency transaction. The processor is also operable to determine the amount of cryptocurrency associated with the cryptocurrency transaction and calculate a risk score for performing the cryptocurrency transaction based at least in part upon the block chain information and the amount of cryptocurrency. The processor may be further operable to determine whether the transaction is approved based at least in part on the risk score and communicate to the customer and the third party whether the transaction is approved. Finally, the processor may be operable to determine whether the risk score indicates suspicious activity by the third party and communicate a notification to the customer that the risk score indicates suspicious activity by the third party.

According to certain embodiments, a system may include a memory and a processor. The processor is operable to receive a request from the customer to perform a cryptocurrency transaction with a third party and calculate a risk score for the cryptocurrency transaction. The processor is also operable to determine a number of required validations to confirm the cryptocurrency transaction based at least in part upon the risk score. The process may be further operable to receive a number of validations from a plurality of miners and compare the number of received validations to the number of required validations. The processor may be further operable to determine whether the number of received validations complies with the number of required validations. Finally, the processor is operable to send a notification to the third party that the cryptocurrency transaction is confirmed or send a notification to the customer and the third party that the cryptocurrency transaction is not confirmed and communicate a request to the customer to retransmit the cryptocurrency associated with the cryptocurrency transaction.

In certain embodiments, a system includes a memory and a processor. The memory may store a customer account associated with a customer, a first float account associated with an enterprise, and a second float account associated with the enterprise. The processor may be communicatively coupled to the memory and may cause the system to receive an electronic request for a currency exchange from the customer and determine a plurality of exchange rates for exchanging a first currency for a second currency. The processor may also cause the system to determine an optimal exchange rate. In response to determining the optimal exchange rate, the processor may cause the system to determine a first amount of the first currency and associate the first amount of the first currency with the customer account. The processor may also cause the system to transfer the first amount of the first currency into the first float account and determine a second amount of the second currency. The processor is further able to associate the second amount of the second currency with the second float account and transfer the second amount of the second currency to the customer.

In a further embodiment, a system comprises a memory operable to store a set of conversion rules. The system also comprises a processor that may be communicatively coupled to the memory and may cause the system to receive an electronic request for a cryptocurrency conversion requesting a conversion of a first currency into a second currency, wherein the second currency is a cryptocurrency. The processor may also cause the system to retrieve price data associated with the first and second currencies and determine whether the conversion is optimal. In response to determining the conversion is optimal, the processor may cause the system to determine a plurality of exchange rates associated with converting the first currency into the second currency and determine an optimal exchange rate of the plurality of exchange rates. The processor is further able to initiate, essentially simultaneously as the determination that the conversion is optimal, converting the first currency into the second currency.

In another embodiment, a system includes a memory and a processor. The memory may store a customer account associated with a customer and an enterprise account associated with an enterprise. The processor may be communicatively coupled to the memory and may cause the system to receive a request to deposit a first amount of a cryptocurrency in the customer account from the customer. The processor may also cause the system to determine a public key associated with the customer account and receive the first amount of the cryptocurrency. The processor may further cause the system to determine a first value approximately equivalent to the first amount of cryptocurrency and associate the first value with the customer account. The processor is further able to aggregate the first amount of cryptocurrency with an aggregated amount of the cryptocurrency in the enterprise account and facilitate securing the public key in the enterprise account.

In yet another embodiment, a system comprises a memory operable to store a customer account associated with a customer and a processor communicatively coupled to the memory that may cause the system to encode cryptocurrency information associated with the customer account onto a payment instrument. The processor may also cause the system to receive a request, from the customer using the payment instrument, for a cryptocurrency transaction, the request indicating a first amount of cryptocurrency associated with the cryptocurrency transaction. In response to receiving the request, the processor may cause the system to determine cryptocurrency information associated with the customer account and determine cryptocurrency information associated with a recipient. The processor may also cause the system to associate the first amount of cryptocurrency with the customer account. The processor is further able to initiate a transfer of the first amount of cryptocurrency to an account associated with the recipient.

Particular embodiments of the present disclosure may provide some, none, or all of the following technical advantages. For example, in certain embodiments, the system is able to identify that the number of validations from a plurality of miners is insufficient to confirm the transaction before completing the requested cryptocurrency transaction, thereby conserving the bandwidth, memory, and computation resources consumed by correcting erroneous cryptocurrency transaction after completion.

Furthermore, in some embodiments, the system is able to conserve network and computing resources by securely storing information associated with cryptocurrency and preventing potential malicious activity involving such information, conserving bandwidth, memory, and computation resources.

As another example, in at least one embodiment, energy and power consumption is conserved and security is increased as certain information may be stored in a cryptocurrency vault that is eventually taken offline. A further example in some embodiments may be that a system may be put in place that allows the use of a virtual account by a user associated with a customer account at a financial institution conserving time, bandwidth, memory, and computational resources.

As another example, in certain embodiments, a system is operable to reduce transaction time associated with the cryptocurrency transaction by determining a number of required validations, which may be fewer than the number of validations required by a third party, to confirm the cryptocurrency transaction based at least in part upon the risk score, thereby reducing the computational resources and bandwidth consumed by receiving more validations than necessary. Another technical advantage includes improved customer satisfaction by eliminating the need for a customer to wait for a third party or third party system to validate a transaction before completing the transaction.

Additionally, in certain embodiments, the system is able to determine whether the cryptocurrency transaction is suspicious based on an associated user profile, containing information that the system has previous aggregated, thereby conserving the bandwidth and computational resources consumed by aggregating the information about the user each time the user request to perform a cryptocurrency transaction. As another example, in certain embodiments, the system communicates an alert to the enterprise, thereby conserving the computational resources necessary to perform the cryptocurrency transaction that would be consumed obtaining enterprise review using less efficient contact methods. Furthermore, security may be increased for the enterprise because the system automatically alerts the enterprise of any suspicious transactions, allowing the enterprise to take preventative action before letting the transaction move forward. Another technical advantage of one embodiment includes aggregating information regarding a user's past behavior in cryptocurrency transactions in order to mitigate the risk of fraud.

As another example, in certain embodiments, security may be increased for a customer because the customer may be alerted of suspicious activity of a third party and therefore choose to not participate in the transaction. Furthermore, security may be increased for the enterprise because it uses past information about a customer or third party to mitigate fraud and determine whether to approve the current transaction.

In certain embodiments, components of the system may provide currency exchange rates for converting a currency into a cryptocurrency (or vice versa) or one cryptocurrency into another cryptocurrency, thereby bridging the gap between cryptocurrency and fiat currency.

In another embodiment, compiling and analyzing information from various sources of financial data to provide quotes for currency exchange rates reduces the dependency on third party systems and services such as third party exchanges.

In yet another embodiment, executing a currency exchange may simplify cryptocurrency transactions for customers of an enterprise by simplifying the purchase and exchange of currencies and cryptocurrencies and reducing the fees associated with doing so.

In a further embodiment, executing a requested currency exchange essentially simultaneously as a determination that the conversion is optimal guarantees a currency exchange at the current optimal exchange rate.

In some embodiments, storing and monitoring float accounts associated with various currencies and cryptocurrencies internally owned by an enterprise negates the need for customers of the enterprise to use a third-party currency exchange to execute a desired currency exchange, In another embodiment, components of the system may aggregate cryptocurrency deposited by customers into an enterprise account associated with an enterprise, thereby securely storing the customer's cryptocurrency funds. In such an embodiment, this may allow the enterprise to utilize amounts of cryptocurrency equivalent to the value of its customers' cryptocurrency deposits stored in the enterprise account to conduct transactions on the behalf of those customers that may want to utilize such cryptocurrency and debit or credit the particular customer accounts as appropriate.

In certain embodiments, encoding cryptocurrency information associated with a customer account onto a payment instrument provides a customer with electronic access to the customer's account, thereby allowing a customer to execute a transaction using cryptocurrency in the customer account associated with the customer.

In one embodiment, the system is configured to generate and use a creator tag to encrypt data elements and to link encrypted data elements within a block chain. Creator tag provides a technical solution to the technical problems associated with protecting data elements within a block chain. Block chains are distributed databases where a large network of computers and devices have access the information in the block chain. The information stored in a block chain is vulnerable to attacks by bad actors trying to extract information from the block chain. The creator tag provides a technical solution that gives several additional layers of security and functionality for blocks and data in a block chain. The creator tag is an element that is embedded into a block that provides an encryption key that is used to encrypt a set of data elements and a mapping of where the encrypted elements (e.g. blocks or transactions) are stored within one or more blocks of a block chain. The creator tag allows the data elements to be stored anywhere within the block chain and uses an encrypted element map to record the locations of the encrypted data elements over time. The encryption key is used for both encrypting and decrypting the encrypted elements. The creator tag provides an encrypted element map that allows encrypted data elements within a block or among different blocks to be linked together. Conventional block chain systems do not have the ability to link together a set of data elements within the block chain. The creator tag provides unconventional solution that involves securely embedding the encrypted element map within the block chain to enable this new functionality. The creator tag provides the ability to securely store data within the block chain as well as the ability to locate and recover the original data from the block chain at a later time.

The creator tag may be stored anywhere within a block. For example, the creator tag may be embedded within a block as a transaction. In this example, the creator tag appears as another transaction to anyone without knowledge of the location of the creator tag. The location of the creator tag may be known and specified by the user embedding the creator tag within the block. The location of the creator tag appears random to anyone else trying to locate the creator tag, which provides additional layers of protection for the creator tag and the data elements it protects. For example, a bad actor will have to determine the location of the creator tag within the block or attempt to process every transaction within a block to access the data elements protected by the creator tag. Both techniques require a significant amount of time and processing resources which makes them impractical for a bad actor to implement.

The creator tag itself is encrypted which means that a bad actor cannot easily extract the encryption key nor the encrypted element map to determine the location of the encrypted data elements. For example, the creator tag may be encrypted before its embedded into a block. Encrypting the creator tag provides an additional layer of security because, in addition to the challenges associated with locating the creator tag, a bad actor will also have to decrypt the creator tag to extract the information within the creator tag. Thus, using creator tags increases the difficulty for a bad actor to access protected information from within the block chain.

BRIEF DESCRIPTION OF THE DRAWINGS

For a more complete understanding of the present disclosure and its advantages, reference is made to the following descriptions, taken in conjunction with the accompanying drawings in which.

DETAILED DESCRIPTION

Figure 1:
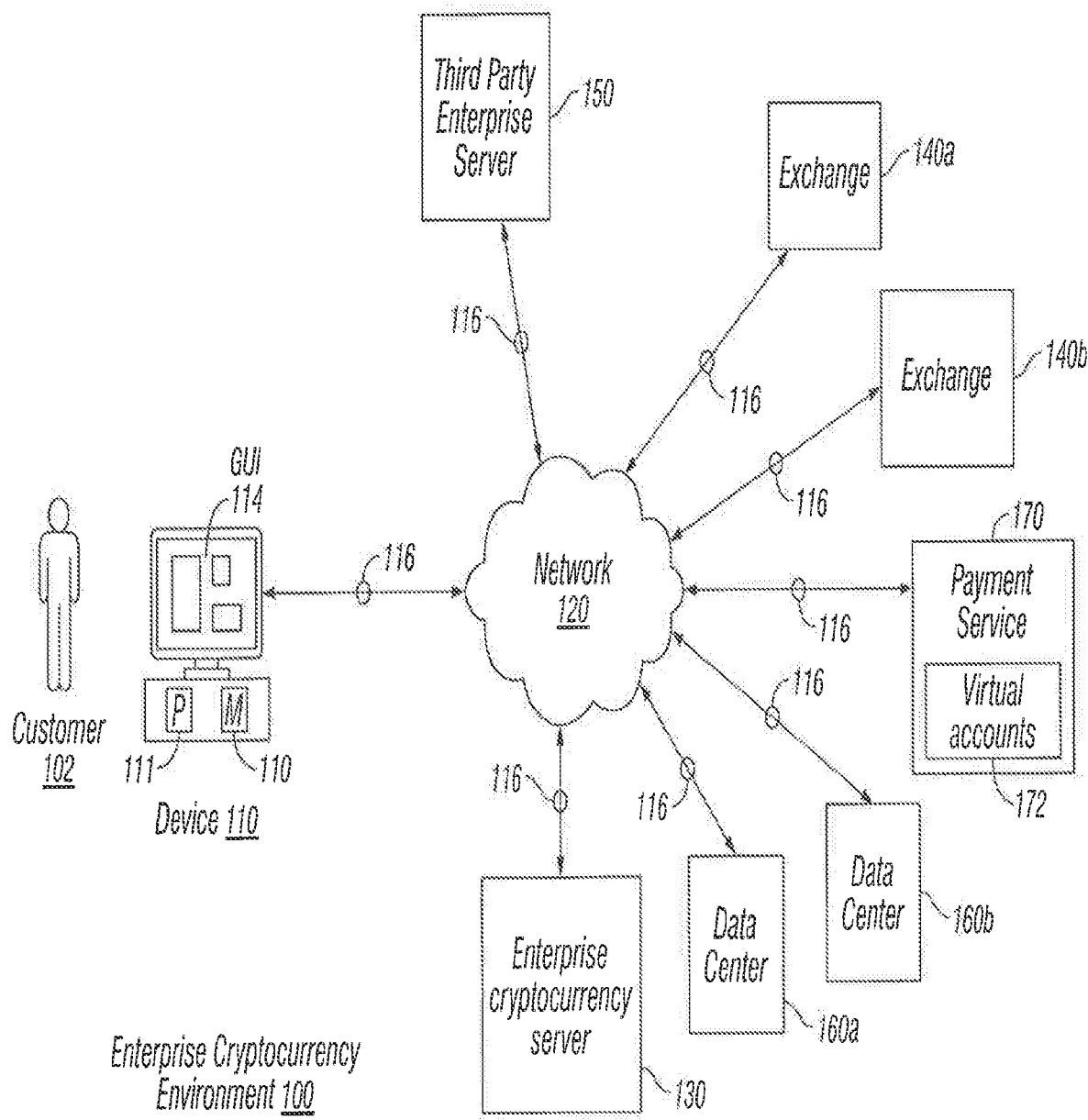
FIG. 1 illustrates an example enterprise cryptocurrency environment.

In general, an enterprise may offer a variety of financial services that may utilize cryptocurrency. For example, currency exchanges are used by customers, such as customers of financial institutions, to exchange one currency for another currency. Some currency exchanges may involve converting one currency into a cryptocurrency such as Bitcoin, Litecoin, Ripple, Peercoin, or Dogecoin. To execute such an exchange, an enterprise may receive payment from a customer in a quantity of one currency to exchange for an amount of a cryptocurrency equivalent to the received payment from the customer. Essentially simultaneously or shortly thereafter, the enterprise may convert the first currency into the cryptocurrency. Alternatively, the enterprise may to convert the first currency into the cryptocurrency within a window of time.

As another example, deposit accounts at an enterprise, such as a financial institution, are used by customers of the financial institution to deposit funds for safekeeping. Upon deposit, the funds become an asset of the enterprise and thus the risk of holding those funds transfers from the customer to the enterprise. An enterprise may desire to securely store funds that may be in the form of cryptocurrency. For example, an enterprise might apply a security function to one or more private keys associated with the cryptocurrency and store the result in one or more data centers. An enterprise may even disconnect the storage device holding such private keys and subsequently physically secure such storage device.

Some deposit accounts may be used to deposit funds of cryptocurrency. As a result, the enterprise may decide to collect and aggregate cryptocurrency deposited by customers into a cryptocurrency account owned by the enterprise where the aggregated cryptocurrency may be securely stored. To aggregate deposits of cryptocurrency, an enterprise may receive a request to deposit an amount of cryptocurrency in a customer account and determine a public key associated with the customer account. The enterprise may use the public key to receive the amount of cryptocurrency and credit the customer account in the amount of cryptocurrency. The enterprise may then aggregate the amount of cryptocurrency with an aggregated amount of cryptocurrency in an enterprise account and facilitate securing the public key in the enterprise account.

Additionally, customers use payment instruments issued by enterprises, financial institutions, or other entities to execute various financial transactions. These payment instruments may provide customers electronic access to customer accounts, including customer accounts associated with cryptocurrency. As a result, a customer may make a transaction with cryptocurrency in a customer account by using a payment instrument encoded with cryptocurrency information associated with the customer account. To execute a transaction with cryptocurrency, an enterprise may receive a request from a customer using a payment instrument authorizing a payment of an amount of cryptocurrency. Essentially simultaneously or shortly thereafter, the enterprise may transfer the amount of cryptocurrency from a customer account to a recipient of the payment.

Customers may also use a peer-to-peer payment service to create a virtual account and associate such virtual account with an account at a financial institution. Such account may be associated with cryptocurrency. Using the peer-to-peer payment system, the customer may conduct transactions using the virtual account without the need to share their account information at the financial institution.

In particular, enterprise cryptocurrency environment 100 comprises customer device 110, network 120, enterprise cryptocurrency server 130, exchange servers 140, third party enterprise servers 150, data center servers 160, and payment service server 170. Customer device 110 is any device customer 102 may use to utilize any functionality or service offered by an enterprise. In some embodiments, customer device 110 may be operated by customer 102. In other embodiments, customer device 110 may be operated by an employee of an enterprise on the behalf of customer 102. Customer device 110 is a device operable to communicate with network 120, enterprise cryptocurrency server 130, payment service server 170, or any other suitable components of enterprise cryptocurrency environment 100. For example, customer device 110 may be a laptop computer, personal digital assistant (PDA), cellular phone, tablet, portable media player, smart device, or any other device capable of wireless or wired communication. In certain embodiments, customer device 110 may include one or more processors 111, one or more memories 112, one or more displays, one or more interfaces, one or more components capable of inputting data, one or more components capable of outputting data, one or more components capable of communicating with any other component of enterprise cryptocurrency environment 100, or any other component suitable for a particular purpose.

Processor 111 may include one or more microprocessors, controllers, or any other suitable computing devices or resources. Processor 111 may work, either alone or with components of enterprise cryptocurrency environment 100, to provide a portion or all of the functionality of enterprise cryptocurrency environment 100 described herein.

Processor 111 communicatively couples to memory 112. Memory 112 may take the form of volatile or non-volatile memory including, without limitation, magnetic media, optical media, Random Access Memory (RAM), Read Only Memory (ROM), removable media, or any other suitable memory component. In certain embodiments, a portion or all of memory 112 may store one or more database data structures, such as one or more structured query language (SQL) servers or relational databases.

In certain embodiments, memory 112 may be internal or external to processor 111 and may include one or more instruction caches or one or more data caches. Instructions in the instruction caches may be copies of instructions in memory 112, and the instruction caches may speed up retrieval of those instructions by processor 111. Data in the data caches may include any suitable combination of copies of data in memory 112 for instructions executing at processor 111 to operate on, the results of previous instructions executed at processor 111 for access by subsequent instructions executing at processor 111, or for writing to memory 112, and/or any other suitable data. The data caches may speed up read or write operations by processor 111.

In some embodiments, customer device 110 also may comprise graphical user interface (GUI) 114. GUI 114 is generally operable to tailor and filter data presented to customer 102. GUI 114 may provide customer 102 with an efficient and user-friendly presentation of information regarding the functionality of customer device 110. GUI 114 may comprise a plurality of displays having interactive fields, pull-down lists, and buttons operated by customer 102. GUI 114 may include multiple levels of abstraction including groups and boundaries. In certain embodiments, GUI 114 may comprise a web browser. In another embodiment, GUI 114 may comprise a graphical representation of a mobile application.

Customer device 110 may communicate with any other component of enterprise cryptocurrency environment 100 over network 120. This disclosure contemplates any suitable network 120. As an example and not by way of limitation, one or more portions of network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 120 may include one or more networks 120. For example, one or more networks 120 may be a network 120 local to enterprise cryptocurrency server 130, while yet another one or more networks 120 may be local to third party enterprise server 150, exchange server 140, payment service server 170, data center servers 160 and/or any other suitable component of enterprise cryptocurrency environment 100. The current disclosure contemplates any number of networks 120 suitable for a particular purpose. Any component of enterprise cryptocurrency environment 100 may communicate to another component of enterprise cryptocurrency environment 100 via network 120.

In some embodiments, components of enterprise cryptocurrency environment 100 may be configured to communicate over links 116. Communication over links 116 may request and/or send information about any suitable component of enterprise cryptocurrency environment 100. Links 116 may connect components of enterprise cryptocurrency environment 100 to network 120 or to each other. This disclosure contemplates any suitable links 116. In particular embodiments, one or more links 116 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 116 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 116, or a combination of two or more such links 116. Links 116 need not necessarily be the same throughout enterprise cryptocurrency environment 100. One or more first links 116 may differ in one or more respects from one or more second links 116.

Customer device 110 may communicate over network 120 with enterprise cryptocurrency server 130. Generally, enterprise cryptocurrency server 130 may be used by an enterprise to initiate and execute actions and transactions that allow the enterprise to provide various functionality and services to customers 102. Enterprise cryptocurrency server 130 will be discussed in more detail in the discussion regarding FIG. 2 below.

Enterprise cryptocurrency server 130 may communicate over network 120 with one or more exchange servers 140. Generally, exchange servers 140 may be associated with any cryptocurrency exchange that allows for the purchasing, selling, or transferring of cryptocurrency. Cryptocurrencies may be sold or purchased for other currencies or cryptocurrencies at a cryptocurrency exchange. Examples of cryptocurrency exchanges are OKCoin, BitStamp, BTCChina, Cryptsy, CoinMarket, and Justcoin. This disclosure contemplates any cryptocurrency exchange can be associated with exchange server 140 as suitable for a particular purpose. In certain embodiments, exchange server 140 may be operated by an enterprise that also operates enterprise cryptocurrency server 130. The cryptocurrency exchange that is associated with exchange server 140 may be associated with the same jurisdiction or a different jurisdiction (e.g., country, economic union, political union, etc.) with which a particular customer 102 may be associated.

Exchange servers 140 may receive requests to purchase, sell, or transfer cryptocurrency or to transfer funds via links 116. Exchange servers 140 may fulfill such requests either directly to any other component of enterprise cryptocurrency environment 100 via links 116, or utilize an automated clearing house to fulfill such requests, or utilize any other method to fulfill such requests as suitable for a particular purpose. Although exchange servers 140*a* and exchange servers 140*b* are depicted as two example distinct exchange servers 140 in FIG. 1, this disclosure contemplates any number of exchange servers 140 interacting with enterprise cryptocurrency server 130 via links 116 or any other component of enterprise cryptocurrency environment 100.

In certain instances enterprise cryptocurrency server 130 may interact with third party enterprise server 150. For example, enterprise cryptocurrency server 130 may facilitate transactions with third party enterprise server 150. Third party enterprise server 150 may have accounts associated with customers 102 and/or enterprises. Third party enterprise server 150 is capable of receiving, transferring, or otherwise interacting with funds, cryptocurrencies, any suitable payment instrument, and/or any suitable information associated with the aforementioned. Although a single third party enterprise server 150 is depicted in FIG. 1, enterprise cryptocurrency environment 100 is capable of supporting one or more third party enterprise servers 150 as suitable for a particular purpose.

Enterprise cryptocurrency server 130 may store information at one or more data center servers 160 at a data center. Data center servers 160 may be any software, hardware, firmware, and/or combination thereof capable of storing information. In certain embodiments, data center servers 160 may securely store information regarding cryptocurrency such as public keys, private keys, or any other suitable cryptocurrency information. In certain embodiments, one or more particular encryption, hashing, tokenizing functions or algorithms may be applied to information stored in a data center server 160. According to some embodiments, one or more encryption, hashing, tokenizing functions or algorithms may be applied to information stored in a data center server 160 based on the location of data center server 160. Data center servers 160 may be locally located or remotely located to enterprise cryptocurrency server 130. In certain embodiments, each data center server 160 may be located at a different geographic location. For example, data center server 160*a* may be located at a first geographic location while data center server 160*b* may be located at a second geographic location.

Enterprise cryptocurrency server 130 may also interact with payment service server 170 to provide various transaction functionality to customers 102. Customers 102 may use payment service server 170 to transact online electronic payments using virtual accounts 172. In certain embodiments, links 116 communicatively coupling payment service server 170 to enterprise cryptocurrency server 130 may be a dedicated interface in addition to being coupled to network 120. A financial institution may facilitate the transferring of funds to and from virtual accounts 172 associated with customers 102. In some embodiments, funds may be transferred from accounts associated with customers 102 in enterprise cryptocurrency server 130 to virtual accounts 172 or vice versa. In certain embodiments, a quantity of cryptocurrency may be transferred to or from payment service server 170 by enterprise cryptocurrency server 130. In some embodiments, payment service server 170 may be associated with an enterprise associated with enterprise cryptocurrency server 130 or payment service server 170 may be associated with a third party enterprise not associated with enterprise cryptocurrency server 130.

Figure 2:
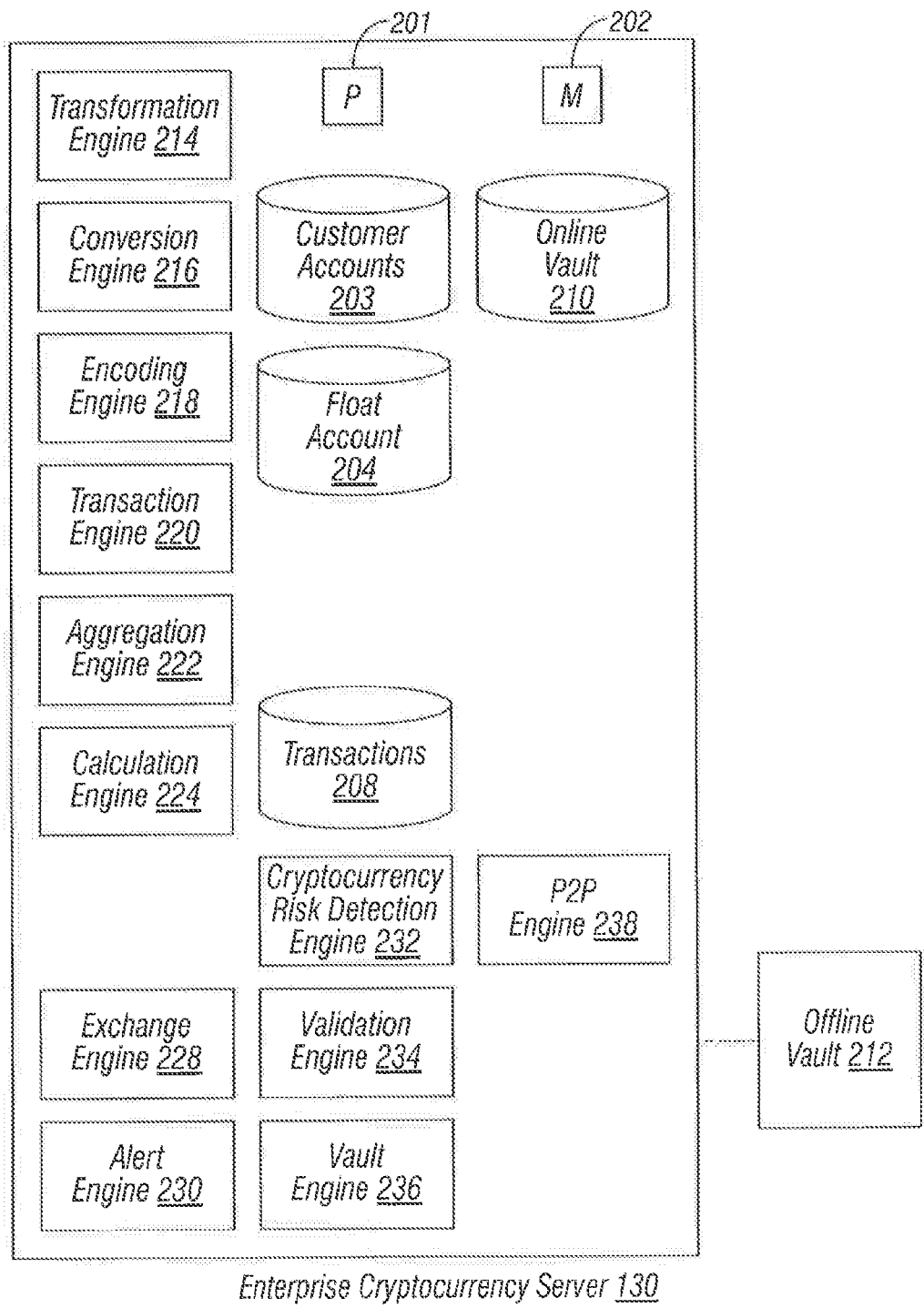
FIG. 2 illustrates an example enterprise cryptocurrency server.

FIG. 2 is a block diagram illustrating an example embodiment of enterprise cryptocurrency server 130 used in FIG. 1. More specifically, enterprise cryptocurrency server 130 may include processor 201, memory 202, customer accounts 203, float accounts 204, transactions 208, online vault 210, offline vault 212, transformation engine 214, conversion engine 216, encoding engine 218, transaction engine 220, aggregation engine 222, calculation engine 224, management engine 226, exchange engine 228, alert engine 230, risk detection engine 232, validation engine 234, vault engine 236, and peer-to-peer engine 238. Processor 201 may include one or more microprocessors, controllers, or any other suitable computing devices or resources. Processor 201 may work, either alone or with components of enterprise cryptocurrency environment 100, to provide a portion or all of the functionality of enterprise cryptocurrency environment 100 described herein. Processor 201 communicatively couples to memory 202. Memory 202 may take the form of volatile or non-volatile memory including, without limitation, magnetic media, optical media, RAM, ROM, removable media, or any other suitable memory component.

In certain embodiments, memory 202 may be internal or external to processor 201 and may include one or more instruction caches or one or more data caches. Instructions in the instruction caches may be copies of instructions in memory 202, and the instruction caches may speed up retrieval of those instructions by processor 201. Data in the data caches may include any suitable combination of copies of data in memory 202 for instructions executing at processor 201 to operate on, the results of previous instructions executed at processor 201 for access by subsequent instructions executing at processor 201, or for writing to memory 202, and other suitable data. The data caches may speed up read or write operations by processor 201.

Enterprise cryptocurrency server 130 may store and retrieve customer information from customer accounts 203. For example, enterprise cryptocurrency server 130 may use a unique identifier of customer 102 to retrieve a particular customer account 203. In certain embodiments, customer accounts 203 may be stored in memory 202. According to some embodiments, customer accounts 203 may be stored in one or more text files, tables in a relational database, or any other suitable data structure capable of storing information.

Each customer account 203 may be associated with a customer 102. In certain embodiments, customer account 203 may include information that can be used by enterprise cryptocurrency server 130 to perform various transactions involving cryptocurrencies. For example, customer account 203 may include information such as an account number, account balance, routing number, location information, or any other information suitable for a particular purpose associated with one or more accounts that customer 102 may have associated with a particular enterprise.

Enterprise cryptocurrency server 130 may include transformation engine 214. Generally, transformation engine 214 may initiate the execution of transactions that facilitate an exchange of one currency for another currency, such as an exchange of a fiat currency for a cryptocurrency (or vice versa) or an exchange of one cryptocurrency for another cryptocurrency, according to any one of a variety of embodiments suitable for a particular purpose. More specifically, transformation engine 214 may be any software, hardware, firmware, or combination thereof capable of initiating or performing a transaction to facilitate an exchange of funds involving cryptocurrency. According to some embodiments, transformation engine 214 may be a set of instructions stored in memory 202 that may be executed by processor 201.

Using information received over links 116, transformation engine 214 may initiate or perform various functions involving the exchange, storage, and retrieval of currencies and cryptocurrencies. For example, customer 102 may request a certain amount of funds in a particular customer account 203 in a first currency be exchanged for an approximately equivalent amount of funds in a second currency, such as a cryptocurrency. In response to the request, transformation engine 214 may directly execute the exchange or initiate various transactions to facilitate the execution of the exchange by utilizing various components of enterprise cryptocurrency environment 100 such as float accounts 204, conversion engine 216, calculation engine 224, and/or exchange engine 228.

Transformation engine 214 generally utilizes various float accounts 204 associated with an enterprise to execute exchanges involving cryptocurrency. For example, an enterprise may maintain repositories (e.g., float accounts 204) of currencies and cryptocurrencies allowing transformation engine 214 to exchange one currency for another currency, such as a fiat currency for a cryptocurrency, in an efficient manner with minimal delay. Float accounts 204 may be stored in memory 202. According to some embodiments, float accounts 204 may be stored in one or more text files, tables in a relational database, or any other suitable data structure capable of storing information.

Each float account 204 may be associated with an enterprise, financial institution, or other entity that may have an account associated with a particular currency or cryptocurrency. In certain embodiments, float account 204 may include information that can be used by transformation engine 214 to exchange, store, and/or retrieve various currencies and cryptocurrencies. For example, float account 204 may include information such as an account number, type of currency or cryptocurrency stored in float account 204, currency or cryptocurrency account balance, routing information, location information, or any other information suitable for a particular purpose associated with one or more accounts that an enterprise may have associated with a particular currency or cryptocurrency. In certain embodiments, transformation engine 214 may retrieve any information associated with float accounts 204 or the enterprise.

Transformation engine 214 may also monitor or otherwise manage float accounts 204. Monitoring a float account 204 may include monitoring an amount of funds in float account 204, depositing funds in float account 204, withdrawing funds from float account 204, requesting a quantity of funds in float account 204 be sold, requesting a quantity of funds be purchased for float account 204, or any other suitable operation for a particular purpose. For example, transformation engine 214 may determine whether an amount of funds in a float account 204 associated with a certain currency (e.g., the first currency or the second currency) is above a certain threshold.

In response to determining the amount of funds is above the certain threshold, transformation engine 214 may initiate the sale of a quantity of the certain currency in float account 204. In certain embodiments, the quantity of the certain currency may be sold at a cryptocurrency exchange. Various currencies may be sold or purchased for cryptocurrencies at a cryptocurrency exchange, such as exchange 140a or exchange 140b. According to some embodiments, the sale of the quantity of the certain currency results in a quantity of another currency, such as a quantity of a particular cryptocurrency.

As another example, transformation engine 214 may determine whether an amount of funds in a float account 204 associated with a certain currency (e.g., the first currency or the second currency) is below a certain threshold. In response to determining the amount of funds is below the certain threshold, transformation engine 214 may initiate the purchase of a quantity of the certain currency. In some embodiments, transformation engine 214 may purchase the certain currency at exchange 140, which allows transformation engine 214 to use currencies or cryptocurrencies to purchase other cryptocurrencies. Upon purchasing the quantity of the certain currency, transformation engine 214 may transfer the quantity of the certain currency to the particular float account 204 over links 116.

Transformation engine 214 may utilize conversion engine 216 to facilitate a real-time currency conversion when a requested conversion is optimal. In general, conversion engine 216 determines current values, exchange rates, and/or advantages associated with converting the first currency into a variety of cryptocurrencies and initiates the execution of the exchange essentially simultaneously as a determination that a requested exchange is optimal. Conversion engine 216 may be any software, hardware, firmware, or combination thereof capable of initiating or performing a transaction to facilitate an exchange of funds involving cryptocurrency. In certain embodiments, conversion engine 216 may be a set of instructions stored in memory 202 that may be executed by processor 201.

Conversion engine 216 generally retrieves price data associated with currencies and cryptocurrencies. For example, a customer 102 may request an exchange of a first currency for a particular cryptocurrency if the exchange is optimal. In response, transformation engine 214 may communicate a request to conversion engine 216 to determine whether converting the first currency into a particular cryptocurrency is optimal.

As a result, conversion engine 216 may retrieve data associated with the conversion. For example, conversion engine 216 may retrieve price data associated with the first currency and price data associated with the particular cryptocurrency. Conversion engine 216 may also retrieve price data associated with a plurality of cryptocurrencies, price data associated with a plurality of currencies, market data associated with a plurality of currencies, market data associated with a plurality of cryptocurrencies, volatility data associated with a plurality of cryptocurrencies, volatility data associated with a plurality of currencies, current currency exchange rate data, economic risk data, or any other data that may be suitable for a particular purpose.

Conversion engine 216 may also determine whether the conversion is optimal. According to some embodiments, conversion engine 216 may do so based at least in part upon analyzing the data associated with the conversion. In such an embodiment, conversion engine 216 may consider time factors, price factors associated with particular currencies (such as the value of various currencies), price factors associated with particular cryptocurrencies (such as the value of various cryptocurrencies), volume of particular currencies, volume of particular cryptocurrencies, availability of particular currencies, availability of particular cryptocurrencies, popularity of particular currencies, popularity of particular cryptocurrencies, volatility of particular currencies, volatility of particular cryptocurrencies, economic risk factors, current currency exchange rates, or any other factors that may facilitate determining whether the conversion is optimal. For example, conversion engine 216 may determine that the conversion is optimal based on financial advantages that may be gained by the enterprise and/or customer 102. In this example, conversion engine 216 may consider financial factors such as currency exchange rates, transaction fees, and/or cryptocurrency prices to determine that the conversion will generate a financial advantage for the enterprise and/or customer 102.

As another example, conversion engine 216 may determine whether the conversion is optimal based at least in part upon comparing price data of a particular cryptocurrency (requested by customer 102) to price data of other cryptocurrencies. For example, conversion engine 216 may compare a value of the particular cryptocurrency to a value of various other cryptocurrencies. If the value of at least one of the other cryptocurrencies is greater than the value of the particular cryptocurrency, conversion engine 216 may determine that the requested conversion is not optimal.

In certain embodiments, conversion engine 216 may determine whether the conversion is optimal based at least in part upon a set of conversion rules. Conversion rules may include any number of internal algorithms that may weigh various factors associated with exchanges 140, such as acceptance of various currencies and cryptocurrencies, speed of proof-of-work validation, reliability, consistency, average time to hold prior to confirming the conversion, and/or any other factor suitable for a particular purpose. For example, customer 102 may request to receive a quote for purchasing a certain amount of a specific cryptocurrency using a fiat currency. In response, conversion engine 216 may leverage an internal algorithm to determine the number of exchanges 140 to reference in order to determine a reliable and consistent exchange 140 (based on, for example, acceptance of the fiat currency to be used, availability of the desired cryptocurrency, optimal speed of proof-of-work validation, and/or average time to hold prior to confirming the conversion). After determining the quote, conversion engine 216 may communicate the quote to customer 102. Customer 102 may then confirm the exchange or deny the exchange.

Conversion rules may also include any number of monitoring frequency rules that may weigh various factors to determine a monitoring frequency, such as whether a cryptocurrency has maintained a consistent value price for a particular amount of days, hours, minutes or whether there has been a large increase or decrease in the value of a cryptocurrency. For example, customer 102 may request that an exchange only be executed at a specific exchange rate. Customer 102 may also request to be notified when the desired exchange rate has been met for the potential conversion. In response, conversion engine 216 may leverage the monitoring frequency rules to determine a frequency for which to monitor cryptocurrency values, fiat currency values, and/or exchange rates. Conversion engine 216 may then monitor exchange rates at the determined frequency, which may allow conversion engine 216 to more accurately and timely notify customer 102 of when the desired exchange rate has been met. In such an example, upon being notified of the desired exchange rate, customer 102 may request to immediately purchase a certain amount of a specific cryptocurrency using a specific fiat currency. In response, conversion engine 216 may leverage an internal algorithm to determine the number of exchanges to reference in order to determine a reliable and consistent exchange 140 (based on, for example, acceptance of the fiat currency to be used, availability of the desired cryptocurrency, acceptance of the desired exchange rate, optimal speed of proof-of-work validation, and/or average time to hold prior to confirming the conversion). Conversion engine 216 may also take into account any fees associated with fiat currency exchanges, any fees associated with cryptocurrency exchanges, and/or any fees associated with the processing of the potential conversion to determine whether the conversion is optimal. In certain embodiments, conversion engine 216 may perform multiple fiat currency conversions if conversion engine 216 determines the specific fiat currency is not optimal to exchange for the cryptocurrency and the cost of exchanging the specific fiat currency for the optimal fiat currency is less than exchange rate differences.

In some embodiments, determining whether the conversion is optimal is based at least in part upon a date threshold associated with the request and/or a benefit threshold associated with the request. For example, customer 102 may communicate a request for a cryptocurrency conversion that comprises a date threshold (e.g., a date for which the request for the cryptocurrency conversion expires) and a benefit threshold (e.g., a financial advantage, time advantage, etc.). As a result, conversion engine 216 may execute the cryptocurrency conversion if the conversion exceeds the benefit threshold before the date threshold. More specifically, if conversion engine 216 calculates the conversion at a first time before the date threshold and determines that the conversion is less than the benefit threshold, conversion engine 216 may calculate the conversion at a second time before the date threshold (e.g., any other time before the date threshold). If the conversion at the second time is greater than the benefit threshold, then conversion engine 216 may determine the conversion is optimal and thereby communicate a request to execute the exchange.

Conversion engine 216 may also communicate a message to a customer 102. For example, in response to determining the requested conversion is not optimal, conversion engine 216 may communicate a message indicating that the conversion is not optimal to customer 102 via links 116. As a result, customer 102 may communicate a new request for a different cryptocurrency conversion. In certain embodiments, conversion engine 216 may include data indicating a more favorable cryptocurrency to exchange the first currency for in the message to customer 102.

Transformation engine 214 may utilize calculation engine 224 to determine an optimal exchange rate for executing the cryptocurrency exchange according to any one of a variety of embodiments suitable for a particular purpose. More specifically, calculation engine 224 may be any software, hardware, firmware, or combination thereof capable of initiating or performing a calculation to facilitate an exchange involving cryptocurrency. According to some embodiments, calculation engine 224 may be a set of instructions stored in memory 202 that may be executed by processor 201.

Calculation engine 224 may facilitate an exchange of a certain currency for a cryptocurrency by performing various calculations. For example, transformation engine 214 may communicate (in response to customer 102 requesting a currency be exchanged for a cryptocurrency) a request for current exchange rates associated with currencies and cryptocurrencies to calculation engine 224 via links 116. In response to this request, calculation engine 224 may determine a plurality of exchange rates for exchanging the first currency for cryptocurrency. Calculation engine 224 may determine such rates either directly or utilize any other component of enterprise cryptocurrency server 130, such as conversion engine 216, or utilize any other method to determine such rates as suitable for a particular purpose.

In certain embodiments, calculation engine 224 may determine exchange rates for exchanging the first currency for various cryptocurrencies or for exchanging the first currency for a particular cryptocurrency (e.g., a customer 102 requested an exchange for a particular cryptocurrency). Additionally, calculation engine 224 may monitor exchange rates for exchanging funds involving cryptocurrency. For example, transformation engine 214 may instruct calculation engine 224 to monitor exchange rates for exchanging a first currency for a particular cryptocurrency for a time threshold (e.g., monitor the exchange rates for the next hour, day, week, month, etc.). In some embodiments, calculation engine 224 may communicate the exchange rates to customer device 110 via links 116.

Calculation engine 224 may also determine the optimal exchange rate for performing a requested currency exchange. In certain embodiments, calculation engine 224 may determine the optimal exchange rate based at least in part upon the current exchange rates. Calculation engine 224 may also consider other factors, such as time factors, price factors associated with currency exchanges (such as the value of particular currencies and cryptocurrencies), fees charged by third parties, volatility of particular currencies, volatility of particular cryptocurrencies, economic risk factors, or any other information that may facilitate determining that one exchange rate should be used over another exchange rate. In certain embodiments, calculation engine 224 may determine the optimal exchange rate based upon a selection by customer 102. For example, in response to receiving the exchange rates via device 110, customer 102 may be prompted to select an exchange rate from the plurality of exchange rates. Customer 102 may then utilize device 110 to input and communicate the selected exchange rate to enterprise cryptocurrency server 130 via links 116.

In certain embodiments, calculation engine 224 may determine whether the exchange is optimal based at least in part upon a set of conversion rules. Conversion rules may include any number of internal algorithms that may weigh various factors associated with exchanges 140 performing various conversions, such as acceptance of various currencies and cryptocurrencies, speed of proof-of-work validation, reliability, consistency, average time to hold prior to confirming the conversion, and/or any other factor suitable for a particular purpose. Conversion rules may also include any number of monitoring frequency rules that may weigh various factors to determine a frequency at which to monitor exchange rates, such as whether a cryptocurrency has maintained a consistent value price for a particular amount of days, hours, minutes or whether there has been a large increase or decrease in the value of a cryptocurrency. As an example, customer 102 may request to receive a quote for purchasing a certain amount of a specific cryptocurrency using a fiat currency. In response, calculation engine 224 may determine a number of exchanges 140 to reference in order to determine a reliable and consistent exchange 140 (based on, for example, acceptance of the fiat currency to be used, availability of the desired cryptocurrency, optimal speed of proof-of-work validation, and/or average time to hold prior to confirming a conversion). By determining a reliable and consistent exchange 140, calculation engine 224 may quote the optimal exchange rate and communicate such to customer 102. As another example, customer 102 may request that an exchange only be executed at a specific exchange rate. In response, calculation engine 224 may determine a frequency for which to monitor exchange rates for the potential exchange. Calculation engine 224 may consider any fees associated with fiat currency exchanges, any fees associated with cryptocurrency exchanges, and/or any fees associated with the processing of the potential conversion to determine whether the desired exchange rate has been met and thus determine the conversion is optimal.

According to some embodiments, determining the optimal exchange rate includes determining which particular cryptocurrency the first currency should be exchanged for. In such embodiments, calculation engine 224 may determine which cryptocurrency to use based on cryptocurrency price, volatility of the cryptocurrency, popularity of the cryptocurrency, availability of the cryptocurrency, or any potential risk factor that may be associated with a particular cryptocurrency. For example, calculation engine 224 may determine a particular cryptocurrency based on financial advantages that may be gained by customer 102. In this example, calculation engine 224 may consider financial factors such as currency exchange rates, transaction fees, and/or cryptocurrency prices to determine that exchanging the first currency for the particular cryptocurrency will generate financial advantages for customer 102 as compared to exchanging the first currency for any other cryptocurrency.

Calculation engine 224 may use information received over links 116 to determine a first amount of a first currency. For example, a request from a customer 102 may indicate a first amount in a particular customer account 203 in a first currency be exchanged for a quantity of a second currency worth approximately the same amount as the first currency. Calculation engine 224 may then determine a second amount of a second currency, such as a second amount of cryptocurrency, based at least in part upon the optimal exchange rate. For example, if customer 102 requests that a certain amount of a first currency be exchanged for a second currency (e.g., be exchanged for a cryptocurrency), calculation engine 224 may apply the optimal exchange rate to the certain amount of the first currency to calculate a quantity of the desired cryptocurrency worth approximately the certain amount of the first currency. In some embodiments, calculation engine 224 may determine any fees or other costs associated with exchanging the first currency for the cryptocurrency, such as any transaction fees and/or service fees. In such an example, calculation engine 224 determines a second amount of the cryptocurrency based at least in part upon the quantity of the cryptocurrency and any fees (e.g., the second amount of the cryptocurrency is equivalent to the quantity of the cryptocurrency less any fees).

Calculation engine 224 may communicate the optimal exchange rate, the first amount, the second amount, and/or any other suitable information for a particular purpose to transformation engine 214. In response to receiving such information from calculation engine 224, transformation engine 214 may associate the first amount of the first currency with customer account 203. For example, transformation engine 214 may initiate a debit to the particular customer account 203 in the first amount (plus any fees and other costs) in the first currency. Transformation engine 214 may then transfer the first amount of the first currency into a first float account 204 associated with the first currency via links 116.

Transformation engine 214 may also associate the second amount of the cryptocurrency with a second float account 204 associated with the second currency (e.g., the cryptocurrency). For example, transformation engine 214 may withdraw (or otherwise debit) the second amount of the cryptocurrency from the second float account 204. Transformation engine 214 may then transfer the second amount of the cryptocurrency to customer 102. For example, transformation engine 214 may deposit (or otherwise credit) the second amount of the cryptocurrency in the particular customer account 203. In certain embodiments, transferring the second amount of the cryptocurrency may include initiating a deposit of the second amount of the cryptocurrency in the particular customer account 203.

The operation of enterprise cryptocurrency server 130, with respect to transformation engine 214, will now be discussed (as well as conversion engine 216, calculation engine 224, and exchange engine 228). Generally, customer 102 may use the services provided by enterprise cryptocurrency environment 100 to exchange one currency for another currency. More specifically, customer 102 may use device 110 to request a currency exchange. In certain embodiments, customer 102 may request to exchange a first amount of a first currency (e.g., an input currency) in a customer account 203 for a second currency (e.g., an output currency), such as for a cryptocurrency. According to some embodiments, the first currency and/or the second currency may be a type of cryptocurrency. Device 110 may communicate this request to enterprise cryptocurrency server 130 over network 120 via links 116. In response to receiving the request for a currency exchange, enterprise cryptocurrency server 130 may retrieve data associated with exchanging the first currency for the second currency. In certain embodiments, this data may be used to determine whether the requested exchange is optimal. For example, a customer 102 may request to execute a currency exchange if the exchange is optimal. As a result, enterprise cryptocurrency server 130 may use conversion engine 216 to retrieve current data associated with the requested exchange, such as current price data, market data, volatility data, exchange rate data, economic risk data, or any other data that may be suitable for a particular purpose over network 120 via links 116.

After retrieving current data associated with the requested exchange, enterprise cryptocurrency server 130 may determine whether the conversion is optimal. Enterprise cryptocurrency server 130 may do so by using conversion engine 216 to compare and analyze the current data associated with the exchange. Conversion engine 216 may compare and analyze time factors, price factors associated with currencies (such as the value of various currencies), price factors associated with cryptocurrencies (such as the value of various cryptocurrencies), volume of currencies, volume of cryptocurrencies, availability of currencies, availability of cryptocurrencies, popularity of currencies, popularity of cryptocurrencies, volatility of currencies, volatility of cryptocurrencies, economic risk factors, current currency exchange rates, or any other factors that may facilitate determining the conversion is optimal. For example, conversion engine 216 may determine that the conversion is optimal based on financial advantages that may be gained by the enterprise and/or customer 102. As another example, conversion engine 216 may determine that the conversion is optimal based on a value of a particular cryptocurrency as compared to a value of various other cryptocurrencies. As yet another example, conversion engine 216 may determine the conversion is optimal based at least in part upon a set of conversion rules. In certain embodiments, if conversion engine 216 calculates the conversion at a first time before a date threshold and determines that the conversion is not optimal (e.g. the conversion at the first time is less than a benefit threshold), conversion engine 216 may calculate the conversion at a second time before the date threshold and determine that the conversion is optimal (e.g., the conversion at the second time is greater than the benefit threshold).

According to certain embodiments, enterprise cryptocurrency server 130 may communicate a message to customer 102 if the requested exchange is not optimal. For example, enterprise cryptocurrency server 130 may use conversion engine 216 to communicate a message to customer 102 over network 120 via links 116 indicating that the exchange is not optimal.

After determining that the requested exchange is optimal, enterprise cryptocurrency server 130 may determine a plurality of exchange rates for exchanging the first currency for the second currency. For example, enterprise cryptocurrency server 130 may use calculation engine 224 to determine a plurality of exchange rates by retrieving information associated with exchanging various currencies, such as exchanging a fiat currency for cryptocurrency (or vice versa), over network 120 via links 116.

After determining the exchange rates, enterprise cryptocurrency server 130 may determine the optimal exchange rate for performing the currency exchange. For example, calculation engine 224 may determine the optimal exchange rate by considering various factors such as current exchange rates, time factors, price factors associated with particular currencies, price factors associated with particular cryptocurrencies, economic risk factors, or any other information. As another example, calculation engine 224 may determine the optimal exchange rate by selecting a particular cryptocurrency the first currency should be exchanged, based on, for example, financial advantages that may be gained by customer 102.

After determining the optimal exchange rate, enterprise cryptocurrency server 130 may determine a first amount of the first currency to be exchanged. For example, calculation engine 224 may use information (e.g., information included in the request) received over network 120 via links 116 to determine the first amount of the first currency. Enterprise cryptocurrency server 130 may then transfer the first amount of the first currency into a first float account 204 associated with the first currency. Enterprise cryptocurrency server 130 may do this by using transformation engine 214 to associate the first amount of the first currency with the particular customer account 203, which may initiate a debit to the particular customer account 203 in the first amount (plus any fees and other costs) in the first currency. The first amount of the first currency may then be transferred to the first float account 204 associated with the first currency over network 120 via links 116.

Enterprise cryptocurrency server 130 may also determine the second amount of the cryptocurrency. For example, calculation engine 224 may use the optimal exchange rate to determine a quantity of the cryptocurrency approximately equivalent to the first amount of the first currency. The quantity of the cryptocurrency may then be used to determine the second amount of the cryptocurrency less any fees or costs associated with the requested exchange. In certain embodiments, equivalence may be determined at the time the request was made (e.g., determined in real-time) or within a window of time (e.g., determined in batch time).

After determining the second amount of the cryptocurrency, enterprise cryptocurrency server 130 may associate the second amount of the cryptocurrency with a second float account 204 associated with the cryptocurrency. Enterprise cryptocurrency server 130 may do so utilizing transformation engine 214. Associating the second amount of the cryptocurrency with the second float account 204 may result in a credit to the second float account 204 in the second amount of the cryptocurrency. In certain embodiments, once the second amount of the cryptocurrency is associated with second float account 204, enterprise cryptocurrency exchange server 130 may determine whether an amount of funds in second float account 204 is below a threshold. For example, transformation engine 214 may monitor an amount of funds in second float account 204, and in response to the amount of funds in second float account 204 being below a certain threshold, initiate the purchase of a quantity of the cryptocurrency. Transformation engine 214 may initiate the purchase by communicating a request over network 120 via links 116 to an exchange 140 to purchase the quantity of the cryptocurrency. Payment for the purchase may be made by deducting the appropriate funds from another float account 204 associated with the enterprise. Upon payment, enterprise cryptocurrency server 130 may transfer the quantity of the cryptocurrency to second float account 204.

After determining that the amount of funds in second float account 204 is above the certain threshold or after transferring the purchased quantity of the cryptocurrency to second float account 204, enterprise cryptocurrency server 130 may transfer the second amount of the cryptocurrency to customer 102. More specifically, enterprise cryptocurrency server 130 may use transformation engine 214 to transfer the second amount of the cryptocurrency to customer 102 over network 120 via links 116. In certain embodiments, the second amount of the cryptocurrency may be transferred directly to a particular customer account 203 associated with the particular customer 102.

In certain embodiments, enterprise cryptocurrency server 130 may use exchange engine 228 (in addition to transformation engine 214) to execute the exchange of a first currency in a customer account 203 for a cryptocurrency. Exchange engine 228 may be any software, hardware, firmware, or combination thereof capable of withdrawing or depositing currency or cryptocurrency. According to some embodiments, exchange engine 228 may be a set of instructions stored in memory 202 that may be executed by processor 201. Exchange engine 228 may facilitate the debit of an amount of a first currency requested to be exchanged. For example, transformation engine 214 may initiate the debit of a particular customer account 203 in a certain amount (e.g., a first amount) in a first currency by communicating a message to exchange engine 228. In response, exchange engine 228 may execute withdrawing the certain amount of the first currency from the particular customer account 203, thereby providing funds for the exchange to transformation engine 214. Exchange engine 228 may also facilitate the transfer of the second amount of the cryptocurrency to customer 102. For example, transformation engine 214 may initiate a deposit of a certain amount (e.g., a second amount) of a cryptocurrency in a particular customer account 203. In response, exchange engine 228 may execute depositing the certain amount of the cryptocurrency in the particular customer account 203, thereby providing customer 102 with the desired currency.

Enterprise cryptocurrency server 130 may include aggregation engine 222. Generally, aggregation engine 222 may facilitate aggregating and storing cryptocurrency, such as aggregating certain quantities of cryptocurrency deposited by customers in a cryptocurrency account. More specifically, aggregation engine 222 may be any software, hardware, firmware, or combination thereof capable of initiating or performing a transaction to facilitate collecting and aggregating cryptocurrency. According to some embodiments, aggregation engine 222 may be a set of instructions stored in memory 202 that may be executed by processor 201.

Using information received over links 116, aggregation engine 222 may perform various transactions. According to some embodiments, aggregation engine 222 may determine a public key associated with a customer account 203. For example, customer 102 may request to deposit a certain amount of cryptocurrency in a particular customer account 203. As another example, customer 102 may request to withdraw a certain amount of cryptocurrency from a particular customer account 203. In response to the request, aggregation engine 222 may determine the public key associated with the particular customer account 203. To determine the public key, aggregation engine 222 may retrieve information included in customer account 203.

In certain embodiments, aggregation engine 222 may determine that a customer 102 authorized a request. For example, a customer 102 may be prompted to input user credentials before sending a request. User credentials may be the user's name, a username, a password, an account name, a personal identification number, a private key, a social security number, a credit card number, any combination thereof, or any other information that can authenticate a customer 102. In such an example, user credentials may be included in the request. Aggregation engine 222 may utilize enterprise cryptocurrency server 130 to retrieve information associated with the request, such as user credentials. Aggregation engine 222 may then compare the user credentials included in the request against the user credentials contained in the particular customer account 203 to determine whether customer 102 authorized the request.

Aggregation engine 222 may also determine a value approximately equivalent to the amount of cryptocurrency requested to be deposited (or withdrawn) by customer 102. In certain embodiments, aggregation engine 222 may determine the value based on various factors associated with the particular cryptocurrency to be deposited, such as cryptocurrency price, volatility of the cryptocurrency, popularity of the cryptocurrency, availability of the cryptocurrency, any potential risk factor that may be associated with the particular cryptocurrency, any fees or other costs associated with depositing an amount of the particular cryptocurrency, any other factors associated with the particular cryptocurrency, or any combination of the preceding. In other words, if customer 102 requests the deposit of a certain amount of funds to customer account 203, then aggregation engine 222 may determine a value of the cryptocurrency worth approximately the certain amount of funds. Equivalence may be determined at the time of the request (e.g., real-time) or within a window of time (e.g., the end of the day).

In response to determining the value, aggregation engine 222 may associate the value with customer account 203. For example, in response to a request to deposit a certain amount of cryptocurrency, aggregation engine 222 may credit the value of the certain amount of cryptocurrency to the particular customer account 203. Alternatively, in response to a request to withdraw a certain amount of cryptocurrency, aggregation engine 222 may debit the value of the certain amount of cryptocurrency to the particular customer account 203. In certain embodiments, the value may refer to a virtual representation of the amount of cryptocurrency that is associated with customer account 203.

Aggregation engine 222 generally collects and aggregates cryptocurrency deposited by customers 102 in an account at a financial institution (e.g., a bank). For example, aggregation engine 222 may transfer an amount of cryptocurrency associated with customer 102 to an enterprise account, such as a float account 204, over network 120 via links 116 and aggregate the amount of cryptocurrency with an aggregated amount of cryptocurrency in float account 204. By doing so, enterprise cryptocurrency server 130 may utilize equivalent amounts/values of cryptocurrency stored in float account 204 and/or aggregation account 206 to conduct transactions on the behalf of customer 102 that may want to utilize such cryptocurrency and debit/credit customer accounts 203 as appropriate. In certain embodiments, enterprise accounts (e.g., float accounts 204) may be stored in memory 202. According to some embodiments, float accounts 204 may be stored in one or more text files, tables in a relational database, or any other suitable data structure capable of storing information.

Each float account 204 may be associated with an enterprise, financial institution, or any other entity that may have an account at a financial institution (e.g., a bank). In certain embodiments, float account 204 may include information that can be used by aggregation engine 222 to retrieve, store, aggregate, deposit, withdraw, or otherwise transfer an amount of cryptocurrency to or from float account 204. For example, a float account 204 may include information such as an account number, cryptocurrency account balance (in one or more cryptocurrencies), routing information (e.g., a unique identifier, private key associated with a float account 204, public key associated with a float account 204, and/or any other suitable quantifiable information associated with depositing and/or withdrawing cryptocurrencies in a float account 204), location information, or any other information suitable for a particular purpose that an enterprise may have associated with a float account 204, such as a cryptocurrency account.

In some embodiments, a float account 204 includes a total amount of cryptocurrency (in one or more cryptocurrencies) aggregated and currently stored in the particular float account 204. Specifically, the aggregated amount of cryptocurrency may include at least a portion of funds from previous customer deposits of cryptocurrency aggregated and stored in float account 204. For example, aggregation engine 222 may collect and aggregate any number of customer deposits (by one or more customers 102 of an enterprise, financial institution, or other entity) in float account 204. In such an example, the funds may then be available to the enterprise, financial institution, or other entity for particular purposes.

According to certain embodiments, aggregation engine 222 may also deduct a certain amount of funds from a float account 204. As an example, in response to a customer 102 requesting to withdraw a certain amount of funds from a particular customer account 203, aggregation engine 222 may debit float account 204 in the certain amount of cryptocurrency (e.g., deduct the certain amount of cryptocurrency from the aggregated amount of cryptocurrency in float account 204). Aggregation engine 222 may then withdraw the amount of cryptocurrency from float account 204 and transfer those funds to customer 102 or another recipient. In such an example, aggregation engine 222 may determine a value approximately equivalent to the amount of cryptocurrency and associate that value with customer account 203 (e.g., credit the value of the amount of cryptocurrency to customer account 203).

Aggregation engine 222 may also facilitate securing a public key associated with a customer account 203. In certain embodiments, aggregation engine 222 may communicate a message over network 120 via links 116 requesting that a public key be secured. In some embodiments, aggregation engine 222 may determine whether the public key is secure. In such an embodiment, aggregation engine 222 may communicate, in response to determining that the public key is secure, a message (e.g., a confirmation) confirming the public key is secure to customer 102 associated with customer account 203.

The operation of enterprise cryptocurrency server 130, with respect to aggregation engine 222, will now be discussed. Generally, customer 102 may use the services provided by enterprise cryptocurrency environment 100 to deposit or withdraw cryptocurrency from a customer account 203. More specifically, customer 102 may use device 110 to request that an amount of cryptocurrency be deposited to customer account 203 associated with an institution operated by an enterprise. As a result, an amount of cryptocurrency may be deposited to a float account 204 associated with the institution operated by the enterprise. Device 110 may communicate this request to enterprise cryptocurrency server 130 over network 120 via links 116. In response to receiving the request for a deposit of an amount of cryptocurrency, enterprise cryptocurrency server 130 may determine a public key associated with customer account 203. To do so, enterprise cryptocurrency server 130 may use aggregation engine 222 to retrieve information included in customer account 203 that may be used to determine the public key.

Enterprise cryptocurrency server 130 may use the public key to receive the amount of cryptocurrency to be deposited over network 120 via links 116. After receiving the amount of cryptocurrency, enterprise cryptocurrency server 130 may determine a value of the cryptocurrency approximately equivalent to the amount of cryptocurrency to be deposited. For example, aggregation engine 222 may determine an approximately equivalent value of the amount of cryptocurrency based on a price associated with the particular cryptocurrency. Enterprise cryptocurrency server 130 may then associate the value of the amount of cryptocurrency with customer account 203. For example, aggregation engine 222 may credit customer account 203 based on the value of the amount of cryptocurrency.

After associating the value of the amount of cryptocurrency with customer account 203, enterprise cryptocurrency server 130 may aggregate the amount of cryptocurrency with an aggregated amount of cryptocurrency in float account 204. For example, aggregation engine 222 may transfer the amount of cryptocurrency over network 120 via links 116 to float account 204. In some embodiments, the amount of cryptocurrency may be transferred over network 120 via links 116 to float account 204 based at least in part on a public key associated with float account 204. After transferring the amount of cryptocurrency, enterprise cryptocurrency server 130 may deposit the amount to cryptocurrency in float account 204. For example, aggregation engine 222 may add the amount of cryptocurrency to the aggregated amount of cryptocurrency in float account 204 to yield an updated aggregated amount of cryptocurrency in float account 204.

After aggregating the cryptocurrency, enterprise cryptocurrency server 130 may facilitate securing a public key associated with customer account 203 in float account 204. For example, enterprise cryptocurrency server 130 may use aggregation engine 222 to communicate a request to secure the public key to online vault 210 or offline vault 212. As a result, the public key may be secured in float account 204. In certain embodiments, enterprise cryptocurrency server 130 may use aggregation engine 222 to determine whether online vault 210 or offline vault 212 secured the public key. In response to determining online vault 210 or offline vault 212 secured the public key, enterprise cryptocurrency server 130 may utilize aggregation engine 222 to communicate a message (e.g., a confirmation) confirming the public key is secure over network 120 via links 116 to device 110.

In certain embodiments, customer 102 may use device 110 to withdraw a certain amount of cryptocurrency from customer account 203. In response to receiving a request to withdraw an amount of cryptocurrency, enterprise cryptocurrency server 130 may withdraw the amount of cryptocurrency from float account 204. For example, aggregation engine 222 may debit the amount of cryptocurrency from float account 204, thereby deducting that amount of cryptocurrency from the aggregated amount of cryptocurrency to yield an updated aggregated amount of cryptocurrency in float account 204.

After debiting float account 204, enterprise cryptocurrency server 130 may determine a value approximately equivalent to the certain amount of cryptocurrency requested to be withdrawn. Enterprise cryptocurrency server 130 may do so by using aggregation engine 222. Enterprise cryptocurrency server 130 may then associate the value of the amount of cryptocurrency with customer account 203. For example, aggregation engine 222 may debit customer account 203 based on the value of the amount of cryptocurrency. After associating the value of the amount of cryptocurrency with customer account 203, enterprise cryptocurrency server 130 may transfer the amount of cryptocurrency to customer 102 or another recipient. As an example, aggregation engine 222 may transfer the amount of cryptocurrency over network 120 via links 116 to customer 102 or another recipient, such as a recipient associated with third party enterprise server 150.

Enterprise cryptocurrency server 130 may be used by an enterprise to initiate and execute actions and transactions that allow the enterprise to complete a cryptocurrency transaction request. Enterprise cryptocurrency server 130 may include encoding engine 218. Generally, encoding engine 218 facilitates encoding cryptocurrency information associated with a customer account 203 onto a payment instrument. More specifically, encoding engine 218 may be any software, hardware, firmware, or combination thereof capable of encoding cryptocurrency information onto a payment instrument. In certain embodiments, encoding engine 218 may be a set of instructions stored in memory 202 that may be executed by processor 201.

Encoding engine 218 may encode various cryptocurrency information associated with a customer account 203 onto a payment instrument. Examples of a payment instrument may include a credit card, debit card, ATM card, charge card, stored-value card, fleet card, gift card, electronic purse (such as a mobile wallet), or any other suitable payment instrument that may be used by a customer 102 to make a payment in cryptocurrency for a purchase or other obligation. Each payment instrument may be associated with one or more customer accounts 203. For example, encoding cryptocurrency information onto a payment instrument may refer to electronically linking one or more customer accounts 203 associated with customer 102 to the payment instrument. Such customer accounts 203 may be associated with cryptocurrency.

In certain embodiments, cryptocurrency information encoded onto a payment instrument may include information that can be used by enterprise cryptocurrency server 130 to execute a transaction involving cryptocurrency. For example, cryptocurrency information may include information such as an account number (e.g., a cryptocurrency address), account balance, customer public key, customer private key, location information, or any other information suitable for a particular purpose associated with one or more accounts that customer 102 may have associated with a particular enterprise. In some embodiments, encoding engine 218 may associate a payment instrument with one or more cryptocurrency addresses associated with a customer account 203 associated with the particular customer 102.

To provide a customer 102 with electronic access to cryptocurrency in a customer account 203, encoding engine 218 generally encodes, onto the payment instrument, such cryptocurrency information that may be used to identify the particular customer account 203. For example, encoding engine 218 may encode a customer public key associated with customer account 203 onto the payment instrument. As another example, encoding engine 218 may encode a cryptocurrency address associated with customer account 203 onto the payment instrument. According to some embodiments, the public key or cryptocurrency address may be a sequence of letters and numbers associated with customer account 203 and may refer to an account number to which funds of cryptocurrency may be received and/or stored.

In certain embodiments, encoding engine 218 may encode a token onto a payment instrument. For example, encoding engine 218 may generate a token that represents cryptocurrency information, such as a public key, and encode the generated token onto the payment instrument. In other words, encoding engine 218 may create a new alias for the cryptocurrency information using a unique token (e.g., a tokenized representation of the public key), thereby securing the cryptocurrency information.

Enterprise cryptocurrency server 130 may also include transaction engine 220. In general, transaction engine 220 may initiate the execution of financial transactions that involve cryptocurrency according to any one of a variety of embodiments suitable for a particular purpose. More specifically, transaction engine 220 may be any software, hardware, firmware, or combination thereof capable of executing a cryptocurrency transaction. In certain embodiments, encoding engine 218 may be a set of instructions stored in memory 202 that may be executed by processor 201.

Using information received over links 116, transaction engine 220 may perform various transactions. According to some embodiments, transaction engine 220 may facilitate the execution of a cryptocurrency transaction using a payment instrument. For example, a customer 102 may use a payment instrument to request to make a transaction for a certain amount of funds of cryptocurrency in a particular customer account 203. In response to the request, transaction engine 220 may determine cryptocurrency information encoded on the payment instrument that may be used to execute the cryptocurrency transaction, such as cryptocurrency information associated with the particular customer account 203.

In certain embodiments, a customer 102 may request to execute a cryptocurrency transaction in response to a recipient, such as a merchant, requesting a payment be made in cryptocurrency. As an example, a customer 102 may be prompted for a payment in an amount of cryptocurrency at a payment terminal associated with the recipient of which may be associated with a third party enterprise server 150 (e.g., a point-of-sale device in a store or any other device that can receive payment from a payment instrument). In response, customer 102 may use a payment instrument at the payment terminal to request a cryptocurrency transaction. Upon initiating the payment, third party enterprise server 150 may communicate a request for the cryptocurrency payment over network 120 via links 116.

Transaction engine 220 may determine cryptocurrency information associated with customer account 203 that may be used to execute the cryptocurrency transaction. For example, the request may indicate a payment instrument encoded with cryptocurrency information, such as a public key. The public key may be used to identify the particular customer account 203 associated with customer 102. As another example, the request may indicate a payment instrument encoded with a token. In such an example, transaction engine 220 may translate the token to the public key (e.g., convert the token back to the public key) identifying the particular customer account 203. In certain embodiments, transaction engine 220 may determine cryptocurrency information associated with customer account 203 based on any other cryptocurrency information encoded on the payment instrument and/or indicated by the request.

Transaction engine 220 may also determine cryptocurrency information associated with a recipient of funds of cryptocurrency. For example, the request may include cryptocurrency information that may be used to transfer the amount of cryptocurrency to the recipient. Cryptocurrency information associated with a recipient that may be included in the request may be information such as a recipient public key (which may be associated with a third-party account or a customer account 203), a recipient cryptocurrency address, or any other cryptocurrency information that may be used to execute a cryptocurrency transaction. For example, a request communicated by a payment terminal associated with third party enterprise server 150, such as a request communicated in response to a merchant prompting customer 102 to make a payment in cryptocurrency, may include a recipient cryptocurrency address. In certain embodiments, the recipient may be another customer 102 of the enterprise. For example, the request may include a recipient public key associated with another customer account 203.

Using cryptocurrency information associated with a customer account 203, transaction engine 220 may associate an amount of cryptocurrency with customer account 203. For example, in response to a request to make a transaction in a certain amount of cryptocurrency, transaction engine 220 may debit the particular customer account 203 in the certain amount (as well as any fees and other costs) of cryptocurrency.

Transaction engine 220 may also initiate the transfer of an amount of cryptocurrency to a recipient. For example, transaction engine 220 may communicate a request to transfer the certain amount of cryptocurrency to the recipient over network 120 via links 116. Transaction engine 220 may do so using a recipient cryptocurrency address, recipient public key, or any other suitable cryptocurrency information associated with the recipient. In certain embodiments, transaction engine 220 may directly transfer the certain amount of cryptocurrency to the recipient. For example, if the recipient is another customer 102, transaction engine 220 may transfer the certain amount of cryptocurrency to a particular customer account 203 associated with that customer 102.

In certain embodiments, transaction engine 220 may provide overdraft protection for a customer 102. For example, before debiting a particular customer account 203, transaction engine 220 may determine whether a customer account 203 comprises a minimum amount of cryptocurrency to execute the requested cryptocurrency transaction. In certain embodiments, if a customer account 203 does not comprise the minimum amount of cryptocurrency, transaction engine 220 may not execute the cryptocurrency transaction.

In alternative embodiments, if customer account 203 does not comprise the minimum amount of cryptocurrency, transaction engine 220 may initiate a purchase of a quantity of cryptocurrency from a cryptocurrency exchange, such as exchange 140a or exchange 140b. Upon purchasing the quantity of cryptocurrency, transaction engine 220 may transfer the quantity of cryptocurrency to the particular customer account 203 over network 120 via links 116. In certain embodiments, payment for the purchase may be made by deducting the appropriate funds from a customer account 203 associated with customer 102 in a different currency.

According to some embodiments, if a customer account 203 does not comprise the minimum amount of cryptocurrency, transaction engine 220 may determine whether customer account 203 comprises a quantity of a second currency (such as a fiat currency or a different cryptocurrency). If customer account 203 comprises a quantity of a second currency, transaction engine 220 may associate that quantity with customer account 203. Transaction engine 220 may do so by debiting customer account 203 in the quantity of the second currency. Transaction engine 220 may then utilize transformation engine 214 to transfer the quantity of the second currency to a first float account 204 associated with the second currency.

Once the quantity of the second currency has been transferred to first float account 204, transaction engine 220 may determine a second amount of cryptocurrency approximately equivalent to the quantity of the second currency. Transaction engine 220 may utilize transformation engine 214 to associate the second amount of cryptocurrency with a second float account 204 associated with the cryptocurrency. As a result, second float account 204 may be debited in the second amount of cryptocurrency. Transaction engine 220 may then transfer the second amount of cryptocurrency to customer account 203 over network 120 via links 116.

Transaction engine 220 may store or retrieve information about any transaction in transactions 208. Transactions 208 may be any information associated with any transaction associated with enterprise cryptocurrency server 130. In certain embodiments, transactions 208 may be stored in one or more text files, tables in a relational database, or any other suitable data structure capable of storing information.

The operation of enterprise cryptocurrency server 130, with respect to encoding engine 218 and transaction engine 220, will now be discussed. In operation, customer 102 may use the services provided by enterprise cryptocurrency server 130 to execute a transaction with cryptocurrency. More specifically, customer 102 may wish to use a payment instrument to execute transactions with cryptocurrency. As a result, enterprise cryptocurrency server 130 may encode cryptocurrency information associated with customer account 203 onto a payment instrument. For example, encoding engine 218 may encode various cryptocurrency information associated with a customer account 203, such as a cryptocurrency address or a public key, onto a payment instrument to provide customer 102 with electronic access to cryptocurrency in customer account 203.

After encoding cryptocurrency information onto a payment instrument, customer 102 may use the payment instrument to request a certain amount of cryptocurrency be transferred to a recipient as payment for a purchase or other obligation. As a result, the amount of cryptocurrency may be deposited into an account associated with the recipient. In certain embodiments, the request may be communicated to enterprise cryptocurrency server 130 from device 110, third party enterprise server 150, or any other device that may be associated with a payment terminal, over network 120 via links 116.

In response to receiving the request, enterprise cryptocurrency server 130 may determine cryptocurrency information associated with customer account 203. For example, the request may indicate a payment instrument encoded with cryptocurrency information, such as a payment instrument encoded with a public key or a token. Enterprise cryptocurrency server 130 may use transaction engine 220 to determine the cryptocurrency information encoded on the payment instrument to thereby identify the particular customer account 203 to be debited in the certain amount of cryptocurrency. Enterprise cryptocurrency server 130 may also determine cryptocurrency information associated with the recipient. To do so, enterprise cryptocurrency server 130 may use transaction engine 220 to determine cryptocurrency information included in the request that may be used to transfer the amount of cryptocurrency to the recipient, such as a recipient cryptocurrency address or recipient public key associated with a third-party account or another customer account 203.

After determining cryptocurrency information associated with customer account 203 and cryptocurrency information associated with the recipient, enterprise cryptocurrency server 130 may determine whether customer account 203 comprises a minimum amount of cryptocurrency to execute the cryptocurrency transaction. For example, transaction engine 220 may determine a quantity of cryptocurrency equivalent to the amount of cryptocurrency to be used in the requested cryptocurrency transaction. Transaction engine 220 may then determine whether the quantity of cryptocurrency exceeds the quantity of cryptocurrency associated with customer account 203. According to some embodiments, the requested cryptocurrency transaction may not be executed if customer account 203 does not comprise the equivalent quantity of cryptocurrency (i.e., if customer account 203 does not comprise sufficient funds).

In certain embodiments, if customer account 203 does not comprise sufficient funds, enterprise cryptocurrency server 130 is capable of determining the difference between the amount of cryptocurrency to be used in the requested transaction and the quantity of cryptocurrency associated with customer account 203 and facilitate the purchase of the difference. In such an embodiment, enterprise cryptocurrency server 130 may initiate the purchase of the difference in quantity of cryptocurrency from an exchange 140, such as exchange 140a or 140b. Enterprise cryptocurrency server 130 may do this by using transaction engine 220 to communicate a request over network 120 via links 116 to exchange 140a or exchange 140b to purchase the difference in quantity of cryptocurrency. Transaction engine 220 may then transfer at least a portion of the difference in quantity of cryptocurrency (e.g., the difference in quantity of cryptocurrency less any fees or other costs) over network 120 via links 116 to customer account 203. Payment for the purchase may be made by deducting the appropriate funds from customer account 203 in a second currency.

Alternatively, if customer account 203 does not comprise sufficient funds, enterprise cryptocurrency server 130 may determine whether customer account 203 comprises a quantity of a second currency. Upon determining customer account 203 does comprise the quantity of the second currency, enterprise cryptocurrency server 130 may use float accounts 204 to exchange the quantity of the second currency for an approximately equivalent quantity of cryptocurrency (less any fees or other costs) that may be deposited into customer account 203. For example, transformation engine 214 may transfer the quantity of the second currency to first float account 204 associated with the second currency over network 120 via links 116. In such an example, transformation engine 214 may then debit second float account 204 associated with the cryptocurrency in a quantity of cryptocurrency approximately equivalent to the quantity of the second currency. After debiting second float account 204, transformation engine 214 may transfer the quantity of cryptocurrency over network 120 via links 116 to customer account 203. As a result, customer account 203 may comprise a sufficient amount of cryptocurrency to execute the requested cryptocurrency transaction.

After determining customer account 203 comprises a minimum amount of cryptocurrency, enterprise cryptocurrency server 130 may associate the amount of cryptocurrency with customer account 203. To do so, enterprise cryptocurrency server 130 may use transaction engine 220 to debit customer account 203 in the certain amount of cryptocurrency. Enterprise cryptocurrency server 130 may then initiate a transfer of the certain amount of cryptocurrency to the recipient. For example, transaction engine 220 may communicate a request over network 120 via links 116 to third party enterprise server 150 to transfer the certain amount of cryptocurrency to the recipient. As another example, transaction engine 220 may communicate a request over network 120 via links 116 to a recipient cryptocurrency address associated with the recipient to transfer the certain amount of cryptocurrency to the recipient. Communicating such a request may result in the certain amount of cryptocurrency being deposited into a recipient account, thereby confirming the requested cryptocurrency transaction for a payment or other obligation associated with customer 102.

Enterprise cryptocurrency server 130 may include alert engine 230. In general, alert engine 230 may alert an enterprise or a customer of potentially suspicious activity associated with a cryptocurrency transaction. More specifically, alert engine 230 may be any software, firmware, or combination thereof capable of identifying a party to a cryptocurrency transaction as a known user and providing an alert if there is suspicious activity associated with a cryptocurrency transaction based on the information regarding the known user. In some embodiments, alert engine 230 may be a set of instructions stored in memory 202 that may be executed by processor 201.

Alert engine 230 may communicate various types of alerts. According to some embodiments, if alert engine 230 determines that the cryptocurrency transaction is suspicious based at least in part on a user profile, then it may communicate an alert to the enterprise that the cryptocurrency transaction is suspicious. For example, if the user profile of the user requesting to perform the transaction contains a public key associated with previous transactions that are suspicious, then alert engine 230 may inform the enterprise. In some embodiments, alert engine 230 may communicate an alert to a user who is a customer of the enterprise if the user profile of the third party indicates suspicious activity. For example, if the third party user profile contains an IP address from an untrustworthy country, alert engine 230 may inform the user of the suspicious IP address specifically or may generally inform the user that the third party to the requested transaction is suspicious.

Alert engine 230 may also retrieve block chain information associated with the cryptocurrency transaction to determine block chain cryptoidentifiers. In certain embodiments, alert engine 230 may identify various public keys, IP addresses, or cryptocurrency wallets associated with either the sender or the receiver of the cryptocurrency transaction. Using these identified block chain cryptoidentifiers, alert engine 230 may determine whether a block chain cryptoidentifier matches a stored cryptoidentifier associated with one of the plurality of user profiles. In certain embodiments, alert engine 230 also determines that one of the plurality of user profiles is associated with either the user or the third party of the requested cryptocurrency transaction based on the determined match. For example, if alert engine 230 identifies a public key of the third party to the cryptocurrency transaction from the block chain information and matches that to a public key from a stored user profile, then alert engine 230 may associate the third party to the user profile.

Alert engine 230 may also determine whether the requested cryptocurrency transaction is potentially suspicious based at least in part upon the associated user profile. In certain embodiments, alert engine 230 may calculate a risk score (for example, based on customer history, account balance, and type of potentially suspicious activity) for the user profile. In some embodiments, alert engine 230 may calculate separate factor scores based on individual pieces of information in the user profile to calculate the risk score for the user profile. For example, alert engine 230 may calculate a first factor score based on the transaction history of the user profile and calculate a second factor score based on the IP address associated with the user profile. Alert engine 230 may use the risk score and factor scores to determine whether the requested cryptocurrency transaction is suspicious.

The operation of enterprise cryptocurrency server 130, with respect to alert engine 230 will now be discussed. Generally, enterprise cryptocurrency server 130 may use alert engine 230 to facilitate identification of a party to a transaction as a known user and alerting of suspicious activity associated with a cryptocurrency transaction based on the information regarding the known user. More specifically, alert engine 230 may store a plurality of user profiles. In some embodiments the user profile is associated with a customer 102 of the enterprise (e.g., a person who has at least one account with the enterprise). In some embodiments, the user profile is associated with a known party, but that known party does not have at least one account with the enterprise. For example, there may be a user profile for a beneficiary of an account, a power of attorney for an account, a third party the enterprise knows is suspicious or untrustworthy, or a transactor, which is a party who deposits money to an account. An example of a transactor is the night manager of a restaurant who deposits money into the restaurant's account. Thus, the restaurant would have a user profile and the night manager would also have a user profile even though the user does not have an account with the enterprise. In some embodiments, the plurality of user profiles are stored in memory 202 or customer accounts 203. In some embodiments, a user profile comprises information associated with the user, such as, but not limited to, a user name, a user address, one or more user public cryptocurrency keys, one or more user IP addresses, one or more user cryptocurrency wallets, and a financial transaction history, which may include both fiat and cryptocurrency transactions. According to some embodiments, such transactions may be stored in transactions 208. In some embodiments, not every possible user or third party has a stored user profile.

Alert engine 230 may receive a request from a user to perform a cryptocurrency transaction with a third party. Examples of cryptocurrency transactions include making a purchase, transferring money from an account, and transferring money to an account. In some embodiments, the user may be a customer of the enterprise, a transactor of the enterprise, a party unknown to the enterprise, or a known party to the enterprise. In some embodiments, the request may be initiated by a user through an enterprise application on device 110. For example, a user may request to transfer funds from a cryptocurrency account to a third party on device 110. In some embodiments, the request may be initiated by user utilizing a bank card, such as a debit card or credit card, when making a purchase.

Next, alert engine 230 may retrieve block chain information associated with the cryptocurrency transaction and determine at least one block chain cryptoidentifier from the block chain information. In some embodiments, a block chain cryptoidentifier may comprise a public key, an IP address, and one or more cryptocurrency wallets. In some embodiments, the block chain cryptoidentifier may be from either the user or the third party associated with the requested transaction. For example, block chain information may include a user public key, a third party public key, and a user IP address, but not a third party IP address. Thus, in this example, alert engine 230 determines three block chain identifiers: the user public key, a third party public key, and a user IP address.

Alert engine 230 may then compare the block chain cryptoidentifier and the stored cryptoidentifier associated with one of the plurality of user profiles. In some embodiments, alert engine 230 may compare the block chain cryptoidentifier and the stored cryptoidentifier by performing a search through all of the stored customer cryptoidentifiers associated with the user profiles. For example, if the block chain cryptoidentifier comprises a public key of "examplepublickey1," then alert engine 230 will search through all of the user profiles and compare this public key to any of the stored public keys in the user profiles.

Then, alert engine 230 may determine whether the block chain cryptoidentifier and the stored cryptoidentifier associated with one of the plurality of user profiles match. In some embodiments, the block chain cryptoidentifier must be identical to the stored cryptoidentifier associated with one of the plurality of user profiles. For example, alert engine 230 may determine that the block chain public key of "examplepublickey1" matches the public key in a user profile of "examplepublickey1," but will determine that the block chain public key of "examplepublickey1" does not match the public key in a user profile of "examplepublickey2." In some embodiments, alert engine determines a match when the block chain cryptoidentifier and stored cryptoidentifier associated with one of the plurality of user profiles comprise a certain number of similar characters. For example, alert engine 230 may determine that the block chain public key of "examplepublickey1" matches the public key in a user profile of "examplepublickey2."

If alert engine 230 determines that the block chain cryptoidentifier and the stored cryptoidentifier associated with one of the plurality of user profiles do not match, then the method ends. If alert engine 230 determines that the block chain cryptoidentifier and the stored cryptoidentifier associated with one of the plurality of user profiles match, then alert engine 230 may determine whether one of the plurality of user profiles is associated with the user or the third party based on the retrieved block information and stored cryptoidentifiers associated with one of the plurality of user profiles. In certain embodiments, alert engine 230 may determine that the user is a customer of the enterprise based at least in part upon determining a block chain cryptoidentifier and a stored cryptoidentifier associated with one of the plurality of user profiles are a match. In certain embodiments, alert engine 230 determines that the third party is a transactor of the enterprise. For example, alert engine 230 may determine that the third party receiving the cryptocurrency transaction is the night manager at a restaurant because the third party utilizes public key "examplepublickey1" and the night manager at a restaurant utilizes public key "examplepublickey1." As another example, a customer of the enterprise may request the cryptocurrency transaction without logging into the customer's enterprise account. Thus, the enterprise may not initially recognize who the customer is. However, once determining the public key of the user, alert engine 230 may determine the user is a specific customer, transactor, or known party of the enterprise.

If alert engine 230 determines that one of the plurality of user profiles is not associated with the user or the third party based on the retrieved block information and stored cryptoidentifiers associated with one of the plurality of user profiles, then the method ends. If alert engine 230 determines that one of the plurality of user profiles is associated with the user or the third party based on the retrieved block information and stored cryptoidentifiers associated with one of the plurality of user profiles, then alert engine 230 may calculate a first factor score based at least in part upon the transaction history of the user profile associated with either the user requesting the transaction or the third party in the transaction. In some embodiments, the transaction history may include the entire transaction history of a user or may include only certain transactions. For example, the transaction history may include only transactions over a certain amount of cryptocurrency. As another example, the transaction history may include only transactions within a certain time period, such as transactions that occurred within the last one month, the last one year, or the last five years.

The first factor score may be associated with the potentially suspicious or seemingly fraudulent past transactions associated with the user profile. In some embodiments, suspicious transactions, such as a high value transaction of 1000 units of cryptocurrency, may indicate a higher risk of fraudulent activity and thus increase the first factor score. In some embodiments, alert engine 230 determines the pattern of spending based on the transaction history and is able to determine if the current transaction is a common transaction or an abnormal one compared to the transaction history. For example, if the user associated with the user profile regularly transmits 1000 units of cryptocurrency on a weekly basis, then alert engine 230 may determine the requested transaction of 1000 units of cryptocurrency indicates a lower risk of fraudulent activity and thus decreases the first factor score.

Next, alert engine 230 may calculate a second factor score based at least in part upon the user profile IP address. In some embodiments, alert engine 230 determines a location associated with the user profile IP address. In some embodiments, the determined location may be a physical address, GPS coordinates, a city, a state, or a country. In some embodiments, the second factor score may increase for a location associated with high risk and decrease for a location associated with low risk, depending on the circumstances associated with customer 102. For example, if alert engine 230 determines the location is a country, and that country is commonly associated with fraudulent IP addresses, then the second factor score may increase. In some embodiments, alert engine 230 may compare the requesting user IP address from the block chain information and the user profile IP address to calculate the second factor score. For example, if the user profile IP address is associated with a particular state, but requesting user (which was determined to be associated with this user profile) utilizes an IP address that reflects a location in another state or country, then the second factor score may increase because the requesting user IP address does not match the user profile IP address.

Alert engine 230 may also calculate a risk score for the user profile based at least in part upon the first factor score and the second factor score. In certain embodiments, alert engine 230 calculates a risk score for the user profile based at least in part upon the first factor score and/or the second factor score. For example, if alert engine 230 determines a high second factor score because of a suspicious IP address, then alert engine 230 may determine a high risk score. As another example, if alert engine 230 determines a low first factor score because there are no or very few large transactions in the transaction history of the user profile, then alert engine 230 may calculate a low risk score.

Next, alert engine 230 may determine whether a cryptocurrency transaction is suspicious based at least in part upon the user profile. In some embodiments, alert engine 230 determines the cryptocurrency transaction is suspicious based on at least one of the first factor score, second factor score, and risk score. For example, if the risk score is high, it may indicate the user or third party associated with the user profile has engaged in potentially fraudulent transactions and thus makes it more likely that the current requested transaction may also be suspicious. Alert engine 230 may compare the risk score to one or more thresholds to determine whether the transaction is suspicious. For example, if the risk score is 50, alert engine 230 may determine it is higher than the threshold of 20 and thus alert engine 230 determines the transaction is suspicious.

If alert engine 230, determines the cryptocurrency transaction is not suspicious based at least in part upon the user profile, then the operation of alert engine 230 may conclude. If, however, alert engine 230 determines the cryptocurrency transaction is suspicious based at least in part upon the user profile, then alert engine 230 may communicate an alert to the enterprise that the cryptocurrency transaction is suspicious. In some embodiments, alert engine 230 communicates an alert whether the cryptocurrency transaction is suspicious based on the third party's association with a suspicious user profile or the requesting user's association with a suspicious user profile. In certain embodiments, the alert may include a notification that the cryptocurrency transaction may not be completed based on the suspiciousness of the cryptocurrency transaction. Alert engine 230 may also allow the transaction to be completed, but associate a "flag" or other warning with the user profile associated with either the third party or the requesting user in certain embodiments.

Alert engine 230 may then communicate an alert to the requesting user that cryptocurrency transaction is suspicious based on the user profile associated with the third party. In certain embodiments, the requesting user may be a trusted customer 102 of the enterprise and alert engine 230 may warn customer 102 of the risk in transaction with this third party.

Enterprise cryptocurrency server 130 may include cryptocurrency risk detection engine 232. Generally, risk detection engine 232 determines the amount of risk associated with a cryptocurrency transaction. More specifically, alert engine 230 may be any software, hardware, firmware, or combination thereof capable of determining the risk associated with a cryptocurrency transaction and, based on the determined risk, determining either that there is potentially suspicious activity by a third party or that the transaction is approved because there is little risk associated with the cryptocurrency transaction. In some embodiments, cryptocurrency risk detection engine 232 may be a set of instructions stored in memory 202 that may be executed by processor 201.

Cryptocurrency risk detection engine 232 may detect risk associated with a cryptocurrency transaction and provide various notifications based on the detected risk. In certain embodiments, cryptocurrency risk detection engine 232 calculates a risk score (e.g., based on customer history, account balance, and type of potentially suspicious activity) for performing the cryptocurrency transaction and determines whether the transaction is approved based on that risk score. An example of a notification that cryptocurrency risk detection engine 232 may communicate is a notification to the customer or the third party whether the transaction is approved or not. Cryptocurrency risk detection engine 232 may also determine whether the risk score indicates potentially suspicious activity by the third party and, if so, may notify the customer of the potentially suspicious activity.

Cryptocurrency risk detection engine 232 may receive a request from a customer 102 to perform a cryptocurrency transaction with a third party and retrieve block chain information associated with the transaction. In certain embodiments, cryptocurrency risk detection engine 232 identifies block chain factors from the block chain information and determines whether any block chain factors include, for example, a customer IP address, a third party IP address, or a third party public key. If any block chain factors include this information, cryptocurrency risk detection engine 232 may calculate factor scores for these and any other block chain factors. For example, cryptocurrency risk detection engine 232 may determine the location associated with the IP addresses and calculate a factor score for the IP address based on the associated location. Also, cryptocurrency risk detection engine 232 may retrieve and review any transaction history (such as transactions 208) associated with the third party public key and calculate a factor score for the public key. Cryptocurrency risk detection engine 232 may also determine the amount of cryptocurrency associated with the cryptocurrency transaction. In certain embodiments, cryptocurrency risk detection engine 232 calculates the risk score based at least in part upon the factor scores and the amount of cryptocurrency associated with the cryptocurrency transaction.

The operation of enterprise cryptocurrency server 130, with respect to risk detection engine 232, will now be discussed. Enterprise cryptocurrency server 130 may receive a request from customer 102 to perform a cryptocurrency transaction with a third party. To do so, enterprise cryptocurrency server 130 may use cryptocurrency risk detection engine 232 to receive the request over network 120 via links 116. In some embodiments, the request may be initiated by customer 102 through an enterprise application on device 110. In some embodiments, the request may be initiated by customer 102 utilizing a bank card, such as a debit card or credit card, when making a purchase. Examples of cryptocurrency transactions include making a purchase, transferring money from an account, and transferring money to an account. In some embodiments, the third party may be a second customer 102 of the enterprise, a merchant, a retailer, a person outside enterprise, an account outside the enterprise, or an account with an unknown owner.

Cryptocurrency risk detection engine 232 may retrieve block chain information associated with the cryptocurrency transaction and identify at least one block chain factor based at least in part upon block chain information. In some embodiments, a block chain factor may comprise a customer IP address, a third party IP address, a customer public key, a third party public key, an age of the customer public key, an age of a third party public key, or an age of the cryptocurrency. The block chain information may comprise one, some, or all of these block chain factors.

Cryptocurrency risk detection engine 232 then determines whether the at least one block chain factor identified includes a customer IP address. The customer IP address may be associated with customer 102 of the enterprise. If the at least one block chain factor includes a customer IP address, then cryptocurrency risk detection engine 232 determines the location associated with the customer IP address. In some embodiments, the determined location may be a physical address, GPS coordinates, a city, a state, or a country. Next, cryptocurrency risk detection engine 232 calculates a factor score for the customer IP address based at least in part upon the location associated with the customer IP address. In some embodiments, the factor score may increase for a location associated with high risk and decrease for a location associated with low risk, depending on the circumstances associated with customer 102. For example, if cryptocurrency risk detection engine 232 determines the location is a country, and that country is frequently associated with fraudulent transactions, then the factor score may increase. As another example, if it is known that customer 102 resides in one state, but the IP address reflects a location in another state or country, then the factor score may increase because customer 102 is not in the normal location.

Cryptocurrency risk detection engine 232 may then determine whether the at least one block chain factor previously identified includes a third party IP address. The third party IP address may be associated with third party. If the at least one block chain factor includes a third party IP address, then cryptocurrency risk detection engine 232 determines the location associated with the third party IP address. In some embodiments, the determined location may be a physical address, GPS coordinates, a city, a state, or a country. Cryptocurrency risk detection engine 232 may also calculate a factor score for the third party IP address based at least in part upon the location associated with the third party IP address. In some embodiments, the factor score may increase for a location associated with high risk and decrease for a location associated with low risk, depending on the circumstances. For example, if cryptocurrency risk detection engine 232 determines the location is to a certain restricted country, and the enterprise is subject to restrictions that it cannot receives funds or send funds to the restricted country, then the factor score may increase.

Next, cryptocurrency risk detection engine 232 may determine whether the at least one block chain factor identified previously includes a third party public key. If cryptocurrency risk detection engine 232 determines the at least one block chain factor identified in step 906 includes a third party public key, then it retrieves the transaction history associated with the third party public key. In some embodiments, cryptocurrency risk detection engine 232 may retrieve the transaction history from transactions 208 stored in the enterprise cryptocurrency server 130. In other embodiments, cryptocurrency risk detection engine 232 may retrieve the transaction history from a source outside the enterprise, such as the third party enterprise server 150 or the internet. Cryptocurrency risk detection engine 232 may also review the transaction history associated with third party public key. In some embodiments, the review may include the transaction history of other public keys located in the same wallet as the third party public key. In some embodiments, the review includes the entire transaction history or only certain transactions. For example, cryptocurrency risk detection engine 232 may review only transactions over a certain amount of cryptocurrency. As another example, the review may include only transactions within a certain time period, such as transactions that occurred within the last one month, the last one year, or the last 5 years.

Next, cryptocurrency risk detection engine 232 calculates a factor score for the third party public key based at least in part upon the transaction history associated with the third party public key. The factor score may be associated with the suspicious or seemingly fraudulent past transactions associated with the third party public key. In some embodiments, suspicious transactions, such as a high value transaction of 1000 units of cryptocurrency, may indicate a higher risk of fraudulent activity and thus increase the factor score. In some embodiments, cryptocurrency risk detection engine 232 determines the pattern of spending based on the transaction history and is able to determine if the current transaction is a common transaction or an abnormal transaction as compared to the transaction history. For example, if the third party public key regularly transmits 1000 units of cryptocurrency on a weekly basis, then cryptocurrency risk detection engine 232 may determine the requested transaction of 1000 units of cryptocurrency indicates a lower risk of fraudulent activity and thus decreases the factor score.

Cryptocurrency risk detection engine 232 may next determine a factor score for the at least one block chain factor. In some embodiments, the at least one block chain factor only includes a customer IP address, a third party IP address, and a third party public key, such that there are no other factor scores to determine. If the at least one block chain factor includes other block chain factors, for example, an age of the customer public key, an age of the third party public key, or an age of the cryptocurrency, then cryptocurrency risk detection engine 232 determines a factor score for each of these other block chain factors. In some embodiments, the factor score for the age of the customer public key and the factor score for the age of the third party public key may increase as the age increases and decrease as the age decreases. For example, a new third party public key may indicate a risk of fraudulent activity because a third party may have created it only to engage a fraudulent transaction. In this example, cryptocurrency risk detection engine 232 may calculate a high factor score for the age of the third party public key. In some embodiments, an increase in age of the cryptocurrency itself may decrease the factor score for the age of the cryptocurrency. For example, a recently created unit of cryptocurrency may have been created through fraudulent means, and it may indicate a higher risk, and thus increase the factor score for the age of the cryptocurrency. Although certain embodiments are described, it should be understood that there can be any number of factor scores corresponding to one or more block chain factors. Cryptocurrency risk detection engine 232 may also determine the amount of cryptocurrency associated with the cryptocurrency transaction. Although different types of cryptocurrencies use different units of cryptocurrency, cryptocurrency risk detection engine 232 is able to determine the amount of cryptocurrency in the appropriate unit. In addition, cryptocurrency risk detection engine 232 can determine fractions of the unit of cryptocurrency. For example, cryptocurrency risk detection engine 232 is able to determine the cryptocurrency transaction includes 1000 Bitcoins, 0.001 Litecoins, 1 million Namecoins, 7.5 Dogecoins, 23 Peercoins, or 1 Mastercoin.

Next, cryptocurrency risk detection engine 232 calculates a risk score for performing the cryptocurrency transaction based at least in part upon the block chain information and the amount of cryptocurrency. The risk score may be calculated in a number of suitable ways. In some embodiments, the risk score increases as the amount of cryptocurrency increases assuming that the larger the transaction the higher the risk of a fraudulent transaction. For example, if the transaction is for 2 million units of cryptocurrency, rather than 10 units of cryptocurrency, then the risk score may increase. In some embodiments, the risk score will be based at least in part upon the factor scores for the at least one block chain factor. For example, cryptocurrency risk detection engine 232 may add all of the factor scores up to determine the overall risk score. In some embodiments, cryptocurrency risk detection engine 232 may weight each of the factor scores depending on the importance to risk of fraud. For example, there may be a high concern related foreign IP addresses and thus cryptocurrency risk detection engine 232 may weight that factor score by two when calculating the risk score. In some embodiments, cryptocurrency risk detection engine 232 determines the average of all of the factor scores in calculating the risk score. In some embodiments, cryptocurrency risk detection engine 232 calculates an overall factor score and multiples it by the amount of cryptocurrency.

Cryptocurrency risk detection engine 232 may then determine whether the transaction is approved based at least upon the risk score. In some embodiments, cryptocurrency risk detection engine 232 compares the risk score to a threshold to determine whether the transaction is approved. For example, if the risk score is above the threshold, then it is not approved and if the risk score is below the threshold then it is approved. In some embodiments, the threshold may change depending on the customer, the third party, the type of cryptocurrency, the amount of cryptocurrency, or another factor relating to the transaction. For example, if the customer is long-term, important, reliable, or trustworthy, then the threshold may be set higher and allow the customer to engage in higher risk transactions with a larger risk score.

If it is determined that the transaction is approved, enterprise cryptocurrency server 130 may communicate to the customer and the third party that the transaction is approved. To do so, enterprise cryptocurrency server 130 may use cryptocurrency risk detection engine 232 to communicate a message indicating that the transaction is approved over network 120 via links 116 to customer 102 or the third party. Alternatively, if the transaction is not approved, then it is communicated to the customer 102 and the third party that the transaction is not approved. In some embodiments, these communications may be delivered to third party enterprise server 150, device 110, or enterprise cryptocurrency server 130. For example, the communication may be in the form of an email associated with the customer's account and device 110 may utilize GUI 114 to display a message that the transaction is not approved. This communication may also include one or more reasons why the transaction was or was not approved in certain embodiments.

Next, enterprise cryptocurrency server 130 determines whether the risk score indicates suspicious activity by the third party. To do so, enterprise cryptocurrency server 130 may utilize cryptocurrency risk detection engine 232. In some embodiments, cryptocurrency risk detection engine 232 may determine suspicious activity if the risk score is above a certain threshold. For example, if the risk score is below the transaction approval threshold, but above the suspicious activity threshold, then cryptocurrency risk detection engine 232 may determine suspicious activity. As another example, if the risk score is above the transaction approval threshold, cryptocurrency risk detection engine 232 may determine suspicious activity by the third party. If cryptocurrency risk detection engine 232 determined that the risk score does not indicate suspicious activity by the third party, then the operation of cryptocurrency risk detection engine 232 may conclude for this task.

If cryptocurrency risk detection engine 232 determined that the risk score indicates suspicious activity by the third party, then enterprise cryptocurrency server 130 communicates a notification to customer 102 that the risk score indicates suspicious activity by the third party. For example, cryptocurrency risk detection engine 232 may communicate the notification over network 120 via links 116 to device 110. In some embodiments, these communications may be delivered to device 110 through the enterprise application. For example, the communication may comprise a pop up notification from the enterprise application displaying a message that the risk score indicates suspicious activity by the third party. In certain embodiments, this communication may also include what the suspicious activity is, the highest factor score from the block chain factors, or the risk score comparison to the threshold. This communication may also include information regarding whether the transaction was approved. For example, a message may be displayed, using GUI 114, to customer 102 indicating that although the transaction of receiving 2 Bitcoins from third party was approved, the third party's behavior is potentially suspicious because it was delivered from a suspicious country. As another example, the message may specify that the third party's transaction history includes transactions involving over 2000 Litecoins on a daily basis. In some embodiments, the notification may include information about why the third party's activity is potentially suspicious, but also allow customer 102 to verify that customer 102 wants to perform the transactions despite the high risk score and suspicious activity. After communicating a notification to customer, operation for this task may end.

Enterprise cryptocurrency server 130 may include validation engine 234. Generally, validation engine 234 determines whether a requested cryptocurrency transaction is confirmed based on the risk and number of validations received. More specifically, validation engine 234 may be any software, hardware, firmware, or combination thereof capable of calculating a risk of performing a cryptocurrency transaction, determining the number of required validations to confirm the cryptocurrency transaction, and notifying a customer 102 and a third party whether the transaction is confirmed. In some embodiments, validation engine 234 may be a set of instructions stored in memory 202 that may be executed by processor 201.

Using information regarding the parties to the cryptocurrency transaction and information regarding the transaction itself, validation engine 234 determines whether a requested cryptocurrency transaction is confirmed. Validation engine 234 determines the number of required validations to confirm the requested cryptocurrency transaction. In order to determine whether the transaction is confirmed, validation engine 234 receives a number of validations from a plurality of miners and compares the number of validations to the number of required validations. In certain embodiments, if the number of received validations complies with the number of required validations, then the cryptocurrency transaction is confirmed. If the number of received validations does not comply with the number of required validations, then the cryptocurrency transaction is not confirmed.

In addition to determining whether the transaction is confirmed, validation engine 234 may also calculates a risk score for the cryptocurrency transaction to determine the number of required validations. In some embodiments, when validation engine 234 receives a request from a customer 102 to perform a cryptocurrency transaction with a third party, validation engine 234 may determine the amount and type of cryptocurrency involved in the cryptocurrency transaction. Also, validation engine 234 may determine the trustworthiness of the customer based on the customer profile, including the transaction history of the customer 102 and the customer IP address. Validation engine 234 may also compare the calculated risk score to a threshold and determine the number of required validations in order to confirm the cryptocurrency transaction. Once validation engine 234 receives a number of validations from a plurality of miners, validation engine 234 compares the number of receive validations to the number of required validations to determine whether the number of received validations complies with the number of required validations.

Validation engine 234 may provide various notifications regarding the confirmation of the cryptocurrency transaction. In some embodiments, if the number of received validations complies with the number of required validations, validation engine 234 sends a notification to the third party that the cryptocurrency transaction is confirmed. If the number of received validations does not comply with the number of required validations, then validation engine 234 may send a notification to the user (e.g., customer 102) and the third party that the cryptocurrency transaction is not confirmed. If the transaction is not confirmed, validation engine 234 may communicate a request to customer 102 to retransmit the cryptocurrency.

The operation of enterprise cryptocurrency server 130, with respect to validation engine 234, will now be discussed. Enterprise cryptocurrency server 130 may store a customer profile associated with customer 102 in memory 202 or customer accounts 203 (which may be stored in 202). Memory 202 and customer accounts 203 may comprise a plurality of customer profiles. In some embodiments, each customer 102 has one individual customer profile. In some embodiments, a customer profile contains multiple customers 102 with a commonality, such as a common home address or a common cryptocurrency account. For example, a mother and a daughter may have a single joint cryptocurrency account with the enterprise and thus the customer profile may include information regarding both the mother and her daughter. In some embodiments, customer profile comprises information associated with the customer, including, but not limited to, a customer name, a customer address, one or more customer public cryptocurrency keys, one or more customer IP addresses, one or more customer cryptocurrency wallets, and a cryptocurrency transaction history.

Next, validation engine 234 may receive a request to perform a cryptocurrency transaction with a third party. Examples of cryptocurrency transactions include making a purchase, transferring money from an account, and transferring money to an account. In some embodiments, the request may be initiated by customer 102 through an enterprise application on device 110. For example, customer 102 may use device 110 to request to transfer funds from a cryptocurrency account to a third party on device 110. In some embodiments, the request may be initiated by customer 102 utilizing a cryptocurrency bank card, such as a debit card or credit card, when making a purchase. For example, customer 102 may be using a cryptocurrency debit card to purchase a basketball from a third party's website, such as a sporting goods store. In some embodiments, the third party may be a merchant, a retailer, a business, a person outside the enterprise, or an account outside the enterprise.

Validation engine 234 may then determine the amount of cryptocurrency involved in the cryptocurrency transaction. Although different types of cryptocurrencies use different units of cryptocurrency, validation engine 234 may able to determine the amount of cryptocurrency in the appropriate unit. In addition, validation engine 234 may determine fractions of the unit of cryptocurrency. For example, validation engine 234 is able to determine the cryptocurrency transaction includes 1000 Bitcoins, 0.001 Litecoins, 1 million Namecoins, 7.5 Dogecoins, 23 Peercoins, or 1 Mastercoin. In certain embodiments, a cryptocurrency transaction may include a plurality of types of cryptocurrency and validation engine 234 determines the amount of each individual cryptocurrency. For example, validation engine 234 may determine a cryptocurrency transaction involves 1 Bitcoin, 2 Dogecoins, and 0.001 Mastercoins. Validation engine 234 may also determine exchange rates between the types of cryptocurrencies, such that it can determine an objective amount of total cryptocurrency involved in the transaction. For example, validation engine 234 may determine a cryptocurrency transaction involving 1 Bitcoin, 2 Dogecoins, and 0.001 Master coins is equivalent to 5 Litecoins.

Next, validation engine 234 may determine the type of cryptocurrency involved in the cryptocurrency transaction. For example, validation engine 234 may determine that only Bitcoins are involved in the requested transaction. In certain embodiments, validation engine 234 determines that multiple types of cryptocurrency are involved in the cryptocurrency transaction. For example, validation engine 234 may determine that the transaction includes two types of cryptocurrencies, but does not specify which types of cryptocurrency. In certain embodiments, validation engine 234 determines the specific type of cryptocurrencies involved in the transaction. For example, validation engine 234 may determine that the transaction includes Peercoins and Dogecoins, or that the transaction includes Bitcoins, Dogecoins, and Mastercoins.

Validation engine 234 may also calculate a first factor score based at least in part upon the transaction history of customer 102. In some embodiments, the transaction history may include the entire transaction history of customer 102 or may include only certain transactions. For example, the transaction history may include only transactions over a certain amount of cryptocurrency. As another example, the transaction history may include only transactions within a certain time period, such as transactions that occurred within the last one month, the last one year, or the last 5 years. In certain embodiments, the transaction history of customer 102 may include only transactions from a certain public key, transactions from one or more public keys contained in the same wallet, or a combination of these transactions. The first factor score may be associated with the suspicious or seemingly fraudulent past transactions associated with customer 102. In some embodiments, suspicious transactions, such as a high value transaction of 1000 units of cryptocurrency, may indicate a higher risk of fraudulent activity and thus increase the first factor score. In some embodiments, validation engine 234 determines the pattern of spending based on the transaction history and is able to determine if the current transaction is a common transaction or an abnormal one compared to the transaction history. For example, if customer 102 regularly transmits 1000 units of cryptocurrency on a weekly basis, then validation engine 234 may determine the requested transaction of 1000 units of cryptocurrency indicates a lower risk of fraudulent activity and thus decreases the first factor score. Validation engine 234 may also calculate a second factor score based at least in part upon the customer IP address. In some embodiments, validation engine 234 determines a location associated with the customer IP address. In some embodiments, the determined location may be a physical address, GPS coordinates, a city, a state, or a country. In some embodiments, the second factor score may increase for a location associated with high risk and decrease for a location associated with low risk, depending on the circumstances associated with customer 102. For example, if validation engine 234 determines the location is a country, and that country is commonly associated with fraudulent IP addresses, then the second factor score may increase. As another example, if it is known that customer 102 resides in one state, but the IP address reflects a location in another state or country, then the second factor score may increase because customer 102 sends a request to transfer funds from an abnormal location for customer 102.

Next, validation engine 234 determines the trustworthiness of customer 102 based at least upon the stored customer profile. In certain embodiments, the trustworthiness may be stored in the customer profile. The enterprise may have previously determined that customer 102 is trustworthy because, for example, customer 102 has a long history as a customer of the enterprise and the enterprise has experienced no issues with the accounts or activities of customer 102. Also, validation engine 234 may determine the trustworthiness of customer 102 based at least in part upon the first factor score and/or the second factor score. For example, if validation engine 234 determines a high factor score because of a suspicious IP address, then validation engine 234 may determine that customer 102 is not trustworthy. As another example, if validation engine 234 determines a low first factor score because there are no or very few large transactions in the transaction history of customer 102, then validation engine 234 may determine customer 102 is trustworthy. In some embodiments, the trustworthiness of customer 102 may be represented by a sliding scale, a number, a checkmark, a yes, a no, or a verbal qualifier such as very, incredibly, not, not very, or not at all.

Validation engine 234 may also calculate a risk score for the cryptocurrency transaction based at least in part upon the amount of cryptocurrency, the type of cryptocurrency, and the trustworthiness of the customer. The risk score may be calculated in a number of suitable ways. In some embodiments, the risk score increases as the amount of cryptocurrency increases assuming that the larger the transaction the higher the risk of a fraudulent transaction. For example, if the transaction is for 2 million units of cryptocurrency, then the risk score will increase.

In some embodiments, the risk score may be based upon the type of cryptocurrency. For example, Litecoin may be more likely to involve a fraudulent transaction, while Dogecoin may be less likely to involve a fraudulent transaction. Thus, if validation engine 234 determines that the cryptocurrency transaction involves Litecoin, then the risk score may increase, but if the cryptocurrency transaction involves Dogecoin, then the risk score may decrease. As another example, a "mixed" cryptocurrency transaction that includes multiple types of cryptocurrency, for example 1 Bitcoin and 2 Litecoins may indicate an increase in the risk of a fraudulent transaction. Thus, if validation engine 234 determines the cryptocurrency transaction is a "mixed" cryptocurrency transaction, then the risk score may increase.

In certain embodiments, the risk score may decrease if customer 102 is trustworthy. For example, if the amount and type of cryptocurrency creates a high risk score, but validation engine 234 determines customer 102 is incredibly trustworthy, then validation engine 234 may lower the risk score associated with the cryptocurrency transaction. As another example, if validation engine 234 determines customer 102 is only moderately trustworthy, then the risk score may neither increase nor decrease.

In some embodiments, validation engine 234 may weight each of the factors contributing to the risk score depending on the importance to risk of fraud. For example, it may be known by validation engine 234 that the amount of the cryptocurrency transaction is the biggest factor contributing to whether the transaction is likely fraudulent. Thus validation engine 234 may more heavily weight this factor in determining the risk score.

Next, validation engine 234 compares the risk score to at least one threshold. In certain embodiments, the at least one threshold may be predetermined or may be configured by enterprise cryptocurrency server 130 or validation engine 234. Validation engine 234 may determine that the risk score is greater than, less than, or equal to the threshold in certain embodiments. In some embodiments, validation engine 234 may determine that the risk score is between one or more thresholds. For example, if there are three thresholds of 10, 50, and 100, and the risk score is 50.5, validation engine 234 may determine that the risk score is greater than the threshold of 50 and less than the threshold of 100.

Validation engine 234 may also determine the number of required validations to confirm the cryptocurrency transaction. In some embodiments, a number of thresholds may correspond to the number of required validations to confirm the cryptocurrency transaction. Using the example above, validation engine 234 may determine a risk score below threshold 10 requires 1 validation, a risk score between thresholds 10 and 50 requires 2 validations, a risk score between thresholds 50 and 100 requires 4 validations, and a risk score above threshold 100 requires 6 validations.

Enterprise cryptocurrency server 130 may receive a number of validations from a plurality of miners. For example, validation engine 234 may receive a number of validations from miners over network 120 via links 116. Validation engine 234 may then compare the number of received validations to the number of required validations. In certain embodiments, validation engine 234 may determine the number of received validations is greater than, less than, or equal to the number of required validations. For example, validation engine 234 may receive two validations over network 120 via links 116 and determine this is less than the five required validations. Validation engine 234 then determines whether the number of received validations complies with the number of required validations. In certain embodiments, the number of received validations must be equal to or greater than the number of required validations for validation engine 234 to determine they comply with each other. For example, validation engine 234 may determine that the three received validations is greater than the required number of two validations and thus validation engine 234 determines that the number of received validations complies with the number of required validations.

If the number of received validations complies with the number of required validations, then enterprise cryptocurrency server 130 may send a notification to the third party that the cryptocurrency transaction is confirmed. To do so, enterprise cryptocurrency server 130 may use validation engine 234 to send the notification confirming the cryptocurrency transaction over network 120 via links 116. Upon doing so, the operation may end.

In some embodiments, sending a notification to the third party may simplify the process of third parties accepting cryptocurrency as payment from customer 102. For example, validation engine 234 sending a notification to the third party that the cryptocurrency transaction is confirmed does not require that the third party determine the number of validations itself. If validation engine 234 determines that the number of received validations does not comply with the number of required validations then validation engine 234 may send a notification to customer 102 and the third party that the cryptocurrency transaction is not confirmed. In some embodiments, validation engine 234 may transmit the notification to third party enterprise server 150. Validation engine 234 may transmit the notification to a third party device, such as the one that requested the transaction, in some embodiments. For example, if customer 102 attempts to pay for an item at a third party retailer store with a bank cryptocurrency card (such as a payment instrument encoded with cryptocurrency information associated with a customer account 203) or with device 110, then validation engine 234 may transmit the notification to the cash register attempting to complete the purchase for customer 102.

Next, validation engine 234 may communicate a request to customer 102 to retransmit cryptocurrency. The request may be in the form of a notification, as described above, that customer 102 receives on device 110. For example, the notification may be communicated as an email, text message, alert in the customer account, or a pop up on the enterprise application.

Enterprise cryptocurrency server 130 may include vault engine 236. Generally, vault engine 236 may perform any function involving the storage and retrieval of cryptocurrencies, private keys, and/or public keys associated with a customer 102. More specifically, vault engine 236 may be any software, firmware, or combination thereof capable of performing any functionality involving the storage, retrieval, and/or security of cryptocurrencies associated with customers 102. In certain embodiments, vault engine 236 may store private keys associated with a particular customer 102 in online vault 210 or offline vault 212. For example, vault engine 236 store one or more private keys associated with cryptocurrencies associated with a particular customer 102.

Vault engine 236 may apply one or more functions or algorithms to the one or more private keys before storing the private keys. For example, for a particular private key, vault engine 236 may apply a hash function, an encryption function, a tokenization function, or any other obfuscation or security function to the whole private key or a portion of the private key. A portion of the private key may be any suitable subset of the private key. In certain embodiments, vault engine 236 may apply one function on all or a portion of the private key to generate a first vault key and apply a different function on all or a portion of the private key to generate a second vault key. In some embodiments, a first function may be applied to a first portion of the private key while a second function may be applied to a second portion of the private key. The first portion and second portion may be distinct from each other or they may have at least some shared portions of the private key. According to some embodiments, the selection of a function to apply to all or a portion of the private key may be based on the destination location of the private key. For example, the first vault key may be stored at a first location and the second vault key may be stored in a second location. In such an example, the first vault key may be stored in a first cryptocurrency vault and the second vault key may be stored in a second cryptocurrency vault in a location different than the first cryptocurrency vault.

When a private key associated with a quantity of cryptocurrency associated with customer 102 is stored in a vault, enterprise cryptocurrency server 130 may utilize equivalent amounts/values of cryptocurrency stored in float account 204 to conduct transactions on the behalf of customer 102 that may want to utilize such cryptocurrency and debit/credit customer accounts 203 as appropriate. Vault engine 236 may store information related to the functions used on private keys in memory 202. Vault engine 236 may then use this information to determine whether a particular transaction involves a private key that may be stored in a vault. According to some embodiments, if a transaction involves a private key that is stored in a vault, then vault engine 236 may be capable of flagging such transactions as possibly fraudulent.

According to some embodiments, vault engine 236 is capable of facilitating the storage of a private key in online vault 210. Online vault 210 may be any combination of software, hardware, and firmware that may store information associated with cryptocurrencies. Online vault 210 may be a part of enterprise cryptocurrency server 130 and/or it may be a part of data center server 160. Enterprise cryptocurrency environment 100 is capable of supporting more than one online vault 210 that may be located in diverse geographic locations. For example, one online vault 210 may be in enterprise cryptocurrency server 130 at a first geographical location, while another online vault 210 may be in data center server 160a at a second geographical location, and yet another online vault 210 may be in data center server 160b at a third geographical location. The present disclosure contemplates any number of online vaults 210 and combinations of geographical locations for online vault 210 as suitable for a particular purpose.

In some embodiments, vault engine 236 is capable of facilitating the storage of a private key in offline vault 212. Offline vault 212 may be any combination of software, hardware, and/or firmware that may store information associated with cryptocurrencies. Offline vault 212 may have a dedicated connection to enterprise cryptocurrency server 130 or it may be communicatively coupled to enterprise cryptocurrency server 130 via network 120. The current disclosure contemplates any number, locations, and/or connections of offline vault 212.

After the deposit of cryptocurrency (or private keys associated with the cryptocurrency), vault engine 236 may determine if a threshold has been exceeded. This threshold may be based on a quantity of total cryptocurrency in offline vault 212, the value of the cryptocurrency in offline vault 212, the number of private keys in offline vault 212, and/or any other suitable measure associated with cryptocurrencies. Once the threshold is exceeded, vault engine 236 may facilitate the disconnection of offline vault 212 effectively taking the vault "offline." For example, this may mean that offline vault 212 has been communicatively decoupled from enterprise cryptocurrency server 130 and/or network 120. In certain embodiments, offline vault 212 may be a hard disk drive that is physically disconnected from enterprise cryptocurrency server 130. Once the hard disk drive is disconnected, it may be physically secured.

The operation of enterprise cryptocurrency server 130, with respect to vault engine 236 will now be discussed. The operation of vault engine 236 involving online vault 210 will be discussed first and the operation of vault engine 236 involving offline vault 212 will be discussed second. Enterprise cryptocurrency server 130 may receive an electronic request to store a private key associated with cryptocurrency. For example, enterprise cryptocurrency server 130 may receive such a request over links 116. The request may be in conjunction with or may include a request to store or associate cryptocurrency with a certain customer account 203.

In response to the request, enterprise cryptocurrency server 130 may use vault engine 236 to generate a first vault key based at least in part upon the private key. A vault key may be any suitable portion of the received private key that may be stored in online vault 210. Vault engine 236 may determine whether a function or algorithm (e.g., hash function, encryption function, etc.) should be applied to the first vault key. In response to determining that a hash function, for example, may be applied to the first generated vault key, vault engine 236 may apply the hash function to the second vault key. Vault engine 236 may do this by selecting a particular hash function from a plurality of hash functions. In certain embodiments, the selection may be based on the geographic location of where the first vault key may be stored. After applying the hash function, vault engine 236 may store information associated with the generated first vault key such that that the private key may be retrieved by enterprise cryptocurrency server 130 subsequent to the storage in online vault 210.

Next, vault engine 236 may generate a second vault key based at least in part upon the private key. The second vault key may be any suitable portion of the received private key that may be stored in online vault 210. The second vault key may be a distinct portion of the private key from the portion of the private key used for the first vault key or there may be some overlap. Vault engine 236 may determine whether a function or algorithm (e.g., hash function, encryption function, etc.) should be applied to the second vault key. In response to determining that a hash function, for example, may be applied to the second generated vault key, vault engine 236 may apply the hash function to the second vault key. Vault engine 236 may do this by selecting a particular hash function from a plurality of hash functions. In certain embodiments, the selection may be based on the geographic location of where the second vault key may be stored. According to some embodiments, the function applied to the second vault key may be different than the function applied to the first vault key. After applying the hash function, vault engine 236 may store information associated with the generated second vault key such that that the private key may be retrieved by enterprise cryptocurrency server 130 subsequent to the storage in online vault 210.

Once the vault keys are generated, vault engine 236 may facilitate the storage of the vault keys in online vaults 210. For example, vault engine 236 may facilitate the storage of the first vault key in a first online vault 210 at a first data center (e.g., data center server 160*a*). Next, vault engine 236 may facilitate the storage of the second vault key in a second online vault 210 at a second data center (e.g., data center server 160*b*).

The operation of vault engine 236 involving offline vault 212 will now be discussed. Enterprise cryptocurrency server 130 may receive a request to deposit a quantity of cryptocurrency into a customer account 203. In response, enterprise cryptocurrency server 130 may associate the quantity of cryptocurrency with the customer account 203. Next, enterprise cryptocurrency server 130 may deposit the quantity of cryptocurrency into an offline vault 212 that may be communicatively coupled to enterprise cryptocurrency server 130. In certain embodiments, depositing the quantity of cryptocurrency may comprise storing one or more private keys associated with the quantity of cryptocurrency in offline vault 212. According to some embodiments, a function or algorithm may be applied to the one or more private keys before storage in offline vault 212.

After deposit, vault engine 236 may determine whether a threshold has been exceeded involving offline vault 212. For example, the threshold may be related to a total amount of cryptocurrency, private keys associated with a total amount of cryptocurrency, public keys, and/or any other suitable quantifiable information associated with depositing cryptocurrencies in offline vault 212. If the threshold is exceeded, then vault engine 236 may communicate a message to facilitate the disconnection of offline vault 212. In certain embodiments, the disconnection may be from network 120, from data center server 160, or enterprise cryptocurrency server 130. According to some embodiments, the hardware containing the now-disconnected offline vault 212 may be physically secured.

Enterprise cryptocurrency server 130 may use an electronic payment service to provide a virtual account associated with customer 102. Generally, an electronic payment service may allow a customer 102 to associate a virtual account 172 to a customer account 203. This allows the customer 102 to conduct transactions using the virtual account 172 avoiding potential delays that may be associated with conducting transactions using customer account 203. More specifically, an electronic payment service may refer to a service that transacts online payments and virtual account 172 may refer to customer 102's account with the electronic payment service. In some embodiments, the electronic payment service and virtual account 172 may be included in payment service server 170. According to some embodiments, the electronic payment service and virtual account 172 may be included in enterprise cryptocurrency server 130.

Enterprise cryptocurrency server 130 may include peer-to-peer engine 238 to offer electronic payment service functionality. Peer-to-peer engine 238 may be any software, hardware, firmware, or combination thereof that allows enterprise cryptocurrency server 130 to offer electronic payment service functionality. An example of such functionality may be a virtual account associated with the electronic payment service and a customer and a customer account that is associated with the virtual account.

The electronic payment service may communicate validation data as part of a request to transfer funds or in response to a request to provide the validation data. Validation data may include validated tokens, credentials, and any other suitable data peer-to-peer engine 238 may use to confirm that the electronic payment service is a trusted system and/or to authorize the particular financial transaction. In some embodiments, the enterprise may verify that the validation data received from the electronic payment service matches validation data maintained by the enterprise before authorizing the financial transaction. If the validation fails, the enterprise notifies the electronic payment service and does not initiate the funds transfer.

Peer-to-peer engine 238 may use data received in a request for a transaction to determine which customer account 203 may be associated with the virtual account 172 involved in the financial transaction. The request may indicate that customer 102 desires to transfer an amount of currency from virtual account 172 to a destination. For example, the destination may be a business, a financial institution, or another customer 102. In response, peer-to-peer engine 238 may determine a quantity of cryptocurrency equivalent to the requested amount of currency. Peer-to-peer engine 238 may determine that the quantity of cryptocurrency exceeds the quantity of cryptocurrency associated with customer account 203. In such an instance, peer-to-peer engine 238 is capable of determining the difference between the requested amount of cryptocurrency and the amount of cryptocurrency associated with customer account 203 and facilitate the purchase of the difference. In certain embodiments, the difference in quantity of cryptocurrency may be purchased from an exchange 140.

In response to the request for the financial transaction, peer-to-peer engine 238 may transfer the requested quantity of cryptocurrency to the electronic payment service. In certain embodiments, the quantity of cryptocurrency may be transferred from float account 204. According to some embodiments, the quantity of cryptocurrency may be transferred from customer account 203 to the electronic payment service. In some embodiments, transferring the requested quantity of cryptocurrency may include transferring public keys or private keys associated with the quantity of cryptocurrency to the electronic payment service.

The operation of peer-to-peer engine 238 will now be discussed. In general, customer 102 may initiate a request for a financial transaction to transfer funds from a source to a destination. Customer 102 may select virtual account 172 as either the source (to transfer funds out of virtual account 172) or the destination (to transfer funds into virtual account 172). Enterprise cryptocurrency server 130 may receive such a request over links 116 from payment service server 170. In response, enterprise cryptocurrency server 130 determines that customer 102 initiated the request for the financial transaction to transfer an amount of currency. Next, peer-to-peer engine 238 may validate the financial transaction based at least upon the data received from payment service center 170. In certain embodiments, enterprise cryptocurrency server 130 may receive the data over a dedicated interface with the payment service server 170. Peer-to-peer engine 238 may also determine that a certain virtual account 172 is associated with a certain customer account 203 based at least upon the data received from the payment service server 170.

If the financial transaction passes validation, peer-to-peer engine 238 may determine a quantity of cryptocurrency equivalent to the amount of currency. For example, peer-to-peer engine 238 may determine a quantity of cryptocurrency that has the same approximate value as the amount of currency. Next, peer-to-peer engine 238 may determine whether the quantity of cryptocurrency exceeds the total quantity of cryptocurrency associated with customer account 203. If so, then peer-to-peer engine 238 may purchase, on the behalf of customer 102, the difference in quantities. For example, peer-to-peer engine 238 may facilitate the purchase of the cryptocurrency from an exchange server 140. Peer-to-peer engine 238 may then transfer the quantity of cryptocurrency to payment service server 170. In certain embodiments, this may involve the transfer of private and/or public keys associated with the quantity of cryptocurrency.

Figure 3:
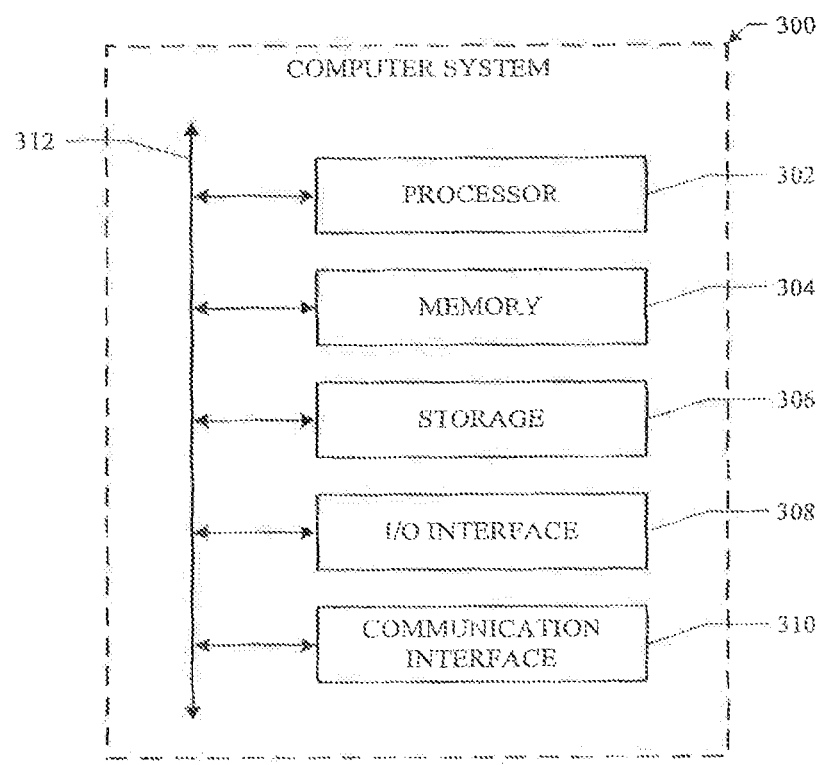
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or storing data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4:
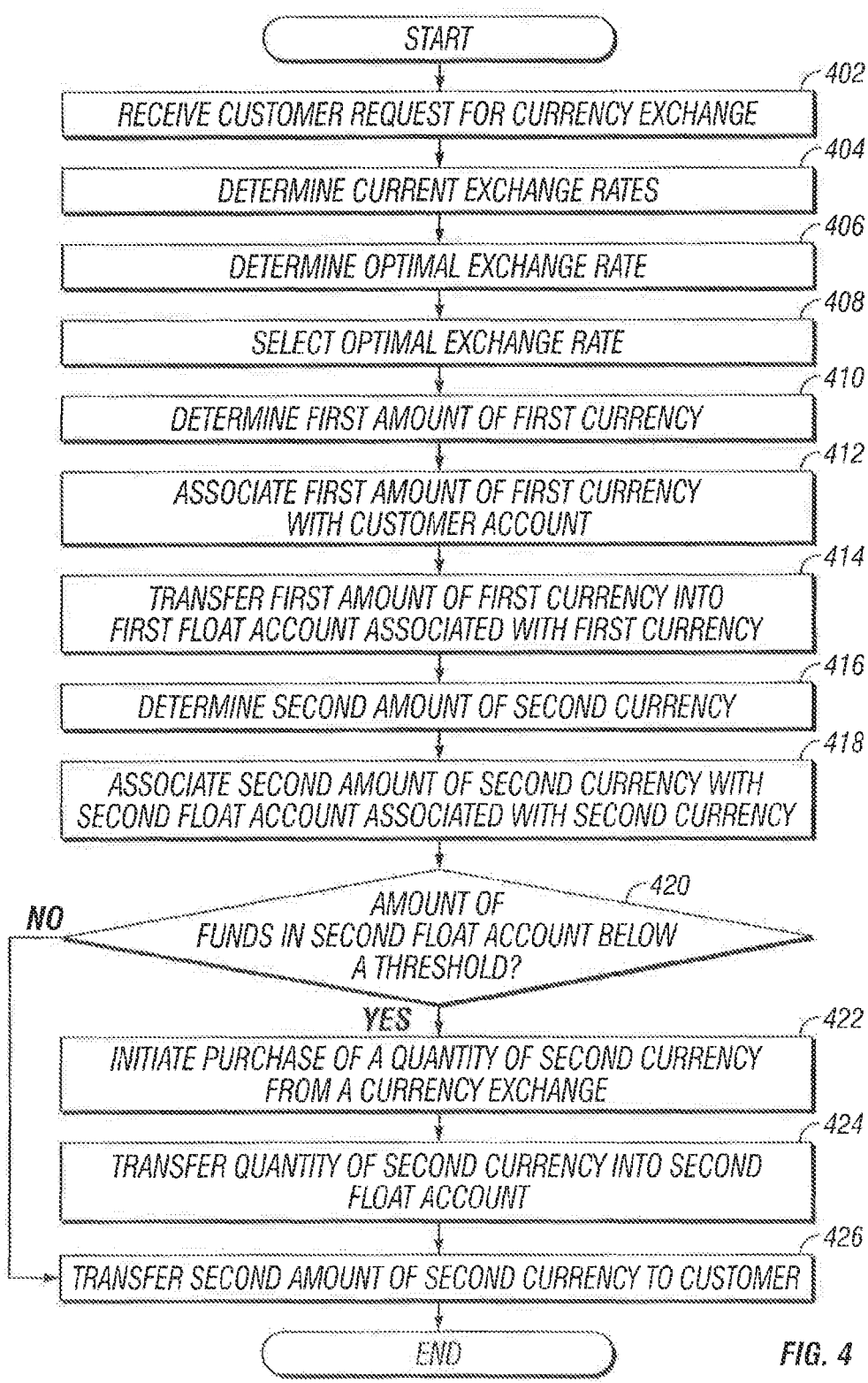
FIG. 4 illustrates an example flowchart for facilitating the exchange of funds involving cryptocurrency.

FIG. 4 illustrates an example flowchart for facilitating the exchange of funds involving cryptocurrency that may be implemented in the example systems of FIG. 1 and/or FIG. 2. The method beings at step 402 wherein transformation engine 214 receives a request for a currency exchange from a customer 102. For example, customer 102 may request to exchange a first amount of a first currency in a customer account 203 for an approximately equivalent amount of a second currency, such as a cryptocurrency. According to some embodiments, the first currency and/or the second currency may be a cryptocurrency. In certain embodiments, the method may execute the requested exchange in real-time or batch mode.

At step 404, transformation engine 214 may determine current exchange rates for exchanging the first currency for the second currency. In certain embodiments, transformation engine 214 may utilize conversion engine 216 and/or calculation engine 224 to determine current exchange rates associated with the requested exchange. For example, conversion engine 216 may retrieve any data associated with exchanging the first currency for the second currency, such as current price data, market data, volatility data, exchange rate data, economic risk data, or any other data associated with currencies and cryptocurrencies that may be suitable for a particular purpose. Conversion engine 216 and/or calculation engine 224 may then use such data to determine the current exchange rates for exchanging various currencies and cryptocurrencies.

At step 406, calculation engine 224 determines an optimal exchange rate for performing the requested currency exchange. To do so, calculation engine 224 may consider various factors such as current exchange rates, time factors, price factors associated with particular currencies, price factors associated with particular cryptocurrencies, economic risk factors, any other factors, or any combination thereof. As another example, calculation engine 224 may determine the optimal exchange rate by selecting a particular cryptocurrency the first currency should be exchanged for, based on, for example, financial advantages that may be gained by the enterprise and/or customer 102. The method continues at step 408 and calculation engine 224 selects the optimal exchange rate.

In step 410, calculation engine 224 determines a first amount of the first currency to be exchanged. For example, calculation engine 224 may use information (e.g., information included in the request) to determine the first amount of the first currency. The method then proceeds to step 412 wherein transformation engine 214 associates the first amount of the first currency with the particular customer account 203. In some embodiments, to associate the first amount of the first currency with the particular customer account 203, transformation engine 214 initiates a debit to the particular customer account 203 in the first amount (plus any fees and other costs) in the first currency. In response, exchange engine 228 may execute withdrawing the certain amount of the first currency from the particular customer account 203, thereby providing funds for the exchange. Then at step 414, transformation engine 214 transfers the first amount of the first currency to a first float account 204 associated with the first currency.

At step 416, calculation engine 224 determines a second amount of the cryptocurrency. According to some embodiments, calculation engine 224 may use the selected exchange rate to determine a quantity of the cryptocurrency approximately equivalent to the first amount of the first currency. The approximately equivalent quantity of the cryptocurrency may then be used to determine the second amount of the cryptocurrency less any fees or costs associated with the requested exchange.

At step 418, transformation engine 214 associates the second amount of the cryptocurrency with a second float account 204 associated with the particular cryptocurrency. Associating the second amount of the cryptocurrency with the second float account 204 may result in a debit to the second float account 204 in the second amount of the cryptocurrency.

In certain embodiments, the method continues to step 420 wherein transformation engine 214 determines whether an amount of funds in second float account 204 is below a threshold. For example, transformation engine 214 may monitor an amount of funds in second float account 204 and determine the amount of funds in second float account 204 is below a certain threshold. If the amount of funds in second float account 204 is not below the threshold, the method may proceed to step 426. Alternatively, if the amount of funds in second float account 204 is below the threshold, the method may continue to step 422.

At step 422, transformation engine 214 may initiate the purchase of a quantity of a certain currency (such as the type of currency or cryptocurrency associated with second float account 204). To do so, transformation engine 214 may communicate a request to purchase the quantity of the certain currency. In some embodiments, payment for the purchase may be made by deducting the appropriate funds from another float account 204 associated with the enterprise in a different currency or cryptocurrency. Upon payment, in step 424, transformation engine 214 may transfer the quantity of the certain currency to second float account 204.

At step 426, transformation engine 214 transfers the second amount of the cryptocurrency to customer 102. For example, transformation engine 214 may initiate a credit to a particular customer account 203 of at least a portion of the second amount in the certain cryptocurrency. In response, exchange engine 228 may execute depositing the second amount of the cryptocurrency in the particular customer account 203, thereby providing customer 102 with the desired currency. In certain embodiments, the second amount of the cryptocurrency may be transferred directly to the particular customer 102. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as transformation engine 214, conversion engine 216, calculation engine 224, and exchange engine 228 performing the steps, any suitable component of enterprise cryptocurrency server 130 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 5:
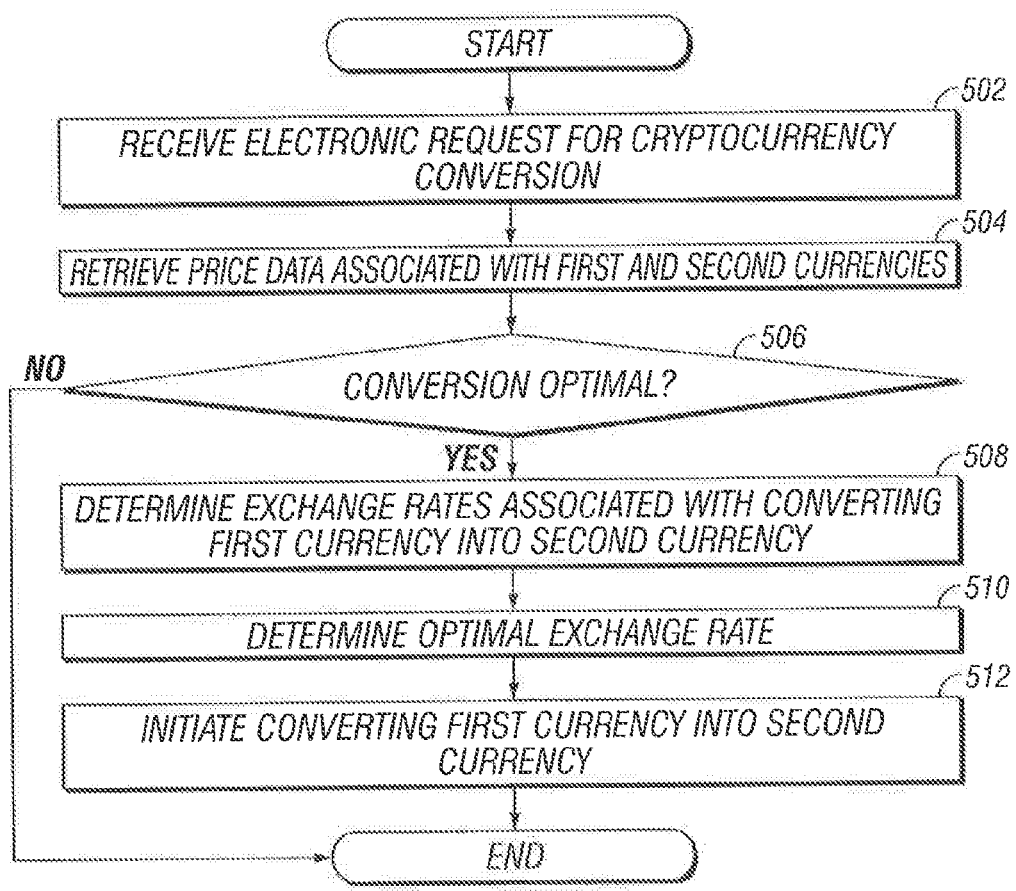
FIG. 5 illustrates an example flowchart for facilitating a real-time cryptocurrency conversion.

FIG. 5 illustrates an example flowchart for facilitating a real-time cryptocurrency conversion that may be implemented in the example systems of FIG. 1 and/or FIG. 2. The method begins at step 502, wherein conversion engine 216 receives an electronic request for a cryptocurrency conversion. For example, a customer 102 may request to convert a first currency into a particular cryptocurrency if the conversion is optimal.

At step 504, conversion engine 216 retrieves data associated with the conversion. For example, conversion engine 216 may retrieve price data associated with the first currency and price data associated with the particular cryptocurrency. Conversion engine 216 may also retrieve price data associated with a plurality of cryptocurrencies, price data associated with a plurality of currencies, market data associated with a plurality of cryptocurrencies, market data associated with a plurality of currencies, volatility data associated with a plurality of cryptocurrencies, volatility data associated with a plurality of currencies, current exchange rate data, economic risk data, and/or any other data that may be suitable for a particular purpose.

At step 506, conversion engine 216 determines whether converting the first currency into the particular cryptocurrency is optimal. According to some embodiments, conversion engine 216 may do so based at least in part upon analyzing the data associated with the conversion. For example, conversion engine 216 may consider time factors, price factors associated with particular currencies (such as the value of various currencies), price factors associated with particular cryptocurrencies (such as the value of various cryptocurrencies), volume of particular currencies, volume of particular cryptocurrencies, availability of particular currencies, availability of particular cryptocurrencies, popularity of particular currencies, popularity of particular cryptocurrencies, volatility of particular currencies, volatility of particular cryptocurrencies, economic risk factors, current currency exchange rates, and/or any other factors that may facilitate determining whether the conversion is optimal. In such an example, conversion engine 216 may determine that the conversion is optimal based upon any number of the following: financial advantages that may be gained by the enterprise and/or customer 102; the value of the particular cryptocurrency as compared to a value of various other cryptocurrencies; a set of conversion rules; whether the conversion exceeds a benefit threshold associated with the request within a date threshold associated with the request; etc.

If conversion engine 216 determines the conversion is optimal, the method may continue to step 508. On the other hand, if conversion engine 216 determines the conversion is not optimal, the method may end.

At step 508, conversion engine 216 determines exchange rates associated with converting the first currency into the second currency. In certain embodiments, conversion engine 216 may determine exchange rates for exchanging the first currency for various cryptocurrencies or for exchanging the first currency for a particular cryptocurrency (e.g., a customer 102 requested an exchange for a particular cryptocurrency). Conversion engine 216 may use the data retrieved in step 506 to determine such exchange rates.

In step 510, conversion engine 216 determines the optimal exchange rate. According to some embodiments, conversion engine 216 may determine the optimal exchange rate based at least in part upon the current exchange rates. Conversion engine 216 may also consider other factors, such as time factors, price factors associated with particular currencies (such as the value of particular currencies and cryptocurrencies), fees charged by third parties, volatility of particular currencies, volatility of particular cryptocurrencies, economic risk factors, and/or any other factors that may facilitate determining that one exchange rate should be used over another exchange rate. In certain embodiments, determining the optimal exchange rate includes determining which particular cryptocurrency the first currency should be exchanged for.

At step 512, conversion engine 216 may initiate converting the first currency into the second currency. Generally, conversion engine 216 initiates the conversion essentially simultaneously as the determination that the requested conversion is optimal. For example, conversion engine 216 or exchange engine 228 may communicate a request to transformation engine 214 to execute the cryptocurrency conversion. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as conversion engine 216 performing the steps, any suitable component of enterprise cryptocurrency server 130 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 6:
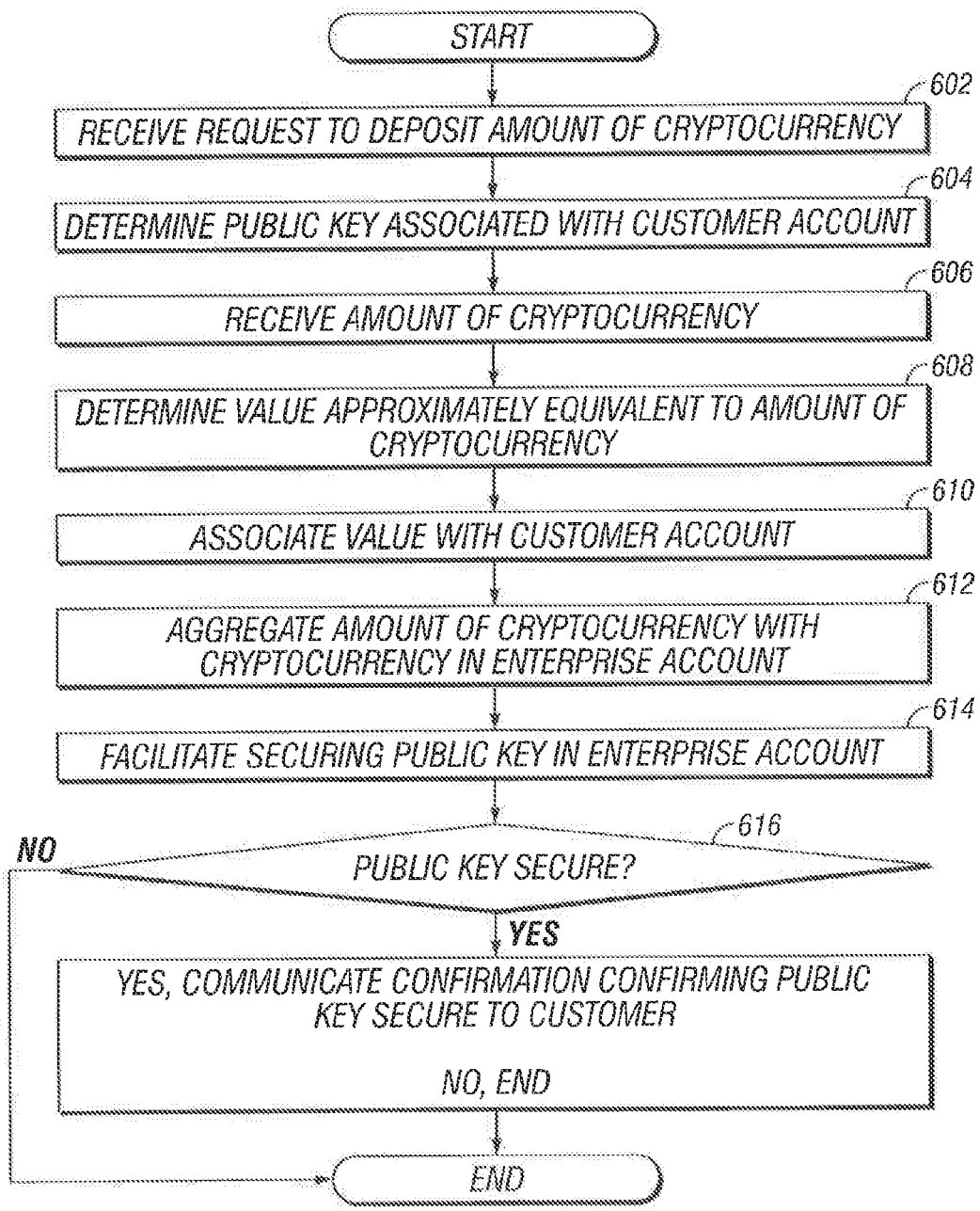
FIG. 6 illustrates an example flowchart for collecting and aggregating cryptocurrency deposited by customers.

FIG. 6 illustrates an example flowchart for collecting and aggregating cryptocurrency deposited by customers 102 that may be implemented in the example systems of FIG. 1 and/or FIG. 2. The method begins at step 602 wherein aggregation engine 222 receives a request to deposit an amount of cryptocurrency in a customer account 203. For example, customer 102 may use device 110 to request that an amount of cryptocurrency be deposited to customer account 203.

At step 604, aggregation engine 222 determines a public key associated with customer account 203. To do so, aggregation engine 222 may retrieve information included in customer account 203 that may be used to determine the public key.

At step 606, aggregation engine 222 uses the public key to receive the amount of cryptocurrency to be deposited. After receiving the amount of cryptocurrency, aggregation engine 222 determines a value of the cryptocurrency approximately equivalent to the amount of cryptocurrency to be deposited in step 608. For example, aggregation engine 222 may determine an approximately equivalent value of the amount of cryptocurrency based on a price associated with the particular cryptocurrency.

At step 610, aggregation engine 222 then associates the approximately equivalent value of the amount of cryptocurrency with customer account 203. For example, aggregation engine 222 may credit customer account 203 based on the approximately equivalent value.

At step 612, aggregation engine 222 aggregates the amount of cryptocurrency with an aggregated amount of cryptocurrency in a float account 204 (or aggregation account 206. For example, aggregation engine 222 may transfer the amount of cryptocurrency over network 120 to float account 204. In some embodiments, the amount of cryptocurrency may be transferred to float account 204 based at least in part on a public key associated with float account 204. After transferring the amount of cryptocurrency, aggregation engine 222 may deposit the amount to cryptocurrency in float account 204. For example, aggregation engine 222 may add the amount of cryptocurrency to the total amount of cryptocurrency in float account 204 to yield an updated total amount of cryptocurrency aggregated in float account 204.

The method continues at step 614 and aggregation engine 222 facilitates securing a public key associated with customer account 203 in online vault 210 or offline vault 212. For example, aggregation engine 222 may communicate a request to vault engine 236 to secure the public key to online vault 210 or offline vault 212. As a result, the public key may be secured in online vault 210 or offline vault 212 by vault engine 236.

In certain embodiments, at step 616, aggregation engine 222 determines whether the public key has been secured in online vault 210 or offline vault 212. In response to determining that vault engine 236 has secured the public key in online vault 210 or offline vault 212, the method proceeds to step 618. Otherwise the method may end.

At step 618, aggregation engine 222 communicates a confirmation message confirming the public key is secure to customer 102. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as aggregation engine 222 performing the steps, any suitable component of enterprise cryptocurrency server 130 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 7:
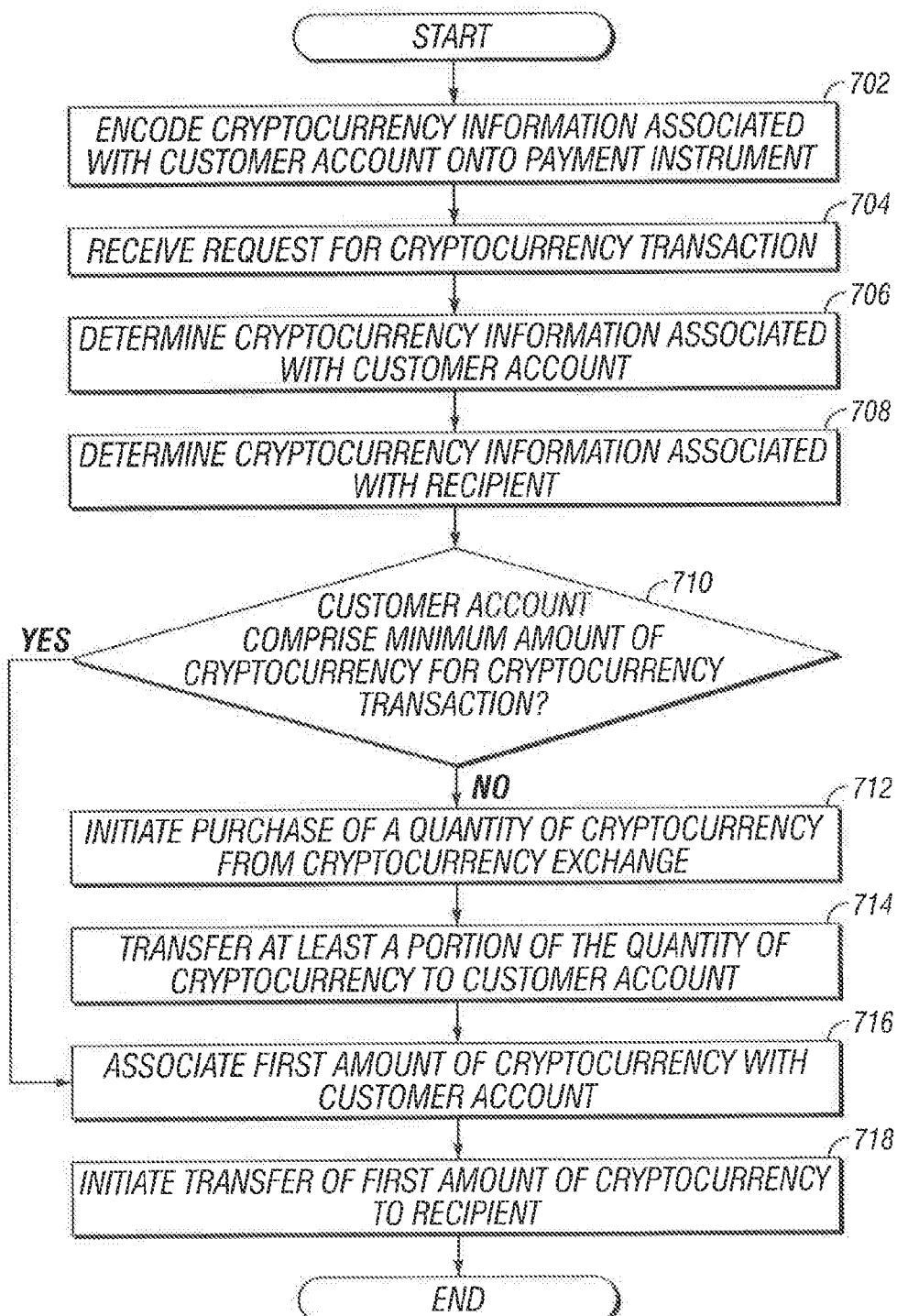
FIG. 7 illustrates an example flowchart for facilitating execution of a transaction with cryptocurrency using a payment instrument.

FIG. 7 illustrates an example flowchart for facilitating execution of a transaction with cryptocurrency using a payment instrument that may be implemented in the example systems of FIG. 1 and/or FIG. 2. The method begins at step 702 wherein encoding engine 218 encodes cryptocurrency information associated with a customer account 203 onto a payment instrument. In some embodiments, the payment instrument is associated with customer account 203 and is used by a customer 102 associated with customer account 203 to execute a transaction with cryptocurrency. For example, encoding engine 218 may encode various cryptocurrency information associated with a customer account 203, such as a cryptocurrency address or a public key, onto a payment instrument to provide customer 102 with electronic access to cryptocurrency in customer account 203. In certain embodiments, encoding engine 218 may encode a token onto a payment instrument. For example, encoding engine 218 may generate a token that represents cryptocurrency information, such as a public key, and encode the generated token onto the payment instrument. In other words, encoding engine 218 may create a new alias for the cryptocurrency information using a unique token (e.g., a tokenized representation of the public key), thereby securing the cryptocurrency information.

At step 704, transaction engine 220 may receive a request for a cryptocurrency transaction from customer 102. For example, customer 102 may use the payment instrument to request a certain amount of cryptocurrency be transferred to a recipient as payment for a purchase or other obligation. As a result, the amount of cryptocurrency may be deposited into an account associated with the recipient.

At step 706, transaction engine 220 determines cryptocurrency information associated with customer account 203. For example, a request may indicate a payment instrument encoded with cryptocurrency information, such as a payment instrument encoded with a public key or a token. Transaction engine 220 may determine the cryptocurrency information encoded on the payment instrument to thereby identify the particular customer account 203 to be debited in the certain amount of cryptocurrency.

At step 708, transaction engine 220 determines cryptocurrency information associated with the recipient. To do so, transaction engine 220 determines cryptocurrency information included in the request that may be used to transfer the amount of cryptocurrency to the recipient, such as a recipient cryptocurrency address or recipient public key associated with a third-party account.

At step 710, transaction engine 220 determines whether customer account 203 comprises a minimum amount of cryptocurrency to execute the cryptocurrency transaction. For example, transaction engine 220 may determine whether customer account 203 comprises a quantity of cryptocurrency at least equivalent to the amount of cryptocurrency requested for the transaction (i.e., comprises sufficient funds to complete the requested transaction). If transaction engine 220 determines customer account 203 comprises sufficient funds for the cryptocurrency transaction, transaction engine 220 may proceed to step 716. Alternatively, if transaction engine 220 determines customer account 203 does not comprise the minimum amount of cryptocurrency, transaction engine 220 may proceed to step 712. In some embodiments, the method ends if customer account 203 does not comprise the minimum amount of cryptocurrency for the cryptocurrency transaction.

At step 712, if customer account 203 does not comprise sufficient funds, transaction engine 220 initiates the purchase of a quantity of cryptocurrency from exchange 140*a* or 140*b*. For example, transaction engine 220 may communicate a request to purchase the quantity of cryptocurrency. In certain embodiments, payment for the purchase may be made by deducting the appropriate funds from customer account 203 in a second currency.

Upon purchasing the quantity of cryptocurrency, at step 714, transaction engine 220 transfers at least a portion of the quantity of cryptocurrency (e.g., the quantity of cryptocurrency less any fees or other costs) to customer account 203.

According to some embodiments, if customer account 203 does not comprise sufficient funds, enterprise cryptocurrency server 130 may determine whether customer account 203 comprises a quantity of a second currency. Upon determining customer account 203 does comprise the quantity of the second currency, enterprise cryptocurrency server 130 may use float accounts 204 to exchange the quantity of the second currency for an approximately equivalent quantity of cryptocurrency (less any fees or other costs) that may be deposited into customer account 203. For example, transformation engine 214 may transfer the quantity of the second currency to first float account 204 associated with the second currency over network 120 via links 116. In such an example, transformation engine 214 may then debit second float account 204 associated with the cryptocurrency in a quantity of cryptocurrency approximately equivalent to the quantity of the second currency. After debiting second float account 204, transformation engine 214 may transfer the quantity of cryptocurrency over network 120 via links 116 to customer account 203. As a result, customer account 203 may comprise a sufficient amount of cryptocurrency to execute the requested cryptocurrency transaction.

At step 716, transaction engine 220 associates the amount of cryptocurrency with customer account 203. To do so, transaction engine 220 may debit customer account 203 in the certain amount of cryptocurrency.

The method continues at step 718, wherein transaction engine 220 initiates a transfer of the certain amount of cryptocurrency to the recipient. For example, transaction engine 220 may communicate a request to a third party enterprise server 150 associated with the recipient to transfer the certain amount of cryptocurrency to the recipient. As another example, transaction engine 220 may communicate a request to a recipient cryptocurrency address associated with the recipient to transfer the certain amount of cryptocurrency to the recipient. Communicating such a request may result in the certain amount of cryptocurrency being deposited into a recipient account, thereby confirming the requested cryptocurrency transaction for a payment or other obligation associated with customer 102. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as encoding engine 218 and transaction engine 220 performing the steps, any suitable component of enterprise cryptocurrency server 130 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 8:
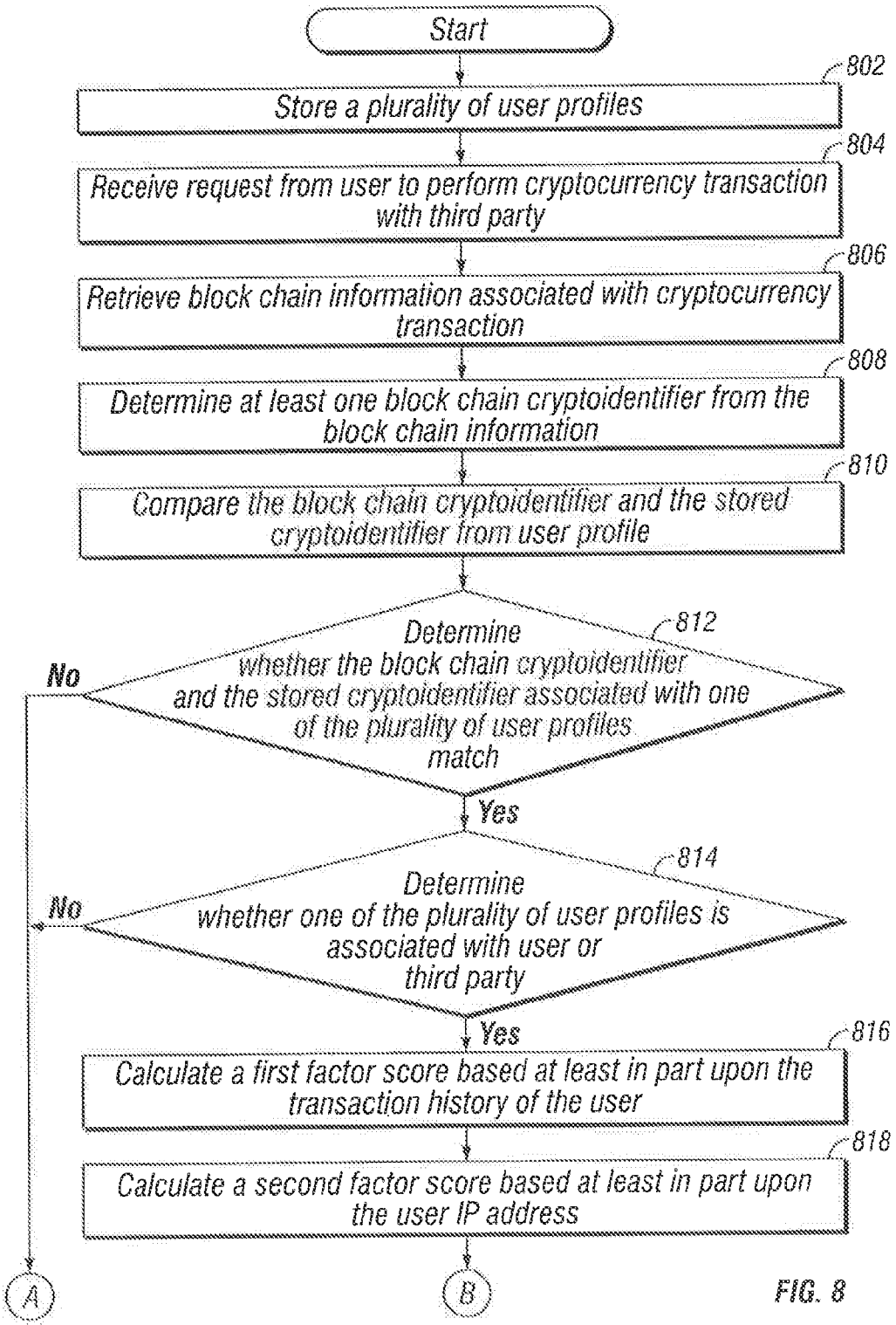
FIG. 8 illustrates an example flowchart for facilitating identification and alerting of suspicious activity associated with a cryptocurrency transaction.
Figure 8:
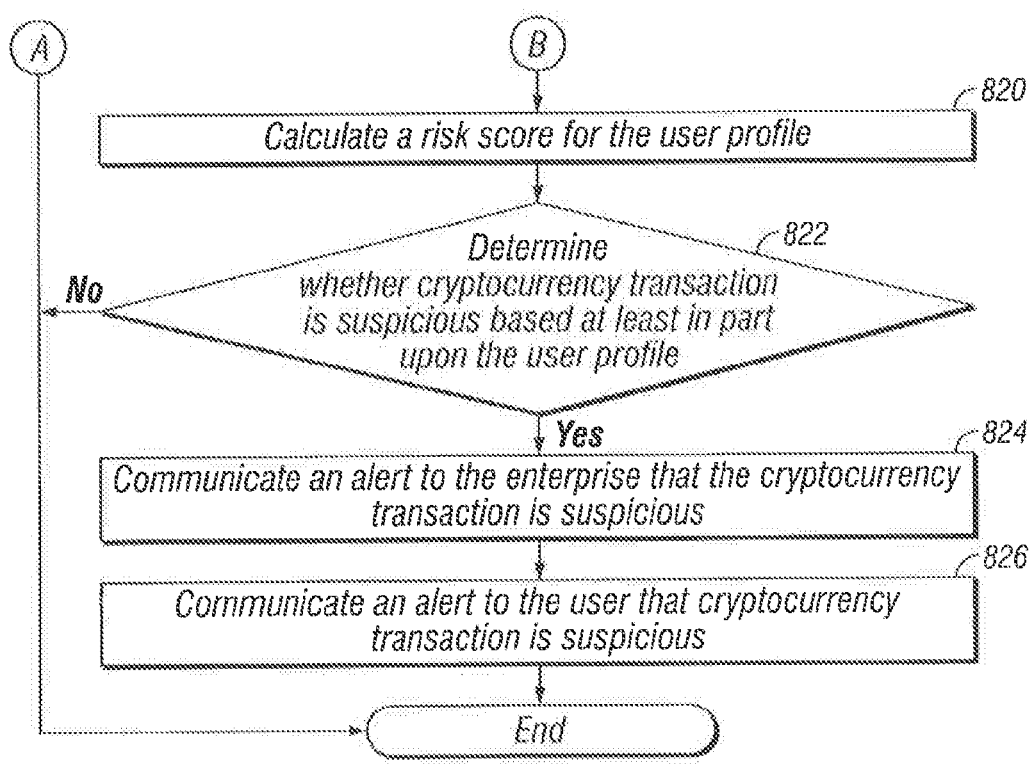

FIG. 8 illustrates an example flowchart for facilitating identification of a party to a transaction as a known user and alerting of suspicious activity associated with a cryptocurrency transaction based on the information regarding the known user that may be implemented in the example systems of FIG. 1 and/or FIG. 2. The method begins at step 802 wherein alert engine 230 stores a plurality of user profiles. In some embodiments the user profile is associated with a customer 102 of the enterprise, for example, a person who has at least one account with the enterprise. In some embodiments, the user profile is associated with a known party, but that known party does not have at least one account with the enterprise. For example, there may be a user profile for a beneficiary of an account, a power of attorney for an account, a third party the enterprise knows is suspicious or untrustworthy, or a transactor, which is a party who deposits money to an account. An example of a transactor is the night manager of a restaurant who deposits money into the restaurant's account. Thus, the restaurant would have a user profile and the night manager would also have a user profile even though he does not have an account with the enterprise.

In some embodiments, the plurality of user profiles are stored in memory 202 or customer accounts 203. In some embodiments, a user profile comprises information associated with the user, such as, but not limited to, a user name, a user address, one or more user public cryptocurrency keys, one or more user IP addresses, one or more user cryptocurrency wallets, and a financial transaction history (e.g., one or more transactions 208), which may include both fiat and cryptocurrency transactions. In some embodiments, not every possible user or third party has a stored user profile.

In step 804, alert engine 230 receives a request from a user to perform a cryptocurrency transaction with a third party. Examples of cryptocurrency transactions include making a purchase, transferring money from an account, and transferring money to an account. In some embodiments, the user may be a customer 102 of the enterprise, a transactor of the enterprise, a party unknown to the enterprise, or a known party to the enterprise. In some embodiments, the request may be initiated by user through an enterprise application on device 110. For example, user may request to transfer funds from a cryptocurrency account to a third party on device 110. In some embodiments, the request may be initiated by user utilizing a bank card, such as a debit card or credit card, when making a purchase.

In step 806, alert engine 230 retrieves block chain information associated with the cryptocurrency transaction and determines at least one block chain cryptoidentifier from the block chain information in step 808. In some embodiments, a block chain cryptoidentifier may comprise a public key, an IP address, and one or more cryptocurrency wallets. In some embodiments, the block chain cryptoidentifier may be from either the user or the third party associated with the requested transaction. For example, block chain information may include a user public key, a third party public key, and a user IP address, but not a third party IP address. Thus, in this example, alert engine 230 determines three block chain identifiers: the user public key, a third party public key, and a user IP address.

In step 810, alert engine 230 compares the block chain cryptoidentifier and the stored cryptoidentifier associated with one of the plurality of user profiles. In some embodiments, alert engine 230 may compare by performing a search through all of the stored customer cryptoidentifiers associated with the user profiles. For example, if the block chain cryptoidentifier comprises a public key of "examplepublickey1," then alert engine 230 will search through all of the user profiles and compare this public key to any of the stored public keys in the user profiles.

In step 812, alert engine 230 determines whether the block chain cryptoidentifier and the stored cryptoidentifier associated with one of the plurality of user profiles match. In some embodiments, the block chain cryptoidentifier must be identical to the stored cryptoidentifier associated with one of the plurality of user profiles. For example, alert engine 230 may determine that the block chain public key of "examplepublickey1" matches the public key in a user profile of "examplepublickey1," but will determine that the block chain public key of "examplepublickey1" does not match the public key in a user profile of "examplepublickey2." In some embodiments, alert engine determines a match when the block chain cryptoidentifier and stored cryptoidentifier associated with one of the plurality of user profiles comprise a certain number of similar characters. For example, alert engine 230 may determine that the block chain public key of "examplepublickey1" matches the public key in a user profile of "examplepublickey2."

If alert engine 230 determines in step 812 that the block chain cryptoidentifier and the stored cryptoidentifier associated with one of the plurality of user profiles do not match, then the method ends. If alert engine 230 determines in step 812 that the block chain cryptoidentifier and the stored cryptoidentifier associated with one of the plurality of user profiles match, then the method continues to step 814. In step 814, alert engine 230 determines whether one of the plurality of user profiles is associated with the user or the third party based on the retrieved block information and stored cryptoidentifiers associated with one of the plurality of user profiles. In certain embodiments, alert engine 230 may determine that the user is a customer of the enterprise based at least in part upon determining a block chain cryptoidentifier and a stored cryptoidentifier associated with one of the plurality of user profiles are a match. In certain embodiments, alert engine 230 determines that the third party is a transactor of the enterprise. For example, alert engine 230 may determine that the third party receiving the cryptocurrency transaction is the night manager at a restaurant because the third party utilizes public key "examplepublickey1" and the night manager at a restaurant utilizes public key "examplepublickey1." As another example, a customer of the enterprise may request the cryptocurrency transaction without logging into the customer's enterprise account. Thus, the enterprise may not initially recognize who the customer is. However, once determining the public key of the user, alert engine 230 may determine the user is a specific customer, transactor, or known party of the enterprise.

If alert engine 230 determines in step 814 that one of the plurality of user profiles is not associated with the user or the third party based on the retrieved block information and stored cryptoidentifiers associated with one of the plurality of user profiles, then the method ends. If alert engine 230 determines in step 814 that one of the plurality of user profiles is associated with the user or the third party based on the retrieved block information and stored cryptoidentifiers associated with one of the plurality of user profiles, then the method continues to step 816. In step 816, alert engine 230 calculates a first factor score based at least in part upon the transaction history of the user profile associated with either the user requesting the transaction or the third party in the transaction. In some embodiments, the transaction history may include the entire transaction history of a user or may include only certain transactions. For example, the transaction history may include only transactions over a certain amount of cryptocurrency. As another example, the transaction history may include only transactions within a certain time period, such as transactions that occurred within the last one month, the last one year, or the last five years. The first factor score may be associated with the suspicious or seemingly fraudulent past transactions associated with the user profile. In some embodiments, suspicious transactions, such as a high value transaction of 1000 units of cryptocurrency, may indicate a higher risk of fraudulent activity and thus increase the first factor score. In some embodiments, alert engine 230 determines the pattern of spending based on the transaction history and is able to determine if the current transaction is a common transaction or an abnormal one compared to the transaction history. For example, if the user associated with the user profile regularly transmits 1000 units of cryptocurrency on a weekly basis, then alert engine 230 may determine the requested transaction of 1000 units of cryptocurrency indicates a lower risk of fraudulent activity and thus decreases the first factor score.

In step 818, alert engine 230 calculates a second factor score based at least in part upon the user profile IP address. In some embodiments, alert engine 230 determines a location associated with the user profile IP address. In some embodiments, the determined location may be a physical address, GPS coordinates, a city, a state, or a country. In some embodiments, the second factor score may increase for a location associated with high risk and decrease for a location associated with low risk, depending on the circumstances associated with customer 102. For example, if alert engine 230 determines the location is a country, and that country is commonly associated with fraudulent IP addresses, then the second factor score may increase. In some embodiments, alert engine 230 may compare the requesting user IP address from the block chain information and the user profile IP address to calculate the second factor score. For example, if the user profile IP address is associated with one state, but requesting user (which was determined to be associated with this user profile) utilizes an IP address that reflects a location in another state or country, then the second factor score may increase because the requesting user IP address does not match the user profile IP address.

In step 820, alert engine 230 calculates a risk score for the user profile based at least in part upon the first factor score and the second factor score. In certain embodiments, alert engine 230 calculates a risk score for the user profile based at least in part upon one or both of the first factor score and the second factor score. For example, if in step 818, alert engine 230 determines a high second factor score because of a suspicious IP address, then alert engine 230 may determine a high risk score. As another example, if in step 816, alert engine 230 determines a low first factor score because there are no or very few large transactions in the transaction history of the user profile, then alert engine 230 may calculate a low risk score.

The method continues in step 822 and alert engine 230 determines whether cryptocurrency transaction is suspicious based at least in part upon the user profile. In some embodiments, alert engine 230 determines the cryptocurrency transaction is suspicious based on at least one of the first factor score, second factor score, and risk score. For example, if the risk score is high, it may indicate the user or third party associated with the user profile has engaged in potentially fraudulent transactions and thus makes it more likely that the current requested transaction may also be suspicious. Alert engine 230 may compare the risk score to one or more thresholds to determine whether the transaction is suspicious. For example, if the risk score is 50, alert engine 230 may determine it is higher than the threshold of 20 and thus alert engine 230 determines the transaction is suspicious.

If alert engine 230, in step 822, determines the cryptocurrency transaction is not suspicious based at least in part upon the user profile, then the method ends. If alert engine 230, in step 822, determines the cryptocurrency transaction is suspicious based at least in part upon the user profile, then the method continues to step 824. In step 824, alert engine 230 communicates an alert to the enterprise that the cryptocurrency transaction is potentially suspicious. In some embodiments, alert engine 230 communicates an alert regarding whether the cryptocurrency transaction is suspicious based on the third party's association with a suspicious user profile or the requesting user's association with a suspicious user profile. In certain embodiments, the alert may include a notification that the cryptocurrency transaction may not be completed based on the suspiciousness of the cryptocurrency transaction. Alert engine 230 may also allow the transaction to be completed, but associate a "flag" or other warning with the user profile associated with either the third party or the requesting user in certain embodiments.

In step 826, alert engine 230 communicates an alert to the requesting user that the cryptocurrency transaction is suspicious based on the user profile associated with the third party. In certain embodiments, the requesting user may be a trusted customer 102 of the enterprise and alert engine 230 may warn customer 102 of the risk in transacting with this third party. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as alert engine 230 performing the steps, any suitable component of enterprise cryptocurrency server 130 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 9:
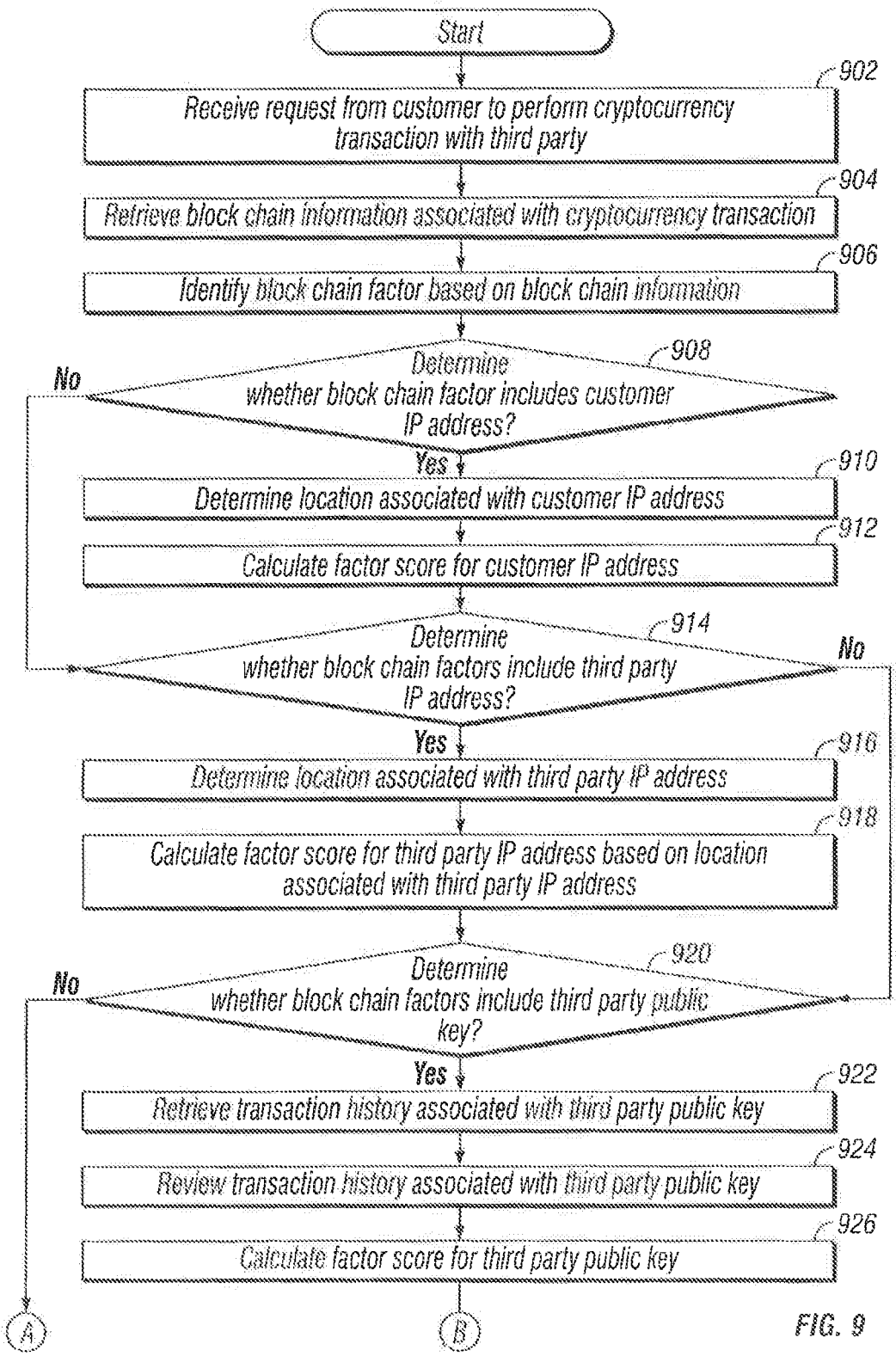
FIG. 9 illustrates an example flowchart for facilitating cryptocurrency risk detection.
Figure 9:
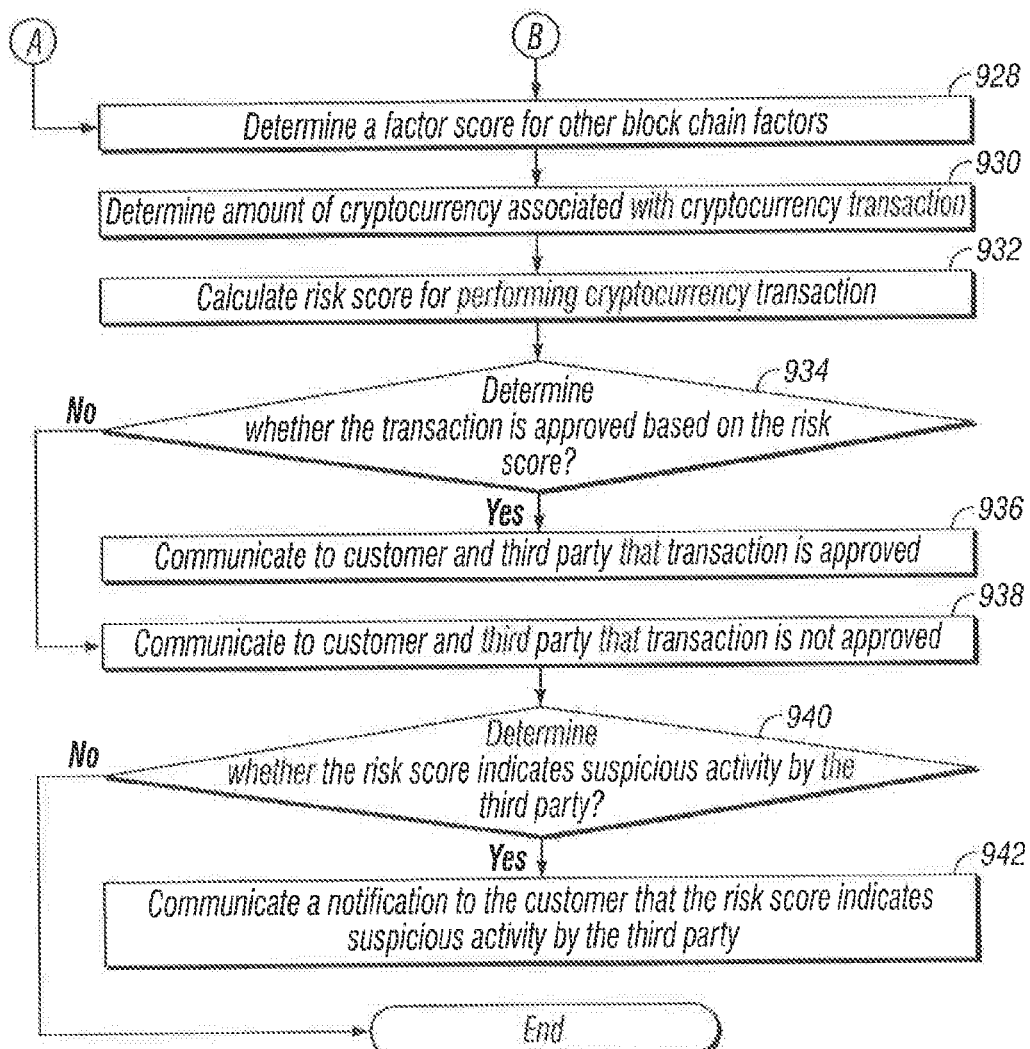

FIG. 9 illustrates an example flowchart for facilitating cryptocurrency risk detection. The method begins at step 902 by receiving a request from a customer 102 to perform a cryptocurrency transaction with a third party. In some embodiments, the request may be initiated by customer 102 through an enterprise application on device 110. In some embodiments, the request may be initiated by customer 102 utilizing a bank card, such as a debit card or credit card, when making a purchase. Examples of cryptocurrency transactions include making a purchase, transferring money from an account, and transferring money to an account. In some embodiments, the third party may be a second customer 102 of the enterprise, a merchant, a retailer, a person outside the enterprise, an account outside the enterprise, or an account with an unknown owner.

At step 904, cryptocurrency risk detection engine 232 retrieves block chain information associated with the cryptocurrency transaction and identifies at least one block chain factor based at least in part upon block chain information in step 906. In some embodiments, a block chain factor may comprise a customer IP address, a third party IP address, a customer public key, a third party public key, an age of the customer public key, an age of a third party public key, or an age of the cryptocurrency. The block chain information may comprise one, some, or all of these block chain factors.

Cryptocurrency risk detection engine 232, in step 908, determines whether the at least one block chain factor identified in step 906 includes a customer IP address. The customer IP address is the IP address associated with customer 102 of the enterprise. If the at least one block chain factor does not include a customer IP address, the method continues to step 914. If the at least one block chain factor includes a customer IP address, then cryptocurrency risk detection engine 232, in step 910, determines the location associated with the customer IP address. In some embodiments, the determined location may be a physical address, GPS coordinates, a city, a state, or a country. In step 912, cryptocurrency risk detection engine 232 calculates a factor score for the customer IP address based at least in part upon the location associated with the customer IP address. In some embodiments, the factor score may increase for a location associated with high risk and decrease for a location associated with low risk, depending on the circumstances associated with customer 102. For example, if cryptocurrency risk detection engine 232 determines the location is a country, and that country is frequently associated with fraudulent transactions, then the factor score may increase. As another example, if it is known that customer 102 resides in a state, but the IP address reflects a location in another state or country, then the factor score may increase because customer 102 is not in the normal location.

Cryptocurrency risk detection engine 232, in step 914 determines whether the at least one block chain factor identified in step 906 includes a third party IP address. The third party IP address is the IP address associated with third party. If the at least one block chain factor does not include a third party IP address, the method continues to step 920. If the at least one block chain factor includes a third party IP address, then cryptocurrency risk detection engine 232, in step 916, determines the location associated with the third party IP address. In some embodiments, the determined location may be a physical address, GPS coordinates, a city, a state, or a country. In step 918, cryptocurrency risk detection engine 232 calculates a factor score for the third party IP address based at least in part upon the location associated with the third party IP address. In some embodiments, the factor score may increase for a location associated with high risk and decrease for a location associated with low risk, depending on the circumstances. For example, if cryptocurrency risk detection engine 232 determines the location is a restricted country, and the enterprise is subject to restrictions that it cannot receives funds or send funds to the restricted country, then the factor score may increase.

In step 920, cryptocurrency risk detection engine 232 determines whether the at least one block chain factor identified in step 906 includes a third party public key. If cryptocurrency risk detection engine 232 determines that the at least one block chain factor identified in step 906 does not include a third party public key, then the method continues at step 928. If cryptocurrency risk detection engine 232 determines the at least one block chain factor identified in step 906 includes a third party public key, then it retrieves the transaction history associated with the third party public key in step 922. In some embodiments, cryptocurrency risk detection engine 232 may retrieve the transaction history from transactions 208 stored in the enterprise cryptocurrency server 130. In other embodiments, cryptocurrency risk detection engine 232 may retrieve the transaction history from a source outside the enterprise, such as the third party enterprise server 150 or the internet. In step 924, cryptocurrency risk detection engine 232 reviews the transaction history associated with third party public key. In some embodiments, the review may include the transaction history of other public keys located in the same wallet as the third party public key. In some embodiments, the review includes the entire transaction history or only certain transactions. For example, cryptocurrency risk detection engine 232 may review only transactions over a certain amount of cryptocurrency. As another example, the review may include only transactions within a certain time period, such as transactions that occurred within the last one month, the last one year, or the last 5 years.

In step 926, cryptocurrency risk detection engine 232 calculates a factor score for the third party public key based at least in part upon the transaction history associated with the third party public key. The factor score may be associated with the potentially suspicious or seemingly fraudulent past transactions associated with the third party public key. In some embodiments, suspicious transactions, such as a high value transaction of 1000 units of cryptocurrency, may indicate a higher risk of fraudulent activity and thus increase the factor score. In some embodiments, cryptocurrency risk detection engine 232 determines a pattern of spending based on the transaction history and then determines if the current transaction is a common transaction or an abnormal one compared to the transaction history. For example, if the third party public key regularly transmits 1000 units of cryptocurrency on a weekly basis, then cryptocurrency risk detection engine 232 may determine the requested transaction of 1000 units of cryptocurrency indicates a lower risk of fraudulent activity and thus decreases the factor score.

Cryptocurrency risk detection engine 232 determines a factor score for the at least one block chain factor in step 928. In some embodiments, the at least one block chain factor only includes a customer IP address, a third party IP address, and a third party public key, such that there are no other factor scores to determine. If the at least one block chain factor includes other block chain factors, for example, an age of the customer public key, an age of the third party public key, or an age of the cryptocurrency, then cryptocurrency risk detection engine 232 determines a factor score for each of these other block chain factors. In some embodiments, the factor score for the age of the customer public key and the factor score for the age of the third party public key may increase as the age increases and decrease as the age decreases. For example, a new third party public key may indicate a risk of fraudulent activity because a third party may have created it only to engage in a fraudulent transaction. In this example, cryptocurrency risk detection engine 232 may calculate a high factor score for the age of the third party public key. In some embodiments, an increase in age of the cryptocurrency itself may decrease the factor score for the age of the cryptocurrency. For example, a recently created unit of cryptocurrency may have been created through fraudulent means, and it may indicate a higher risk, and thus increase the factor score for the age of the cryptocurrency. Although certain embodiments are described, it should be understood that there can be any number of factor scores corresponding to one or more block chain factors.

In step 930, cryptocurrency risk detection engine 232 determines the amount of cryptocurrency associated with the cryptocurrency transaction. Although different types of cryptocurrencies use different units of cryptocurrency, cryptocurrency risk detection engine 232 is able to determine the amount of cryptocurrency in the appropriate unit. In addition, cryptocurrency risk detection engine 232 can determine fractions of the unit of cryptocurrency. For example, cryptocurrency risk detection engine 232 is able to determine the cryptocurrency transaction includes 1000 Bitcoins, 0.001 Litecoins, 1 million Namecoins, 7.5 Dogecoins, 23 Peercoins, or 1 Mastercoin.

In step 932 cryptocurrency risk detection engine 232 calculates a risk score for performing the cryptocurrency transaction based at least in part upon the block chain information and the amount of cryptocurrency. The risk score may be calculated in a number of suitable ways. In some embodiments, the risk score increases as the amount of cryptocurrency increases assuming that the larger the transaction the higher the risk of a fraudulent transaction. For example, if the transaction is for 2 million units of cryptocurrency, rather than 10 units of cryptocurrency, then the risk score may increase. In some embodiments, the risk score will be based at least in part upon the factor scores for the at least one block chain factor. For example, cryptocurrency risk detection engine 232 may add all of the factor scores up to determine the overall risk score. In some embodiments, cryptocurrency risk detection engine 232 may weight each of the factor scores depending on the importance to risk of fraud. For example, there may be a high concern related foreign IP addresses and thus cryptocurrency risk detection engine 232 may weight that factor score by two when calculating the risk score. In some embodiments, cryptocurrency risk detection engine 232 determines the average of all of the factor scores when calculating the risk score. In some embodiments, cryptocurrency risk detection engine 232 calculates an overall factor score and multiples it by the amount of cryptocurrency.

In step 934, cryptocurrency risk detection engine 232 determines whether the transaction is approved based at least upon the risk score. In some embodiments, cryptocurrency risk detection engine 232 compares the risk score to a threshold to determine whether the transaction is approved. For example, if the risk score is above the threshold, then it is not approved and if the risk score is below the threshold then it is approved. In some embodiments, the threshold may change depending on the customer, the third party, the type of cryptocurrency, the amount of cryptocurrency, or any other factor relating to the transaction. For example, if the customer is long-term, important, reliable, or trustworthy, then the threshold may be set higher and allow the customer to engage in higher risk transactions with a larger risk score.

If cryptocurrency risk detection engine 232 determines that the transaction is approved in step 934, then in step 936, it is communicated to the customer and the third party that the transaction is approved. If cryptocurrency risk detection engine 232 determines that the transaction is not approved in step 934, then in step 938, it is communicated to the customer and the third party that the transaction is not approved.

In some embodiments, these communications may be delivered to third party enterprise server 150, device 110, or enterprise cryptocurrency server 130. For example, the communication may be in the form of an email associated with the customer's account and display a message that the transaction is not approved. This communication may also include one or more reasons why the transaction was or was not approved in certain embodiments.

In step 940, cryptocurrency risk detection engine 232 determines whether the risk score indicates potentially suspicious activity by the third party. In some embodiments, cryptocurrency risk detection engine 232 may determine suspicious activity if the risk score is above a certain threshold. For example, if the risk score is below the transaction approval threshold, but above the potentially suspicious activity threshold, then cryptocurrency risk detection engine 232 may determine suspicious activity. As another example, if the risk score is above the transaction approval threshold, cryptocurrency risk detection engine 232 may determine suspicious activity by the third party. If cryptocurrency risk detection engine 232 determined in step 940 that the risk score does not indicate potentially suspicious activity by the third party, then the method ends.

If cryptocurrency risk detection engine 232 determined in step 940 that the risk score indicates potentially suspicious activity by the third party, then in step 942 the method communicates a notification to the customer that the risk score indicates potentially suspicious activity by the third party. In some embodiments, these communications may be delivered to device 110 through the enterprise application. For example, the communication may comprise a pop up notification from the enterprise application displaying a message that the risk score indicates potentially suspicious activity by the third party from the enterprise application. In certain embodiments, this communication may also include what the suspicious activity is, the highest factor score from the block chain factors, or the risk score comparison to the threshold. This communication may also include information regarding whether the transaction was approved. For example, a message may be displayed to customer 102 saying that although the transaction of receiving 2 Bitcoins from third party was approved, the third party's behavior is suspicious because it was delivered from a suspicious country. As another example, the message may specify that the third party's transaction history includes transactions involving over 2000 Litecoins on a daily basis. In some embodiments, the notification may include information about why the third party's activity is suspicious, but also allow customer 102 to verify that customer 102 wants to perform the transactions despite the high risk score and potentially suspicious activity. After communicating a notification to customer, the method ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as cryptocurrency risk detection engine 232 performing the steps, any suitable component of enterprise cryptocurrency server 130 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 10:
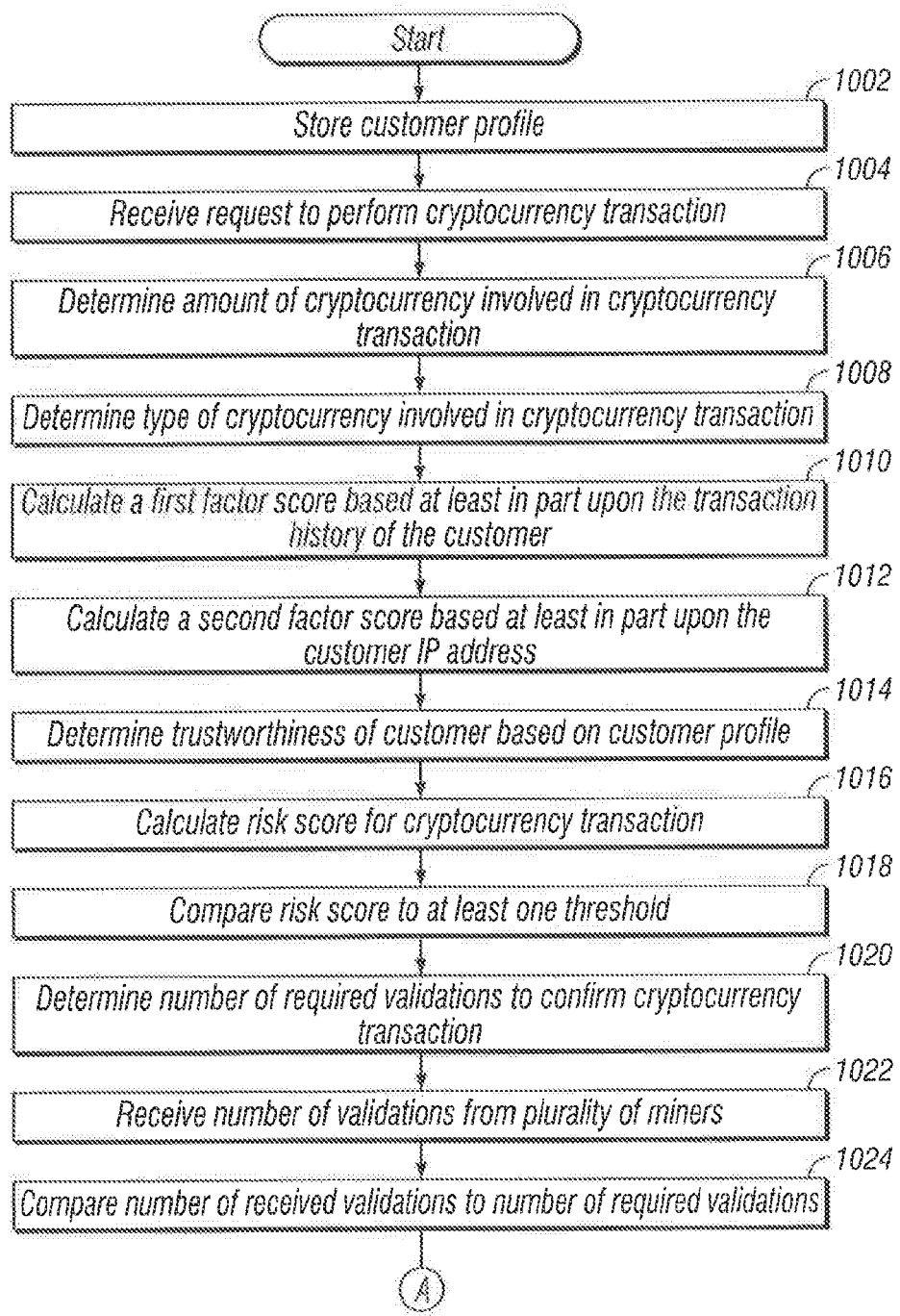
FIG. 10 illustrates an example flowchart for facilitating cryptocurrency validation.
Figure 10:
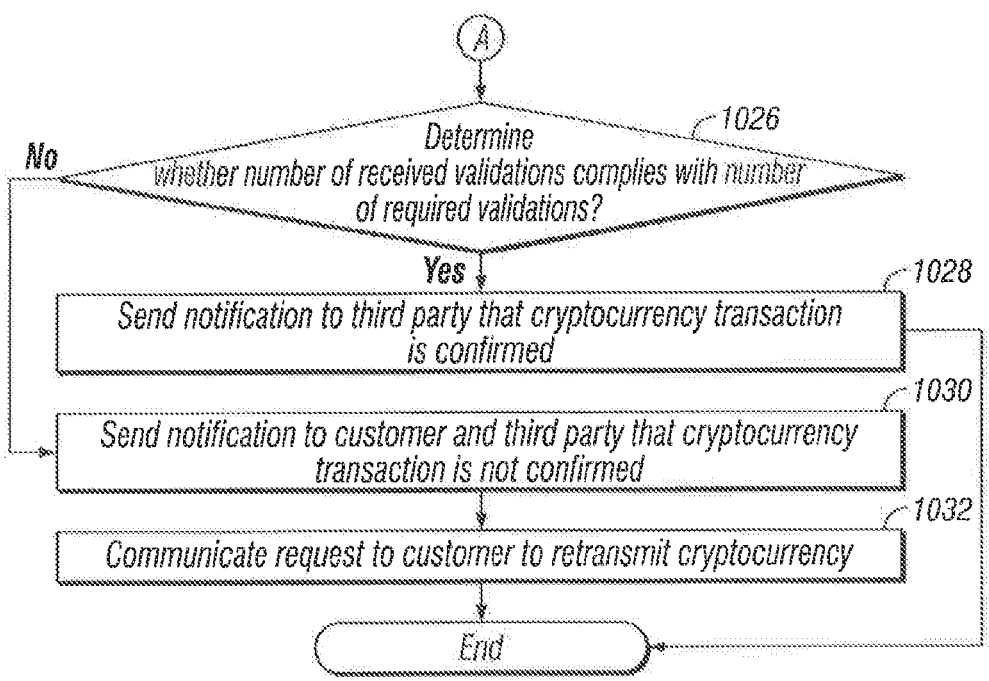

FIG. 10 illustrates an example flowchart for facilitating cryptocurrency validation. The method begins at step 1002 by storing a customer profile associated with customer 102 in memory 202 or customer accounts 203. Memory 202 and customer accounts 203 may comprise a plurality of customer profiles. In some embodiments, each customer 102 has an individual customer profile. In some embodiments, a customer profile contains multiple customers 102 with a commonality, such as a common home address or a common cryptocurrency account. For example, a mother and a daughter may have a single joint cryptocurrency account with the enterprise and thus the customer profile may include information regarding both the mother and her daughter. In some embodiments, customer profile comprises information associated with a customer 102, including, but not limited to, a customer name, a customer address, one or more customer public cryptocurrency keys, one or more customer IP addresses, one or more customer cryptocurrency wallets, and a cryptocurrency transaction history.

In step 1004, validation engine 234 receives a request to perform a cryptocurrency transaction with a third party. Examples of cryptocurrency transactions include making a purchase, transferring money from an account, and transferring money to an account. In some embodiments, the request may be initiated by customer 102 through an enterprise application on device 110. For example, customer 102 may use device 110 to request to transfer funds from a cryptocurrency account to a third party on device 110. In some embodiments, the request may be initiated by customer 102 utilizing a cryptocurrency bank card, such as a debit card or credit card encoded with cryptocurrency information associated with a customer account 203 associated with customer 102, when making a purchase. For example, customer 102 may be using a cryptocurrency debit card to purchase a basketball from a third party's website, such as a sporting goods store. In some embodiments, the third party may be a merchant, a retailer, a business, a person outside the enterprise, or an account outside the enterprise.

In step 1006, validation engine 234 determines the amount of cryptocurrency involved in the cryptocurrency transaction. Although different types of cryptocurrencies use different units of cryptocurrency, validation engine 234 may determine the amount of cryptocurrency in the appropriate unit. In addition, validation engine 234 may determine fractions of the unit of cryptocurrency. For example, cryptocurrency risk detection engine 232 is able to determine that the cryptocurrency transaction includes 1000 Bitcoins, 0.001 Litecoins, 1 million Namecoins, 7.5 Dogecoins, 23 Peercoins, or 1 Mastercoin. In certain embodiments, a cryptocurrency transaction may include a plurality of types of cryptocurrency and validation engine 234 determines the amount of each individual cryptocurrency. For example, validation engine 234 may determine that a cryptocurrency transaction involves 1 Bitcoin, 2 Dogecoins, and 0.001 Mastercoins. Validation engine 234 may also determine exchange rates between the types of cryptocurrencies, such that it can determine an objective amount of total cryptocurrency involved in the transaction. For example, validation engine 234 may determine a cryptocurrency transaction involving 1 Bitcoin, 2 Dogecoins, and 0.001 Master coins is equivalent to 5 Litecoins.

In step 1008, validation engine 234 determines the type of cryptocurrency involved in the cryptocurrency transaction. For example, validation engine 234 may determine that only Bitcoins are involved in the requested transaction. In certain embodiments, validation engine 234 determines that multiple types of cryptocurrency are involved in the cryptocurrency transaction. For example, validation engine 234 may determine that the transaction includes two types of cryptocurrencies, but does not specify which types of cryptocurrency. In certain embodiments, validation engine 234 determines the specific type of cryptocurrencies involved in the transaction. For example, validation engine 234 may determine that the transaction includes Peercoins and Dogecoins, or that the transaction includes Bitcoins, Dogecoins, and Mastercoins.

In step 1010, validation engine 234 calculates a first factor score based at least in part upon the transaction history of customer 102. In some embodiments, the transaction history may include the entire transaction history of customer 102 or may include only certain transactions. For example, the transaction history may include only transactions over a certain amount of cryptocurrency. As another example, the transaction history may include only transactions within a certain time period, such as transactions that occurred within the last one month, the last one year, or the last 5 years. In certain embodiments, the transaction history of customer 102 may include only transactions from a certain public key, transactions from one or more public keys contained in the same wallet, or a combination of these transactions. The first factor score may be associated with the suspicious or seemingly fraudulent past transactions associated with customer 102. In some embodiments, suspicious transactions, such as a high value transaction of 1000 units of cryptocurrency, may indicate a higher risk of fraudulent activity and thus increase the first factor score. In some embodiments, validation engine 234 determines a pattern of spending based on the transaction history and is able to determine if the current transaction is a common transaction or an abnormal one compared to the transaction history. For example, if customer 102 regularly transmits 1000 units of cryptocurrency on a weekly basis, then validation engine 234 may determine the requested transaction of 1000 units of cryptocurrency indicates a lower risk of fraudulent activity and thus decrease the first factor score.

In step 1012, validation engine 234 calculates a second factor score based at least in part upon the customer IP address. In some embodiments, validation engine 234 determines a location associated with the customer IP address. In some embodiments, the determined location may be a physical address, GPS coordinates, a city, a state, or a country. In some embodiments, the second factor score may increase for a location associated with high risk and decrease for a location associated with low risk, depending on the circumstances associated with customer 102. For example, if validation engine 234 determines the location is a country, and that country is commonly associated with fraudulent IP addresses, then the second factor score may increase. As another example, if it is known that customer 102 resides in one state, but the IP address reflects a location in another state or country, then the second factor score may increase because customer 102 sends a request to transfer funds from an abnormal location for customer 102.

In step 1014, validation engine 234 determines the trustworthiness of customer 102 based at least upon the stored customer profile. In certain embodiments, the trustworthiness may be stored in the customer profile. The enterprise may have previously determined that customer 102 is trustworthy because, for example, customer 102 has a long history as a customer of the enterprise and the enterprise has experienced no issues with the accounts or activities of customer 102. Also, validation engine 234 may determine the trustworthiness of customer 102 based at least in part upon the first factor score and/or the second factor score. For example, if in step 1012, validation engine 234 determines a high factor score because of a suspicious IP address, then validation engine 234 may determine that customer 102 is not trustworthy. As another example, if in step 1010, validation engine 234 determines a low first factor score because there are no or very few large transactions in the transaction history of customer 102, then validation engine 234 may determine customer 102 is trustworthy. In some embodiments, the trustworthiness of customer 102 may be represented by a sliding scale, a number, a checkmark, a yes, a no, or a verbal qualifier such as very, incredibly, not, not very, or not at all.

In step 1016, validation engine 234 calculates a risk score for the cryptocurrency transaction based at least in part upon the amount of cryptocurrency, the type of cryptocurrency, and the trustworthiness of the customer. The risk score may be calculated in a number of suitable ways. In some embodiments, the risk score increases as the amount of cryptocurrency increases assuming that the larger the transaction, the higher the risk of a fraudulent transaction. For example, if the transaction is for 2 million units of cryptocurrency, then the risk score will increase.

In some embodiments, the risk score may be based upon the type of cryptocurrency. For example, Litecoin may be more likely to involve a fraudulent transaction, while Dogecoin may be less likely to involve a fraudulent transaction. Thus, if validation engine 234 determines the cryptocurrency transaction involves Litecoin, then the risk score may increase, but if the cryptocurrency transaction involves Dogecoin, then the risk score may decrease. As another example, a "mixed" cryptocurrency transaction that includes multiple types of cryptocurrency, for example 1 Bitcoin and 2 Litecoins, may indicate an increase in the risk of a fraudulent transaction. Thus, if validation engine 234 determines the cryptocurrency transaction is a "mixed" cryptocurrency transaction, then the risk score may increase.

In certain embodiments, the risk score may decrease if customer 102 is trustworthy. For example, if the amount and type of cryptocurrency creates a high risk score, but validation engine 234 determines customer 102 is incredibly trustworthy, then validation engine 234 may lower the risk score associated with the cryptocurrency transaction. As another example, if validation engine 234 determines customer 102 is only moderately trustworthy, then the risk score may neither increase nor decrease.

In some embodiments, validation engine 234 may weight each of the factors contributing to the risk score depending on the importance of risk of fraud. For example, it may be known by validation engine 234 that the amount of the cryptocurrency transaction is the biggest factor contributing to whether the transaction is likely fraudulent. Thus validation engine 234 may more heavily weight this factor in determining the risk score.

In step 1018, validation engine 234 compares the risk score to at least one threshold. In certain embodiments, the at least one threshold may be predetermined or may be configured by enterprise cryptocurrency server 130 or validation engine 234. Validation engine 234 may determine that the risk score is greater than, less than, or equal to the threshold in certain embodiments. In some embodiments, validation engine 234 may determine that the risk score is between one or more thresholds. For example, if there are three thresholds of 10, 50, and 100, and the risk score is 50.5, validation engine 234 may determine that the risk score is greater than the threshold of 50 and less than the threshold of 100.

In step 1020, validation engine 234 determines the number of required validations to confirm the cryptocurrency transaction. In some embodiments, a number of thresholds may correspond to the number of required validations to confirm the cryptocurrency transaction. Using the example above, validation engine 234 may determine a risk score below threshold 10 requires 1 validation, a risk score between thresholds 10 and 50 requires 2 validations, a risk score between thresholds 50 and 100 requires 4 validations, and a risk score above threshold 100 requires 6 validations.

In step 1022, validation engine 234 receives a number of validations from a plurality of miners and in step 1024, validation engine 234 compares the number of received validations to the number of required validations. In certain embodiments, validation engine 234 may determine the number of received validations is greater than, less than, or equal to the number of required validations. For example, validation engine 234 may receive two validations and determine this is less than the five required validations.

The method continues to step 1026, where validation engine 234 determines whether the number of received validations complies with the number of required validations. In certain embodiments, the number of received validations must be equal to or greater than the number of required validations for validation engine 234 to determine they comply with each other. For example, validation engine 234 may determine in step 1020 that the three received validations is greater than the required number of two validations and thus validation engine 234 determines that the number of received validations complies with the number of required validations.

If validation engine 234 determines that the number of received validations complies with the number of required validations in step 1026, then in step 1028, validation engine 234 sends a notification to the third party that the cryptocurrency transaction is confirmed and the method ends. In some embodiments, sending a notification to the third party may simplify the process of third parties accepting cryptocurrency as payment from customer 102. For example, validation engine 234 sending a notification to the third party that the cryptocurrency transaction is confirmed does not require that the third party determine the number of validations itself. If validation engine 234 determines that the number of received validations does not comply with the number of required validations in step 1026, then in step 1030, validation engine 234 sends a notification to customer 102 and the third party that the cryptocurrency transaction is not confirmed. In some embodiments, validation engine 234 may transmit the notification to third party enterprise server 150. Validation engine 234 may transmit the notification to a third party device, such as the one that requested the transaction, in some embodiments. For example, if customer 102 attempts to pay for an item at a third party retailer store with a bank cryptocurrency card or with device 110, then validation engine 234 may transmit the notification to the cash register attempting to complete the purchase for customer 102.

The method continues in step 1032, where validation engine 234 may communicate a request to customer 102 to retransmit cryptocurrency. The request may be in the form of a notification, as described above, that customer 102 receives on device 110. For example, the notification may be communicated as an email, text message, alert in the customer account, or a pop up on the enterprise application. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as validation engine 234 performing the steps, any suitable component of enterprise cryptocurrency server 130 may perform one or more steps of the method.

Figure 11:
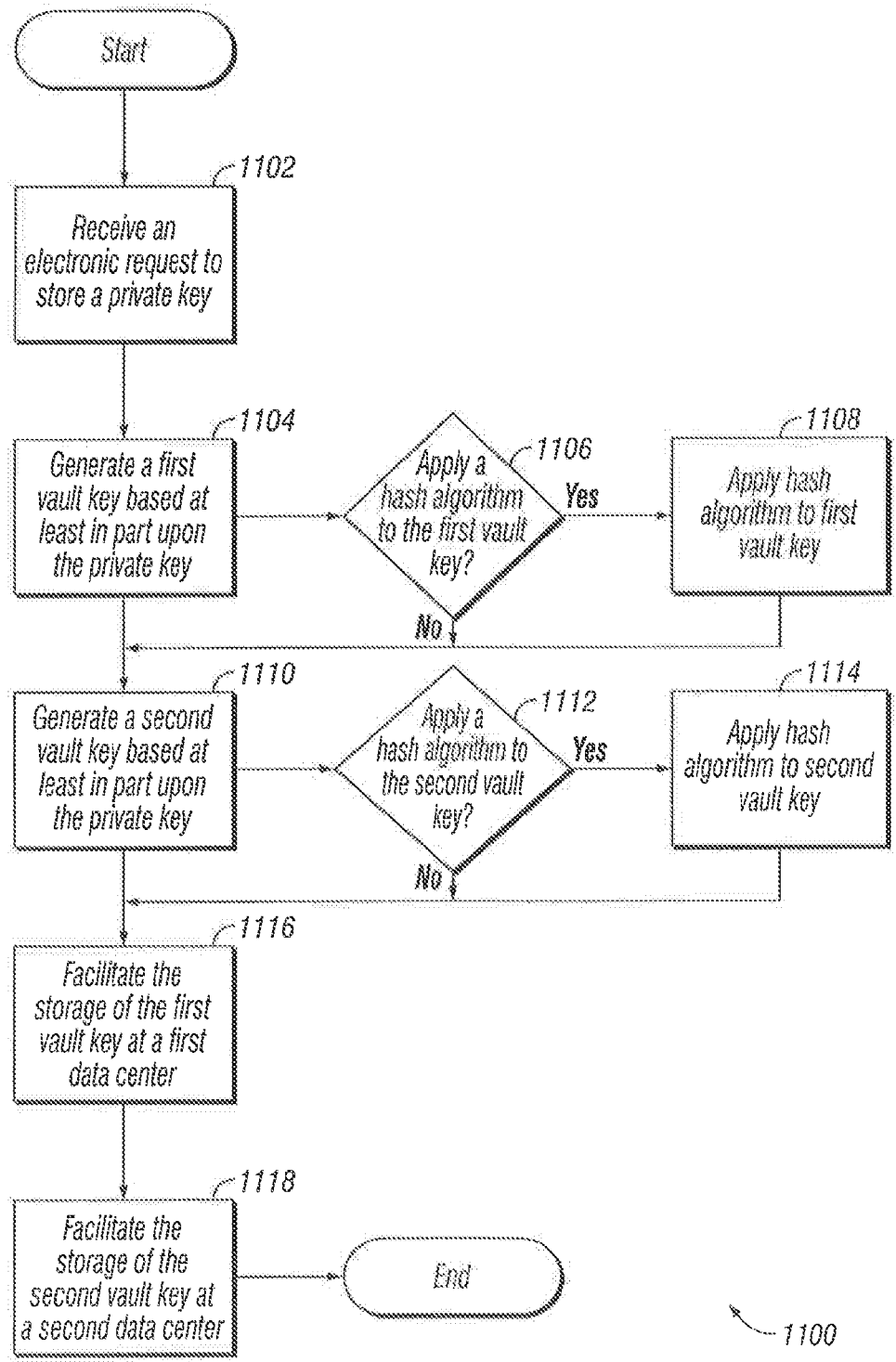
FIG. 11 illustrates an example flowchart for facilitating cryptocurrency storage in an online vault.

FIG. 11 illustrates an example flowchart for facilitating cryptocurrency storage in an online vault that may be implemented by the example systems of FIG. 1 and/or FIG. 2. At step 1102, enterprise cryptocurrency server 130 may receive an electronic request to store a private key associated with cryptocurrency. For example, enterprise cryptocurrency server 130 may receive such a request over links 116. The request may be in conjunction with or may include a request to store or associate cryptocurrency with a certain customer account 203. In response to the request, at step 1104 enterprise cryptocurrency server 130 may use vault engine 236 to generate a first vault key based at least in part upon the private key. A vault key may be any suitable portion of the received private key that may be stored in online vault 210.

At step 1106, vault engine 236 may determine whether a function or algorithm (e.g., hash function, encryption function, etc.) should be applied to the first vault key. If no function or algorithm may be applied, then the example method may proceed to step 1110. Otherwise, in response to determining that a hash function, for example, at step 1108, may be applied to the first generated vault key, vault engine 236 may apply the hash function to the second vault key. Vault engine 236 may do this by selecting a particular hash function from a plurality of hash functions. In certain embodiments, the selection may be based on the geographic location of where the first vault key may be stored. After applying the hash function, vault engine 236 may store information associated with the generated first vault key such that that the private key may be retrieved by enterprise cryptocurrency server 130 subsequent to the storage in online vault 210. The example method may proceed to step 1110.

Next, at step 1110, vault engine 236 may generate a second vault key based at least in part upon the private key. The second vault key may be any suitable portion of the received private key that may be stored in online vault 210. The second vault key may be a distinct portion of the private key from the portion of the private key used for the first vault key or there may be some overlap. At step 1112, vault engine 236 may determine whether a function or algorithm (e.g., hash function, encryption function, etc.) should be applied to the second vault key. If no function or algorithm may be applied, then the example method may proceed to step 1116. Otherwise, in response to determining that a hash function, for example, may be applied to the second generated vault key, at step 1114, vault engine 236 may apply the hash function to the second vault key. Vault engine 236 may do this by selecting a particular hash function from a plurality of hash functions. In certain embodiments, the selection may be based on the geographic location of where the second vault key may be stored. According to some embodiments the function applied to the second vault key may be different than the function applied to the first vault key. After applying the hash function, vault engine 236 may store information associated with the generated second vault key such that that the private key may be retrieved by enterprise cryptocurrency server 130 subsequent to the storage in online vault 210. The example method may proceed to step 1116.

Once the vault keys are generated, at step 1116, vault engine 236 may facilitate the storage of the vault keys in online vaults 210. For example, vault engine 236 may facilitate the storage of the first vault key in a first online vault 210 at a first data center (e.g., data center server 160a). Next, at step 1118, vault engine 236 may facilitate the storage of the second vault key in a second online vault 210 at a second data center (e.g., data center server 160b).

Figure 12:
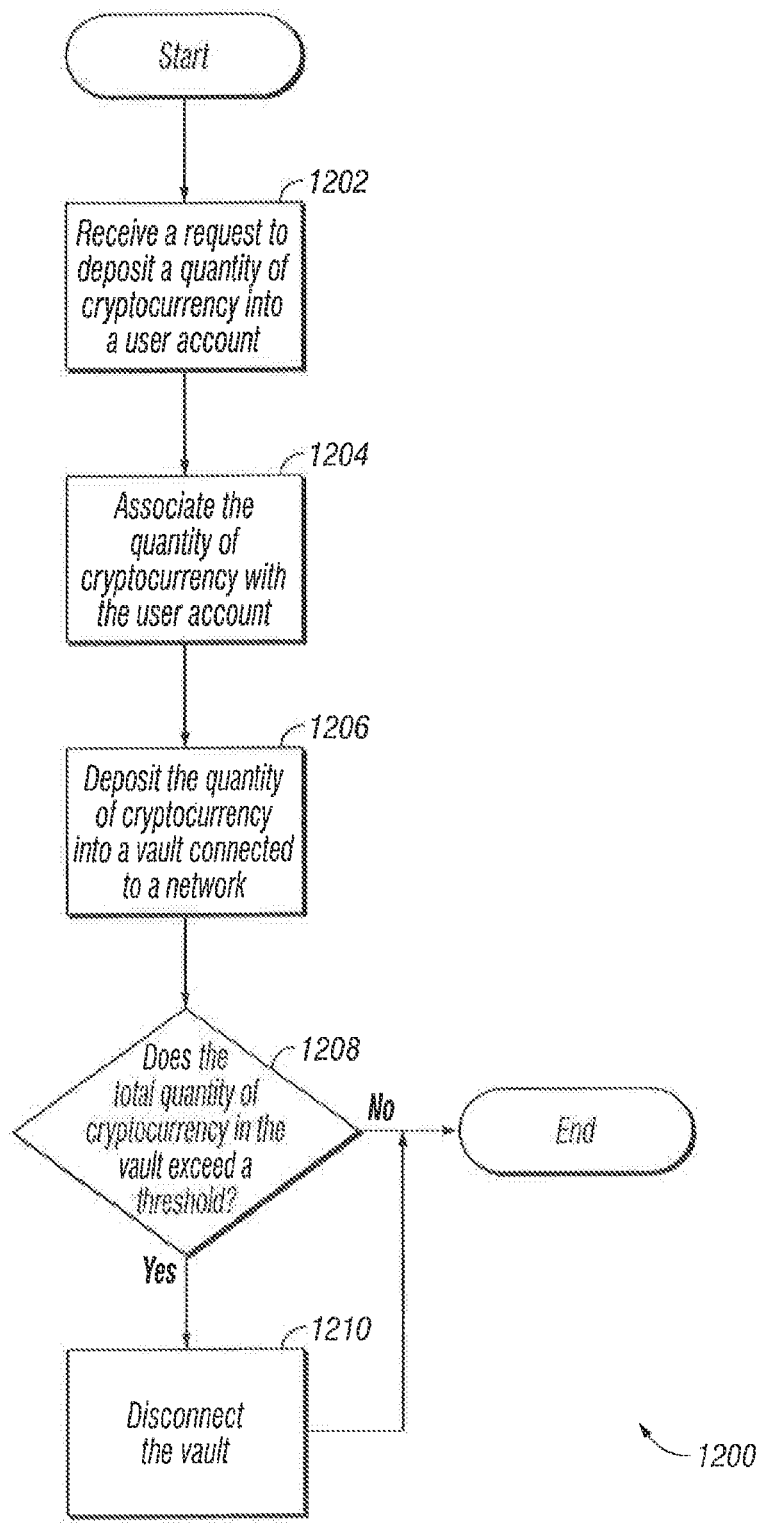
FIG. 12 illustrates an example flowchart for facilitating cryptocurrency storage in an offline vault.

FIG. 12 illustrates an example flowchart for facilitating cryptocurrency storage in an offline vault that may be implemented by the example systems of FIG. 1 and/or FIG. 2. The example method may start at step 1202, where enterprise cryptocurrency server 130 may receive a request to deposit a quantity of cryptocurrency into a customer account 203. In response, at step 1204, enterprise cryptocurrency server 130 may associate the quantity of cryptocurrency with the customer account 203. Next, at step 1206, enterprise cryptocurrency server 130 may deposit the quantity of cryptocurrency into an offline vault 212 that may be communicatively coupled to enterprise cryptocurrency server 130. In certain embodiments, depositing the quantity of cryptocurrency may comprise storing one or more private keys associated with the quantity of cryptocurrency in offline vault 212. According to some embodiments, a function or algorithm may be applied to the one or more private keys before storage in offline vault 212.

At step 1208, after deposit, vault engine 236 may determine whether a threshold has been exceeded involving offline vault 212. For example, the threshold may be related to a total amount of cryptocurrency, private keys associated with a total amount of cryptocurrency, public keys, and/or any other suitable quantifiable information associated with depositing cryptocurrencies in offline vault 212. If the threshold is not exceeded, the example method may end. If the threshold is exceeded, then, at step 1210, vault engine 236 may communicate a message to facilitate the disconnection of offline vault 212. In certain embodiments, the disconnection may be from network 120, from data center server 160, or enterprise cryptocurrency server 130. According to some embodiments, the hardware containing the now-disconnected offline vault 212 may be physically secured.

Figure 13:
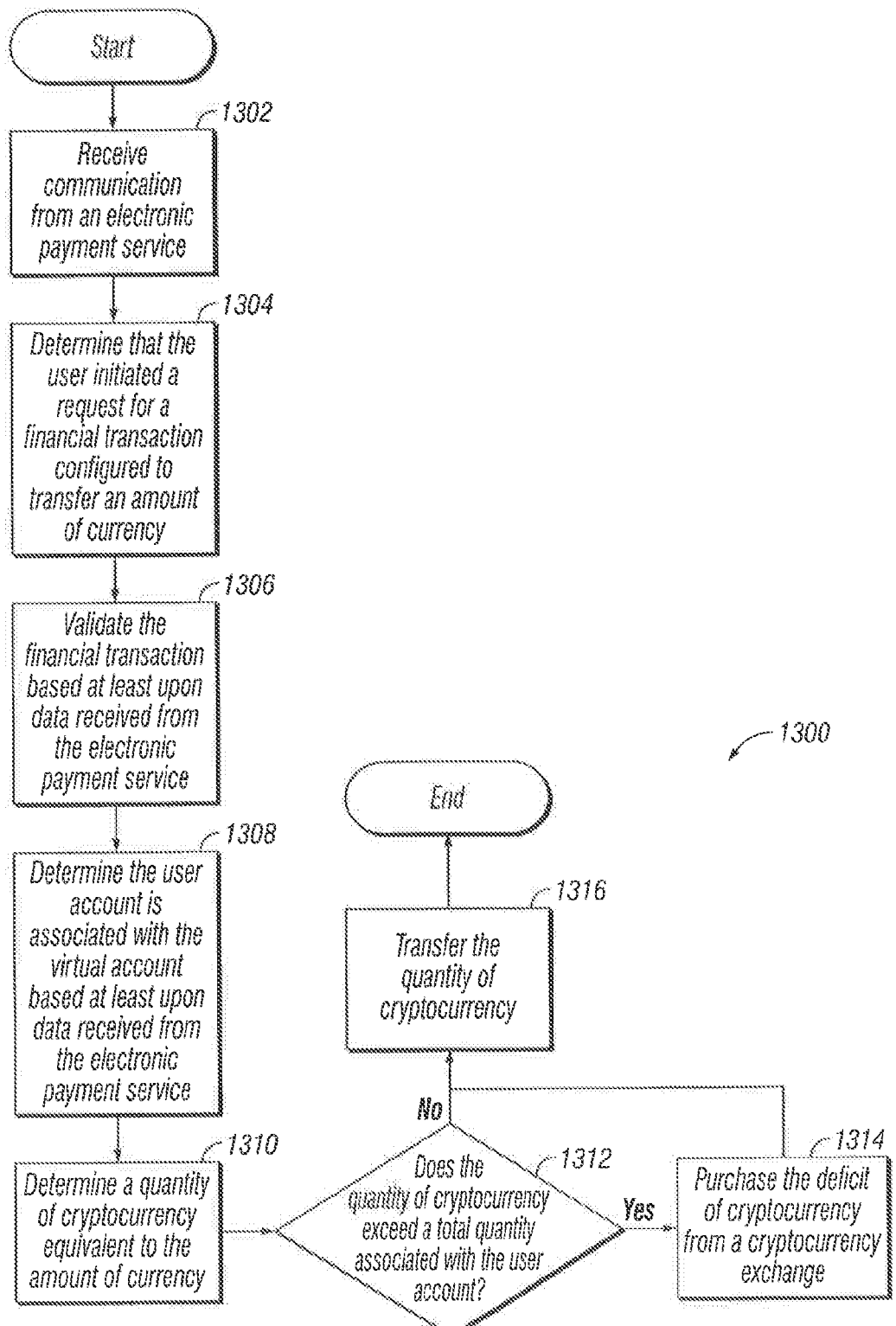
FIG. 13 illustrates an example flowchart for facilitating peer-to-peer cryptocurrency transactions.

FIG. 13 illustrates an example flowchart for facilitating peer-to-peer cryptocurrency transactions that may be implemented by the example systems of FIG. 1 and/or FIG. 2. In general, the method begins at step 1302, where customer 102 may initiate a request for a financial transaction to transfer funds from a source to a destination. Customer 102 may select virtual account 172 as either the source (to transfer funds out of virtual account 172) or the destination (to transfer funds into virtual account 172). Enterprise cryptocurrency server 130 may receive such a request over links 116 from payment service server 170. At step 1304, in response, enterprise cryptocurrency server 130 determines that customer 102 initiated the request for the financial transaction to transfer an amount of currency. Next, at step 1306, peer-to-peer engine 238 may validate the financial transaction based at least upon the data received from payment service center 170. In certain embodiments, enterprise cryptocurrency server 130 may receive the data over a dedicated interface with the payment service server 170.

At step 1308, peer-to-peer engine 238 may also determine that a certain virtual account 172 is associated with a certain customer account 203 based at least upon the data received from the payment service server 170. If the financial transaction passes validation, peer-to-peer engine 238 may determine a quantity of cryptocurrency equivalent to the amount of currency at step 1310. For example, peer-to-peer engine 238 may determine a quantity of cryptocurrency that has the same approximate value as the amount of currency.

Next, at step 1312, peer-to-peer engine 238 may determine whether the quantity of cryptocurrency exceeds the total quantity of cryptocurrency associated with customer account 203. If not, the example method may proceed to step 1316. If so, then peer-to-peer engine 238 may purchase, at step 1314, on the behalf of customer 102, the difference in quantities. For example, peer-to-peer engine 238 may facilitate the purchase of the cryptocurrency from an exchange server 140. Peer-to-peer engine 238 may then transfer, at step 1316, the quantity of cryptocurrency to payment service server 170. In certain embodiments, this may involve the transfer of private and/or public keys associated with the quantity of cryptocurrency.

Figure 14:
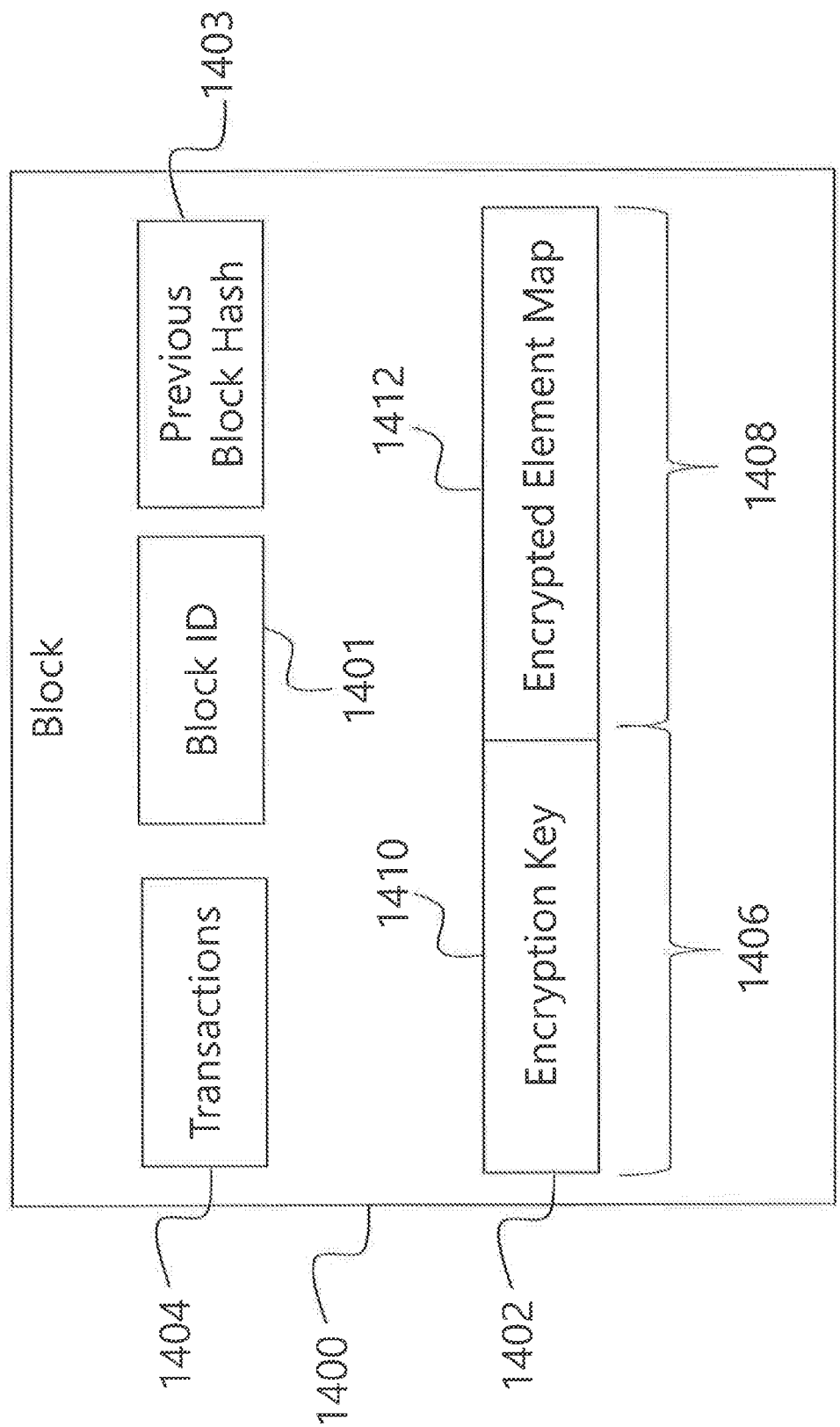
FIG. 14 illustrates an embodiment of a block from a block chain using creator tags.

FIG. 14 illustrates an embodiment of a block 1400 from a block chain using creator tags 1402. A block chain generally refers to a database shared by the network nodes (e.g. device 110, enterprise cryptocurrency server 130, data centers 160, exchanges 140, and third-party enterprise server 150) in the network. Each network node comprises a ledger configured to store a copy of the block chain, which contains every block chain transaction executed in the network. The block chain links together blocks 1400 of data which comprise identifiable units called transactions 1404. Transactions 1404 may comprise information, files, or any other suitable type of data. For example, a transaction 1404 may comprise information associated with a financial transaction, medical history, personal information, or any other type of information. As another example, a transaction 1404 may comprise files or documents being shared between users.

Each block 1400 in the block chain comprises a block identifier 1401 and information derived from a preceding block 1400. For example, every block 1400 in the block chain includes a hash 1403 of the previous block 1400. By including the hash 1403, the block chain comprises a chain of blocks 1400 from a genesis block 1400 to the current block 1400. Each block 1400 is guaranteed to come after the previous block 1400 chronologically because the previous block's hash 1403 would otherwise not be known. In one embodiment, blocks 1400 in a block chain may be linked together by identifying a preceding block with a cryptographic checksum (e.g. secure hash algorithm (SHA)-256) of its contents (e.g. the transaction and additional metadata) which serves as each block's unique identifier. Links are formed by storing the cryptographic checksum identifier of one block 1400 in the metadata of another block 1400, such that the former block 1400 becomes the predecessor of the latter block 1400. In this way, the blocks 1400 form a chain that can be navigated from block-to-block by retrieving the cryptographic checksum of a particular's block's predecessor from the particular block's own metadata. Each block 1400 is computationally impractical to modify once it has been in the block chain because every block 1400 after it would also have to be regenerated. When a network node publishes an entry (e.g. a block 1400) in its ledger, the block chain for all other network nodes in the distributed network is also updated with the new entry. Thus, data published in a block chain is available and accessible to every network node with a ledger.

Block 1400 further comprises a creator tag 1402 which provides additional layer of information security and functionality for blocks 1400 in a block chain. The creator tag 1402 is an element that is embedded into a block 1400 that provides an encryption key 1410 that is used to encrypt a set of data elements and a mapping of where the encrypted elements (e.g. blocks 1400 or transactions 1404) are stored within one or more blocks of a block chain. The creator tag allows the data elements to be stored anywhere within the block chain and uses an encrypted element map to record the locations of the encrypted data elements over time. The encryption key 1410 is used for both encrypting and decrypting the encrypted elements. The creator tag 1402 provides the encrypted element map 1412 that allows encrypted data elements within a block or among different blocks to be linked together. Conventional block chain systems do not have the ability to link together a set of data elements within the block chain. The creator tag 1402 provides unconventional solution that involves securely embedding the encrypted element map 1412 within the block chain to enable this new functionality. The creator tag 1402 provides the ability to securely store data within the block chain as well as the ability to locate and recover the original data from the block chain at a later time.

The creator tag 1402 may be stored anywhere within a block 1400. For example, the creator tag 1402 may be embedded within a block 1400 as a transaction 1404. In this example, the creator tag 1402 appears as another transaction to anyone without knowledge of the location of the creator tag 1402. The location of the creator tag 1402 may be known and specified by the user embedding the creator tag 1402 within the block 1400. The location of the creator tag 1402 appears random to anyone else trying to locate the creator tag 1402, which provides additional layers of protection for the creator tag 1402 and the data elements it protects. For example, a bad actor will have to determine the location of the creator tag 1402 within the block 1400 or attempt to process every transaction within the block 1400 to access the data elements protected by the creator tag 1402. Both techniques require a significant amount of time and processing resources which makes them impractical for a bad actor to implement.

The creator tag 1402 itself is encrypted which means that a bad actor cannot easily extract the encryption key 1410 nor the encrypted element map 1412 to determine the location of the encrypted data elements. For example, the creator tag 1402 may be encrypted before its embedded into a block 1400. Encrypting the creator tag 1402 provides an additional layer of security because, in addition to the challenges associated with locating the creator tag 1402, a bad actor will also have to decrypt the creator tag 1402 to extract the information within the creator tag 1402. Thus, using creator tags 1402 increases the difficulty for a bad actor to access protected information from within the block chain. Examples of using the creator tag 1402 are described in FIGS. 15-17.

In one embodiment, the creator tag 1402 is a data structure that comprises a head portion 1406 and a body portion 1408. The header portion 1406 comprises the encryption key 1410 and the body portion 1408 comprises the encrypted element map 1412. The encryption key 1410 is a key used to encrypt and decrypt date elements. For example, the encryption key 1410 may be used to encrypt data (e.g. transactions 1404) before they are added to a block 1400. The encryption key 1410 may also be used to decrypt and recover the original data element. The encryption key 1410 may be any suitable type of encryption or hashing key as would be appreciated by one of ordinary skill in the art. The encrypted element map 1412 identifies the encrypted data elements and/or their location within a block or block chain. For example, the encrypted element map 1412 may identify blocks 1400 within a block chain. As another example, the encrypted element map 1412 may identify transactions 1404 within a block. Examples of these types of encrypted element maps 1412 are described in FIGS. 15 and 16, respectively. The creator tag 1402 may be implement using extensible markup language (XML) script or any other suitable type language, script, or text. In other embodiments, the creator tag 1402 may be any other suitable type of data structure and/or configuration.

Figure 15:
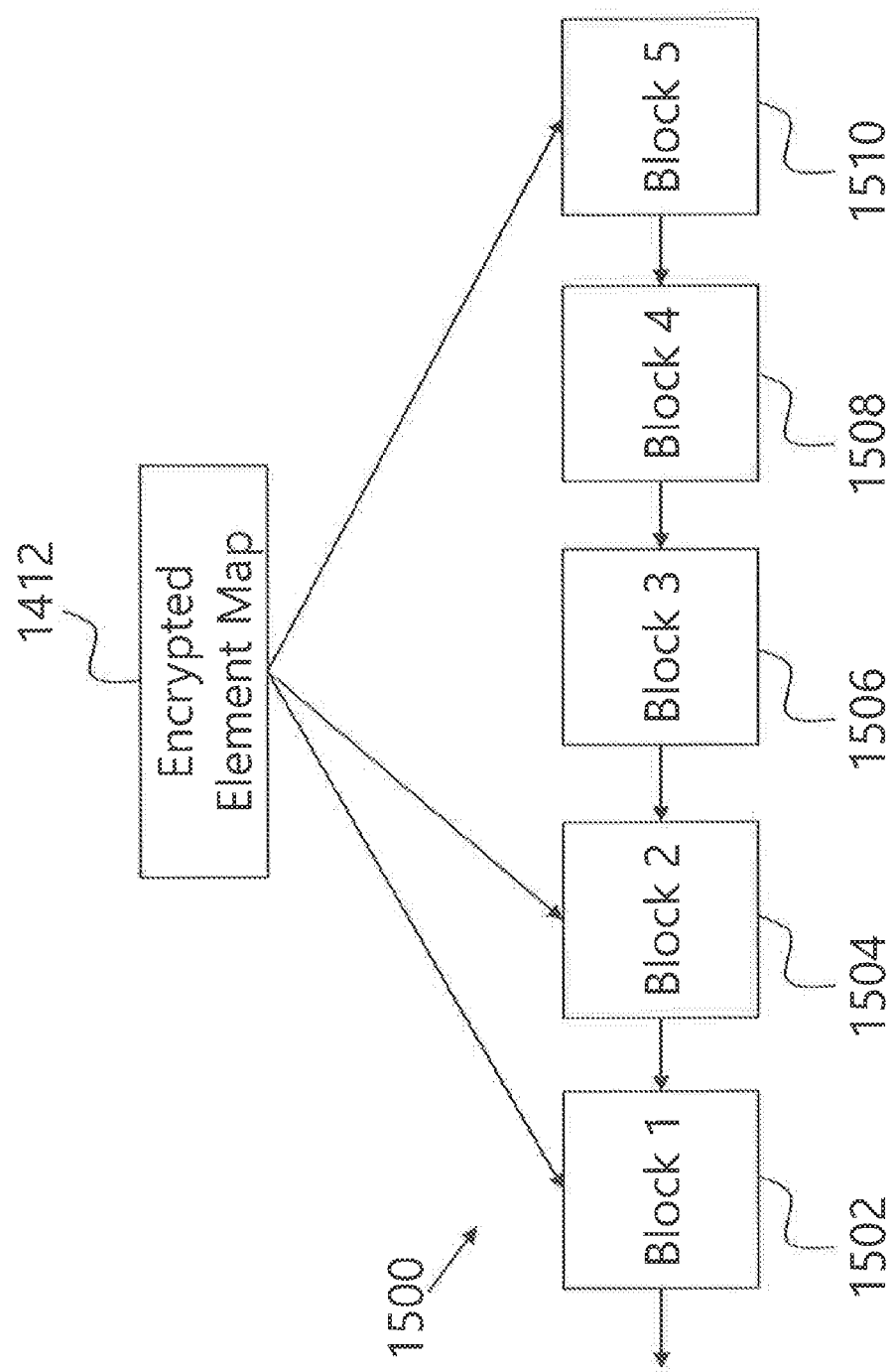
FIG. 15 illustrates an embodiment of an encrypted element map referencing blocks in a blockchain.

FIG. 15 illustrates an embodiment of an encrypted element map 1412 referencing blocks in a blockchain. The block chain comprises blocks 1502, 1504, 1506, 1508, and 1510 which are configured similar to the block 1400 described in FIG. 14. In this example, the creator tag 1402 is unused to encrypt data that is located among different blocks in the block chain. The encrypted element map 1412 of the creator tag 1402 provides information (e.g. a block identifier 1401) identifying which blocks are storing encrypted data elements and the creator tag 1402. In this example, the encrypted element map 1412 references blocks 1502, 1504, and 1510. In other examples, the encrypted element map 1412 may identify any other suitable combination and/or number of blocks within a block chain. The encrypted element map 1412 may use any suitable type of data structure and identifiers for identifying each block. In one embodiment, the encrypted element map 1412 may also identify transactions within a block that are encrypted using the encryption key 1410. An example of an encrypted element map 1412 that identifies encrypted transactions within a block is described in FIG. 16.

Figure 16:
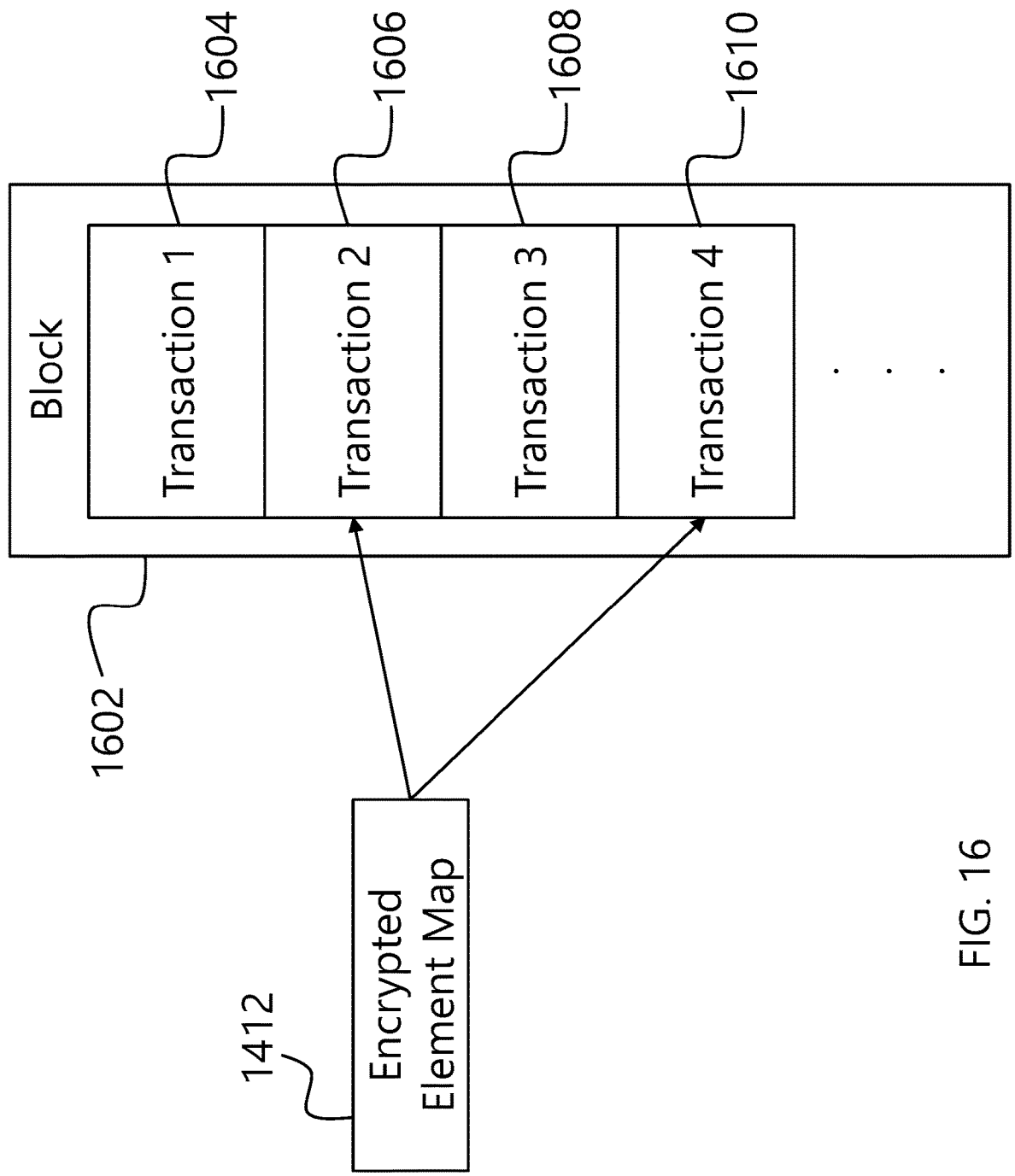
FIG. 16 illustrates an embodiment of an encrypted element map referencing transactions in a block.

FIG. 16 illustrates an embodiment of an encrypted element map 1412 referencing transactions in a block 1602. The block 1602 comprises transactions 1604, 1606, 1608, and 1610 which are configured similar to the transaction 1404 described in FIG. 15. In this example, the creator tag 1402 is used to encrypt data that is located within the block 1602 as transactions. The encrypted element map 1412 of the creator tag 1402 provides information identifying which transactions are encrypted using the encryption key 1410. In this example, the encrypted element map 1412 references transactions 1606 and 1610. In other examples, the encrypted element map 1412 may identify any other suitable combination and/or number of transactions.

Figure 17:
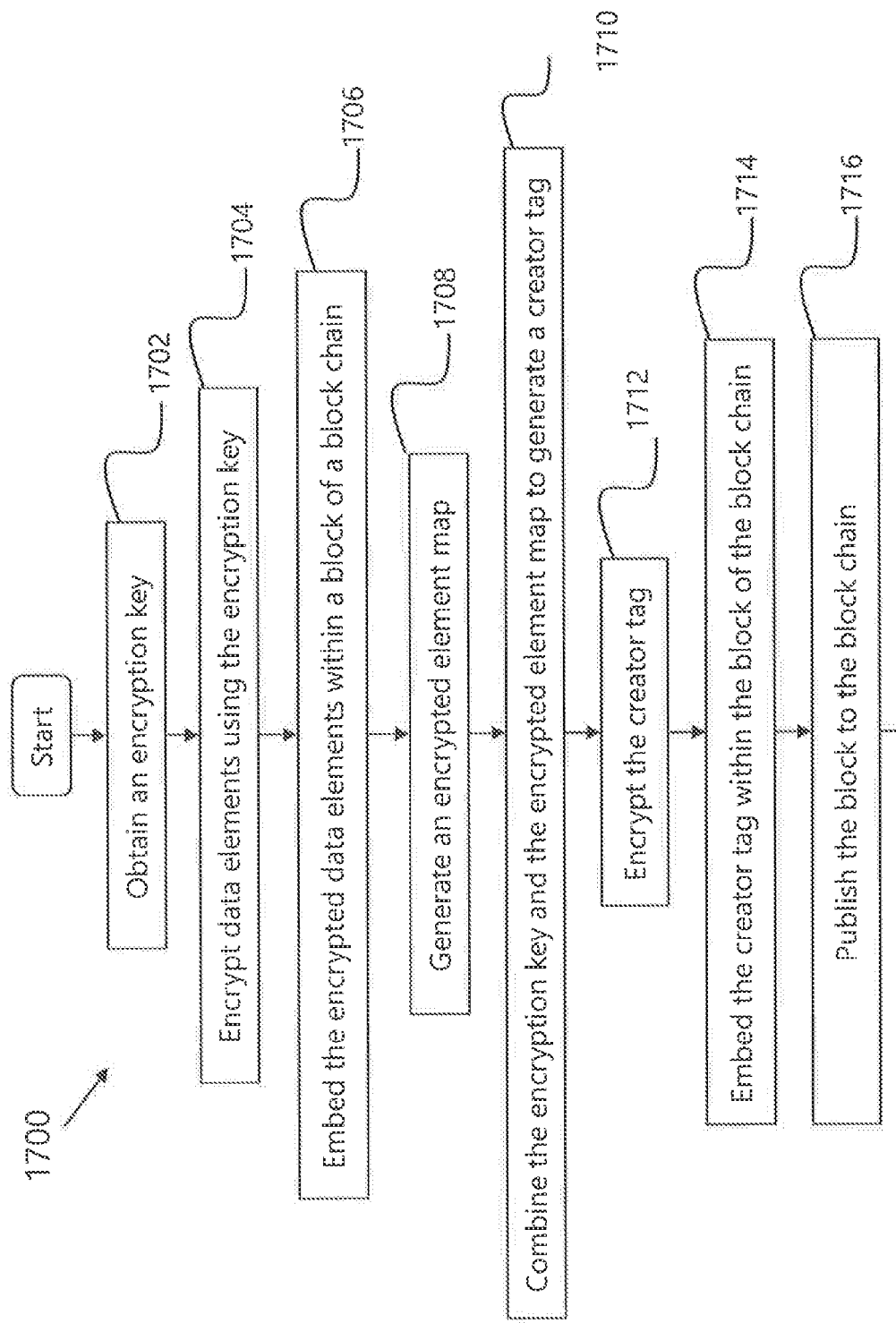
FIG. 17 illustrates an embodiment of an encryption method using creator tags.

FIG. 17 illustrates an embodiment of an encryption method 1700 using creator tags 1402. In one embodiment, a device in the enterprise cryptocurrency environment 100 may implement method 1700 to provide additional layers of security for data elements stored within a block chain. For example, the enterprise cryptocurrency server 130 may use the vault engine 136 to employ method 1700 to embed and link encrypted information and/or files within blocks of a blockchain. In this example, the vault engine 136 receives a set of data elements associated with a user to be encrypted and embedded into a block chain. The data elements may comprise documents, files, information, or any other suitable type of data.

At step 1702, the vault engine 136 obtains an encryption key 1410. In one embodiment, the vault engine 136 obtains the encryption key 1410 from a key repository. For example, the vault engine 136 may randomly select the encryption key 1410 from a set of encryption keys 1410 stored in memory. As another example, the vault engine 136 identifies the user associated with the first set of data elements and selects the encryption key 1410 based on the identified user. In another embodiment, the vault engine 136 generates the encryption key 1410. For example, the vault engine 136 generate the encryption key 1410 using a user defined encryption algorithm or based on the identity of the user. The encryption key 1410 may be any suitable type of encryption or hashing key as would be appreciated by one of ordinary skill in the art. In another embodiment, the vault engine 136 determines the location of the user associated with the first set of data elements and/or the location of the device encrypting the first set of data elements and selects an encryption key 1410 based on the determined location. For example, the vault engine 136 may determine a location based on an IP address, a physical address, or any other information. In another embodiment, the vault engine 136 determines a risk level associated with the location of the user associated with the first set of data elements and/or the location of the device encrypting the first set of data elements and selects an encryption key 1410 based on the determined risk level. For example, locations associated with a higher risk level may use a more secure encryption key 1410 than locations associated with a lower risk level. In other embodiments, the vault engine 136 may select an encryption key 1410 based on any other combination of criteria.

At step 1704, the vault engine 136 encrypts the first set of data elements using the encryption key 1410. At step 1706, the vault engine 136 embeds or stores the encrypted data elements within a block of a block chain. In one embodiment, the vault engine 136 stores the encrypted data elements in random locations within the block. In another embodiment, the vault engine 136 stores the encrypted data elements in user defined locations within the block. The encrypted data elements may be distributed within the block such that all of the encrypted data elements are not located sequentially within the block. The encrypted elements are stored within a block such they that are mixed with other transaction and data within the block. This means that a bad actor cannot easily identify the which data elements with the block are associated with the encrypted data elements. This ability protects the encrypted data elements from being easily identified.

At step 1708, the vault engine 136 generates an encrypted element map 1412 that identifies the location of the encrypted data elements within the block. For example, the encrypted element may identify encrypted data elements using a data element identifier and a location in the block using a transaction identifier. In this example, the transaction identifier uniquely identifies a transaction within the block. In some embodiments, the encrypted element map 1412 further comprises block identifiers 1401 that identifies other blocks in the blockchain that contain data elements encrypted using the encryption key 1410. For example, the encrypted element map 1412 may identify other blocks and transaction within the other blocks that contain encrypted data elements. The encrypted element map 1412 securely stores the location of encrypted elements so that they can be located and recovered at a later time. The encrypted element map 1412 also provides the ability to track and link encrypted data elements stored within the block chain over time.

At step 1710, the vault engine 136 combines the encryption key 1410 and the encrypted element map 1412 to generate a creator tag 1402. In one embodiment, the vault engine 136 generates a data structure that comprises the encryption key 1410 in a head portion (e.g. a header) of the data structure and the encrypted element map 1412 in a body portion (e.g. a payload) of the data structure. In another embodiment, the vault engine 136 concatenates the encryption key 1410 and the encrypted element map 1412 to generate a creator tag 1402. In other embodiments, the vault engine 136 may combine the encryption key 1410 and the encrypted element map 1412 using any other suitable technique.

At step 1712, the vault engine 136 encrypts the creator tag 1402. In one embodiment, the vault engine 136 uses a hashing algorithm to encrypt the creator tag 1402. In other embodiments, the vault engine 136 may use any other suitable encryption technique to encrypt the creator tag 1402. Encrypting the creator tag 1402 provides an additional layer of protection so that a bad actor cannot easily extract the encryption key 1410 nor the encrypted element map 1412 to determine the location of the encrypted data elements.

At step 1714, the vault engine 136 embeds the creator tag 1402 within the block of the block chain. In one embodiment, vault engine 136 stores the creator tag 1402 in a user-defined location within the block of the block chain. The creator tag 1402 may be stored anywhere within the block such that its location appears random to others accessing the block. This further increases the difficulty for a bad actor to gain access to the data elements protected by the creator tag 1402. At step 1716, the vault engine 136 publishes the block to the block chain. For example, the vault engine 136 may broadcast or send the block to the network nodes with a ledger in the network.

In one embodiment, the vault engine 136 receives a second set of data elements from the user to encrypt and embed within the block chain. The vault engine 136 encrypts the second set of data elements using the encryption key 1410 and embeds the second set of encrypted data elements within a second block for the block chain using a process similar to the process described in steps 1704 and 1706, respectively. The vault engine 136 then generates a second encrypted element map 1412 that identifies the locations of the first set of encrypted data elements within the first block and the locations of the second set of encrypted data elements within the second block using a process similar to the process described in step 1708. In this example, the second encrypted element map links both the first set of encrypted data elements and the second set of encrypted data elements and identifies their respective locations within different blocks of the block chain. In other words, the second encrypted element map 1412 links together or associated the first set of encrypted data elements, the second set of encrypted data elements, and their respective locations within the block chain. The vault engine 136 then combines the encryption key with the second encrypted element map to generate a second creator tag, encrypts the second creator tag, and embeds the second creator tag within the second block using a process similar to the process described in steps 1710-1714. The vault engine 136 then publishes the second block to the block chain using a process similar to the process described in step 1716. The vault engine 136 may repeat this process to link additional encrypted data elements within the block chain.

In one embodiment, the vault engine 136 is configured to apply an encryption or hashing function to the encryption key 1410 and/or the creator tag 1402 to generate a vault key and to store the vault key into a memory. As an example, the vault engine 136 may select an encryption or hashing function based on the location and/or risk level associated with device encrypting the data elements. In other examples, the vault engine 136 may select an encryption or hashing function based on any other criteria.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
    a plurality of network nodes in a network, wherein the network nodes are configured to maintain a block chain; and
    a device in signal communication with one or more network nodes from the plurality of network nodes, comprising:
        a communication interface configured to exchange data network nodes in the network;
        a memory operable to store encryption keys; and
        a processor communicatively coupled to the communication interface and the memory, configured to implement a vault engine configured to:
            receive a first set of data elements;
            obtain an encryption key from the memory;
            encrypt the first set of data elements using the encryption key;
            embed the first set of encrypted data elements within a first block for the block chain;
            generate a first encrypted element map identifying the locations of the first set of encrypted data elements within the first block, wherein the first encrypted element map comprises:
                data element identifiers for the first set of encrypted data elements; and
                transaction identifiers that identify transactions within the first block where the first set of encrypted data elements are stored;
            combine the encryption key with the first encrypted element map to generate a creator tag, wherein the creator tag comprises a header portion that contains the encryption key and a body portion that contains the first encrypted element map;
            encrypt the creator tag;
            embed the creator tag within the first block; and
            publish the first block to the block chain.

2. The system of claim 1, wherein the processor is configured to:
    receive a second set of data elements;
    encrypt the second set of data elements using the encryption key;
    embed the second set of encrypted data elements within a second block for the block chain;
    generate a second encrypted element map, wherein the second encrypted element map identifies:
        the locations of the first set of encrypted data elements within the first block; and
        the locations of the second set of encrypted data elements within the second block;
    combine the encryption key with the second encrypted element map to generate a second creator tag;
    encrypt the second creator tag;
    embed the second creator tag within the second block; and
    publish the second block to the block chain.

3. The system of claim 1, wherein obtaining the encryption key comprises:
    identifying a user associated with the first set of data elements; and
    selecting the encryption key based on the identified user.

4. The system of claim 1, wherein obtaining the encryption key comprises randomly selecting the encryption key.

5. The system of claim 1, wherein obtaining the encryption key comprises:
    determining the location of the device; and
    selecting the encryption key based on the location of the device.

6. The system of claim 1, wherein the processor is further configured to:
    selecting a hashing function based on the location of the device;
    hashing at least a portion of the encryption key with the hashing function to generate a vault key; and
    store the vault key in the memory.

7. The system of claim 1, wherein selecting the hashing function is based at least in part on a risk level associated with the location of the device.

8. An encryption method, comprising:
    receiving, by a vault engine implemented by a processor, a first set of data elements;
    obtaining, by the vault engine, an encryption key from a memory;
    encrypting, by the vault engine, the first set of data elements using the encryption key;
    embedding, by the vault engine, the first set of encrypted data elements within a first block for the block chain;
    generating, by the vault engine, an encrypted element map identifying the locations of the first set of encrypted data elements within the first block, wherein the encrypted element map comprises:
        data element identifiers for the first set of encrypted data elements; and
        transaction identifiers that identify transactions within the first block where the first set of encrypted data elements are stored;
    combining, by the vault engine, the encryption key with the encrypted element map to generate a creator tag, wherein the creator tag comprises a header portion that contains the encryption key and a body portion that contains the encrypted element map;
    encrypting, by the vault engine, the creator tag;
    embedding, by the vault engine, the creator tag within the first block; and publishing, by the vault engine, the first block to the block chain.

9. The method of claim 8, further comprising:
receiving, by the vault engine, a second set of data elements;
encrypting, by the vault engine, the second set of data elements using the encryption key;
embedding, by the vault engine, the second set of encrypted data elements within a second block for the block chain;
generating, by the vault engine, a second encrypted element map, wherein the second encrypted element map identifies:
the locations of the first set of encrypted data elements within the first block; and
the locations of the second set of encrypted data elements within the second block;
combining, by the vault engine, the encryption key with the second encrypted element map to generate a second creator tag;
encrypting, by the vault engine, the second creator tag;
embedding, by the vault engine, the second creator tag within the second block; and
publishing, by the vault engine, the second block to the block chain.

10. The method of claim 8, wherein obtaining the encryption key comprises:
identifying a user associated with the first set of data elements; and
selecting the encryption key based on the identified user.

11. The method of claim 8, wherein obtaining the encryption key comprises randomly selecting the encryption key.

12. The method of claim 8, wherein obtaining the encryption key comprises:
determining the location of the device; and
selecting the encryption key based on the location of the device.

13. The method of claim 8, wherein the processor is further configured to:
selecting, by the vault engine, a hashing function based on the location of the device;
hashing, by the vault engine, at least a portion of the encryption key with the hashing function to generate a vault key; and
storing, by the vault engine, the vault key in the memory.

14. The method of claim 8, wherein selecting the hashing function is based at least in part on a risk level associated the location of the device.

15. A device, comprising:
a memory operable to store encryption keys; and
a processor communicatively coupled to the memory, configured to:
receive a first set of data elements;
obtain an encryption key from the memory;
encrypt the first set of data elements using the encryption key;
embed the first set of encrypted data elements within a first block for the block chain;
generate an encrypted element map identifying the locations of the first set of encrypted data elements within the first block, wherein the encrypted element map comprises:
data element identifiers for the first set of encrypted data elements; and
transaction identifiers that identify transaction within the first block where transactions within the first block where the first set of encrypted data elements are stored;
combine the encryption key with the encrypted element map to generate a creator tag, wherein the creator tag comprises a header portion that contains the encrypted key and a body portion that contains the first encrypted element map;
encrypt the creator tag;
embed the creator tag within the first block; and
publish the first block to the block chain.

16. The device of claim 15, wherein the processor is configured to:
receive a second set of data elements;
encrypt the second set of data elements using the encryption key;
embed the second set of encrypted data elements within a second block for the block chain;
generate a second encrypted element map, wherein the second encrypted element map identifies:
the locations of the first set of encrypted data elements within the first block; and
the locations of the second set of encrypted data elements within the second block;
combine the encryption key with the second encrypted element map to generate a second creator tag;
encrypt the second creator tag;
embed the second creator tag within the second block; and
publish the second block to the block chain.

17. The device of claim 15, wherein obtaining the encryption key comprises:
identifying a user associated with the first set of data elements; and
selecting the encryption key based on the identified user.

18. The device of claim 15, wherein obtaining the encryption key comprises randomly selecting the encryption key.

19. The device of claim 15, wherein obtaining the encryption key comprises:
determining the location of the device; and
selecting the encryption key based on the location of the device.

20. The device of claim 15, wherein the processor is further configured to:
selecting a hashing function based on the location of the device;
hashing at least a portion of the encryption key with the hashing function to generate a vault key; and
store the vault key in the memory.

* * * * *